United States Patent [19]

Redmond

[11] Patent Number: 5,759,044

[45] Date of Patent: Jun. 2, 1998

[54] METHODS AND APPARATUS FOR GENERATING AND PROCESSING SYNTHETIC AND ABSOLUTE REAL TIME ENVIRONMENTS

[75] Inventor: Scott Redmond, San Francisco, Calif.

[73] Assignee: Redmond Productions, San Francisco, Calif.

[21] Appl. No.: 498,595

[22] Filed: Jul. 6, 1995

Related U.S. Application Data

[60] Division of Ser. No. 949,157, Sep. 22, 1992, abandoned, which is a continuation-in-part of Ser. No. 483,547, Feb. 22, 1990, Pat. No. 5,255,211.

[51] Int. Cl.$^6$ .................................................. G09B 5/00
[52] U.S. Cl. ............... 434/307 R; 434/365; 340/825.06; 364/578; 348/383
[58] Field of Search ............... 634/43, 69, 307 R–309, 634/365; 340/825, 6, 825.36, 980; 370/60, 75, 85.2, 93, 34.1, 95.3; 379/59, 60; 455/89; 381/190; 395/127, 135, 152, 154, 155, 161, 156, 806, 807, 173, 326, 761; 364/578; 345/7, 8; 348/53, 115, 39, 383; 359/13, 630

[56] References Cited

U.S. PATENT DOCUMENTS

| | | |
|---|---|---|
| 4,046,262 | 9/1977 | Vykukal et al. . |
| 4,303,394 | 12/1981 | Berke et al. ............................. 434/40 |
| 4,398,799 | 8/1983 | Swift ..................................... 434/43 X |
| 4,542,291 | 9/1985 | Zimmerman . |

(List continued on next page.)

OTHER PUBLICATIONS

J. D. Foley, Interfaces for Advanced Computing, Scientific American pp. 127–130, 134 and 135, Oct. 1987.
R. Poe, "Manipulating Reality," Success (Mar. 1990) p. 80.
Dataglove Model 2, VPL Reasearch Inc. (and price list), 1989.
Body Electric, VPL Research Inc., 1987.
RB2 Virtual Reality system, VPL Research Inc. (and price list), Jul. 1989.
Virtual Reality Arrives!at Siggraph '89, VPL Research Inc., 1989.
"What is Artificial Reality? Wear A Computer And See," *The New York Times* (Apr. 10, 1989), A. Pollack.
R. Scheinin, "The Artificial Realist," San Jose Mercury News Jan. 30, 1990.
"Virtual Environment Display System" by Fisher et al. ACM 1986 Workshop Interactive 3D Graphics, Oct. 23–24, 1986, pp. 1–11.
*Consumer Reports* Virtual Vision: A view of things to come? p. 764, Dec. 1993.
Michael Antonoff, "Living In A Virtual World", Popular Science pp. 83–125.
Proceedings of the SPIE—The International Society for Optical Engineering, vol. 1083, pp. 42–52, 1989, Chung et al., "Exploring Virtual Worlds with Head–mounted Displays".

*Primary Examiner*—Joe Cheng
*Attorney, Agent, or Firm*—Allston L. Jones

[57] ABSTRACT

A system for generating and processing synthetic and absolute real time remote environments for interaction with a user and her biological senses is comprised of seven modules. These modules store, retrieve and process data to generate an output which interfaces with the system user's biological senses. These modules also track user data to accurately place the user in the generated and processed model. Various embodiments of the system user sensory interface are provided including visual and aural input devices, a three dimensional chamber having interactive tactile output via matrix-addressed, electromechanically operated rods driving a flexible skin and a head mounted sensory interface having a selectable a see through mode and multidimensional sonic arrays.

18 Claims, 34 Drawing Sheets

U.S. PATENT DOCUMENTS

| | | | |
|---|---|---|---|
| 4,722,601 | 2/1988 | McFarlane | 356/152 |
| 4,807,202 | 2/1989 | Cherri et al. | 434/44 X |
| 4,884,219 | 11/1989 | Waldren | 364/514 |
| 4,897,715 | 1/1990 | Beamon, III | 358/93 |
| 5,008,662 | 4/1991 | Tokizane et al. | 340/825.06 |
| 5,130,794 | 7/1992 | Ritchey | 395/154 |
| 5,185,561 | 2/1993 | Good et al. | 434/45 X |
| 5,201,067 | 4/1993 | Grube et al. | 455/89 |
| 5,276,703 | 1/1994 | Budin et al. | 375/206 |
| 5,319,387 | 6/1994 | Yoshikawa | 345/179 |
| 5,322,441 | 6/1994 | Lewis et al. | 434/307 R |

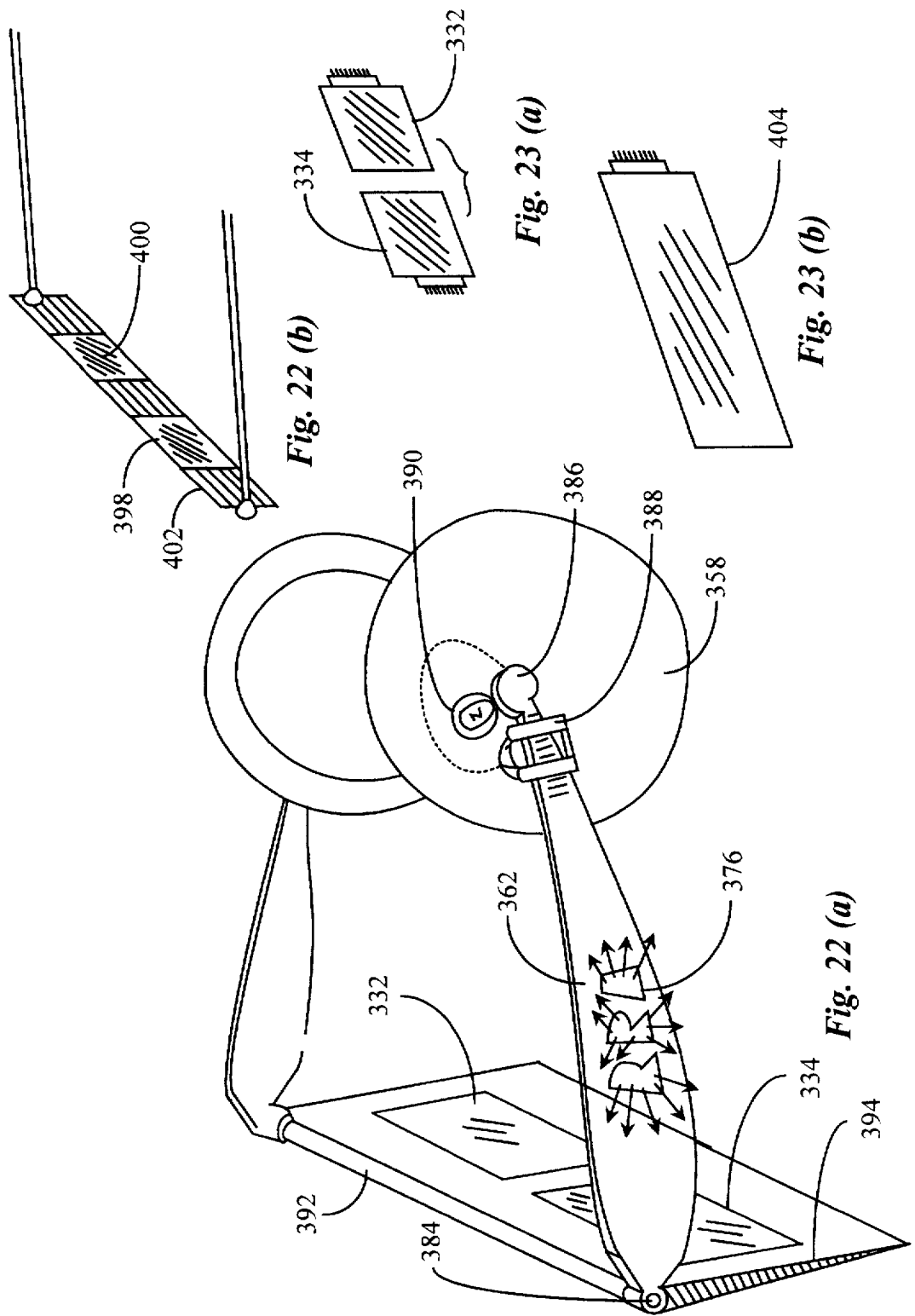

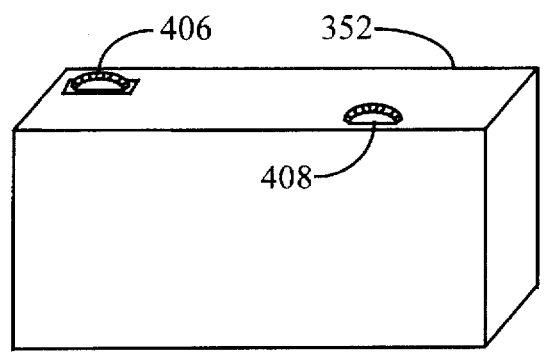
*Fig. 24*
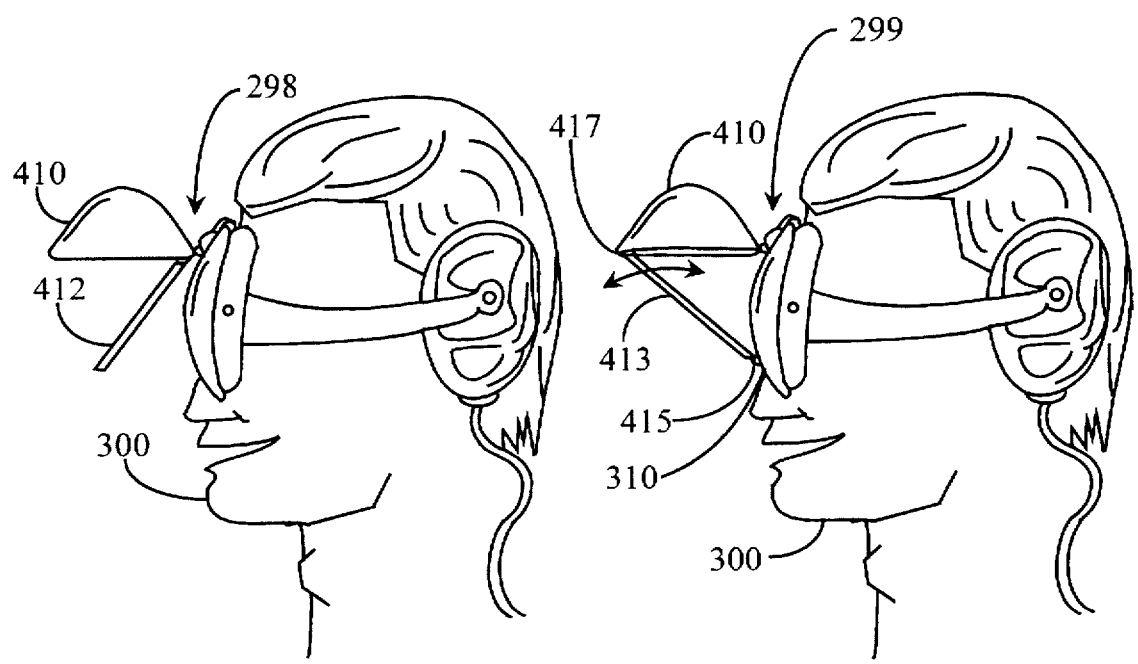
*Fig. 25 (a)*  *Fig. 25 (b)*

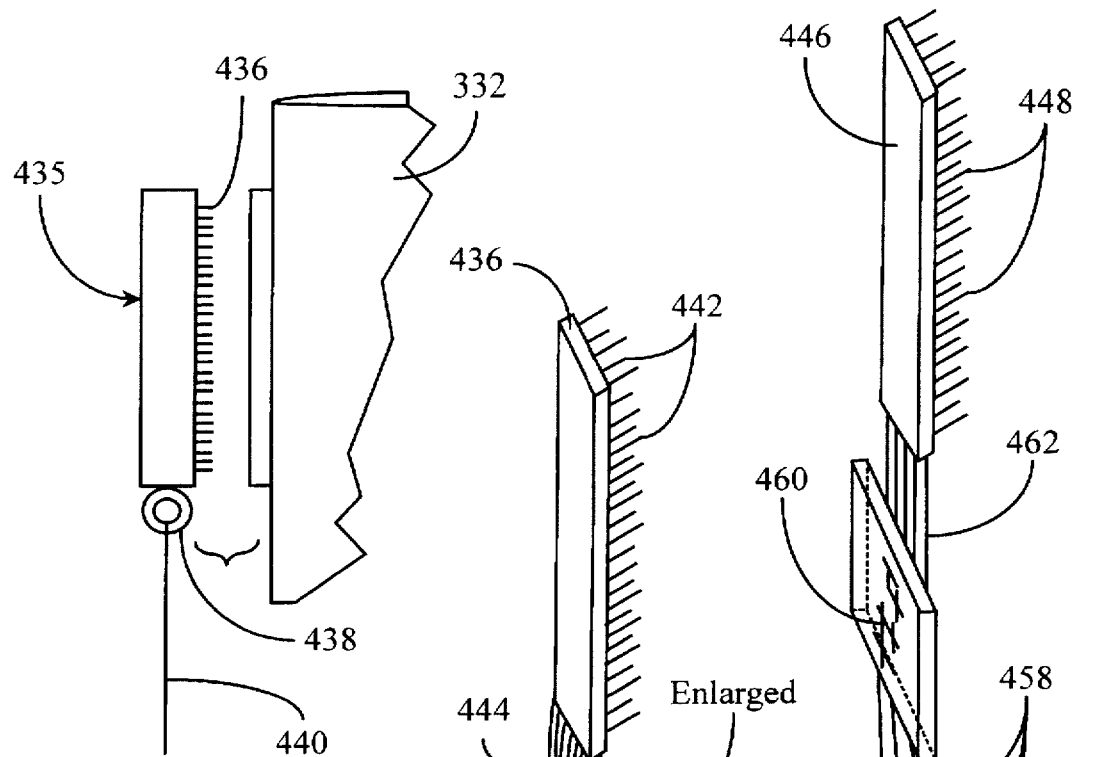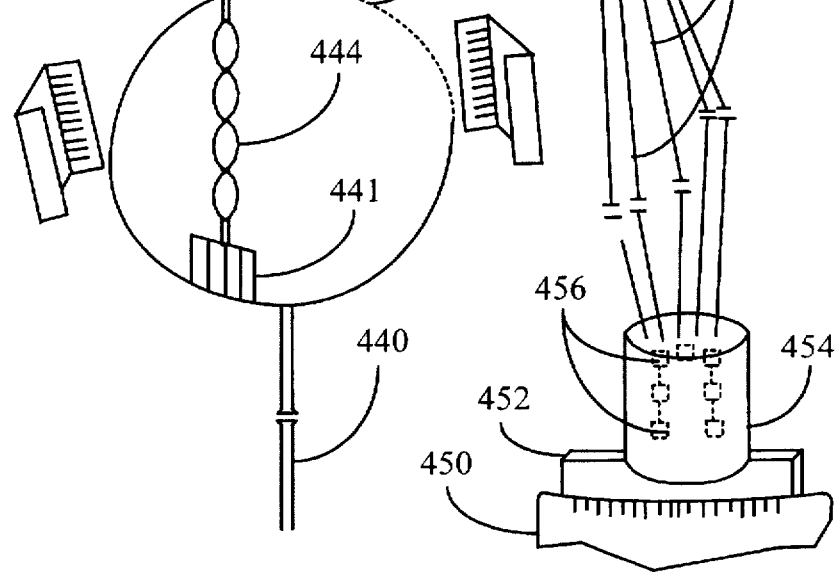
*Fig. 27 (a)*
*Fig. 27 (b)*
*Fig. 27 (c)*

METHODS AND APPARATUS FOR GENERATING AND PROCESSING SYNTHETIC AND ABSOLUTE REAL TIME ENVIRONMENTS

This is a divisional of application, Ser. No. 07/949,157 filed Sep. 22, 1992 abandoned which in turn is a Continuation-In-Part of Ser. No. 07/483,547 filed Feb. 22, 1990 U.S. Pat. No. 5,255,271.

TECHNICAL FIELD

The present invention deals generally with computer-generated and processed environments, and more specifically to systems and apparatus for generating and processing synthetic and absolute environments for three dimensional visual images, multidimensional aural images and tactile input to the system user's biological senses.

BACKGROUND OF THE INVENTION

Recent advances in hardware and software have permitted an increased awareness and development effort in the area of interactive "synthesized" environments. The goal of these development efforts is to provide a synthesized environment which is so realistic as to be virtually indistinguishable from the "absolute" or actual reality. The applications of these interactive synthesized realities are diverse: flight simulation, preconstruction architectural review and walkthrough, videogame-like entertainment, molecular modeling and engineering, microsurgery, communications and educational applications.

The NASA Ames Research Center has been working in synthetic environment development for many years. NASA's Virtual Interface Environment Workstation (VIEW) uses a head-mounted black and white LCD display for communicating generated three dimensional images to the system user.

Another system developer is VPL Research. VPL Research has designed a DataGlove which employs fiberoptics to monitor flexion and extension of the user's fingers, and a Polhemus magnetic tracking device to position the user's hand in a three dimensional matrix. VPL Research provides a DataSuit which expands the technology used in the DataGlove to monitor movement of the entire human body. VPL Research's EyePhone, or visual input device, consists of two color LCD monitors viewed through an optics system. In VPL Research's system, each monitor is driven by a separate computing path. A high resolution dot pattern is then superimposed over the transmitted image to improve perceived resolution. VPL Research provides a DataSuit which expands the technology used in the DataGlove to monitor movement of the entire human body.

AutoDesk has recently announced its development efforts in computer-generated synthetic reality systems. AutoDesk is primarily interested in architectural walkthrough applications of computer-generated synthetic environments, as a natural companion to AutoDesk's well established position in the CAD industry.

TiNi Alloy Co. has announced a tactile array of tiny, electronically activated pins to simulate the sensation of touching shapes and forms.

These existing systems fail to provide a totally integrated sensory output, to capture photo realistic images, sound and tactile sensory stimuli in a single interactive time and space. The processing technology in these earlier systems permits only gross "computational" image representations, images which are not realistic because of computation-limited low polygon density. The system architectures are inherently inefficient, preventing the provided system storage and processing capacity from operating at the computational speed required to provide super-realistic visual, sound and tactile imagery in an interactive mode.

The present invention provides a fully integrated system with massive parallel processing capabilities for generating and processing super realistic visual images, multidimensional sound images and tactile output. The present system permits the incorporation of pre-existing (actual) realities, defined herein as "absolute" reality, in combination with the computer-generated "synthetic" environments. The present invention is able to accomplish these features by providing a system architecture which optimizes computer memory storage and retrieval and which enables the required computations with a minimum of compute server capacity. The present invention also provides a head mounted sensory interface which provides high resolution visual and aural images in addition to tactile input to the system user.

It is an object of this invention to provide a unique combination of system architecture, computer-generated environmental output signals and computer output-human sensory input interfaces which provides the system user with a super realistic experience when interacting with the system.

It is an object of this invention to generate synthetic and absolute environmental model output of super realistic visual images, multidimensional sound images and interactive tactile output.

It is another object of this invention to provide data storage and retrieval architecture which employs image and data buffers to permit rapid access to stored data and unlimited capacity for increasing the speed of data retrieval and the data base volume.

It is an object of this invention to provide system architecture which permits efficient use of data memory and retrieval means by rapid reconfiguration of stored and currently viewed images.

It is an object of this invention to provide a system which can effectively combine "absolute" realities with "synthetic" realities to provide remote system operation capabilities, including remote robotics.

It is an object of this invention to monitor user position, movement and health telemetry data without intrusive sensors and cumbersome umbilical cords.

It is an object of this invention to provide generated and processed environment modeling module output to the user's biological sensory interfaces through massive micro compute server parallel data processing techniques.

It is an object of this invention to employ an environment modeling module in which three dimensional visual output is optically differentiated to obtain stereographic images using a single output mode.

It is an object of this invention to provide an environment modeling module which incorporates as pre-selected parameters the natural and known laws of physics in the generation of synthetic and absolute environments.

It is an object of this invention to provide a head mounted sensory interface which allows a system user to selectively switch between a see-through mode and a totally displayed mode.

It is an object of this invention to provide a head mounted sensory interface which provides increased wearing comfort by transporting moisture away from a system user's ears, face and eye areas for efficient evaporation of such moisture.

It is an object of this invention to provide a head mounted sensory interface which is secured to a system user's head such that hair on top of the user's head remains undisturbed.

It is an object of this invention to provide a head mounted sensory interface which utilizes a lens holder arrangement to allow rapid changes of optical characteristics of the interface.

It is an object of this invention to provide a head mounted sensory interface which incorporates a six axis sensor to track a system user's coordinates and orientation.

It is an object of this invention to provide a head mounted sensory interface which provides voice recognition of system user voice commands.

It is an object of this invention to provide a head mounted sensory interface which recognizes a system user's hand gesture commands.

It is an object of this invention to provide a head mounted sensory interface which employs a low mass ribbon-to-multiline coaxial cable interface which minimizes the emission of electromagnetic interference.

It is an object of this invention to provide a head mounted sensory interface in which multidimensional aural information is communicated to each ear of a system user via a audio transducer array.

It is an object of this invention to provide a head mounted sensory interface in which circuitry is physically located within each of a left and a right earpiece enclosure to thereby shift the center of gravity closer to the center of a user's head.

It is an object of this invention to provide a head mounted sensory interface which employs fiber optic side adjusters which transmit light from at least one light source to at least one of a pair of LCD backlights.

It is an object of this invention to provide a head mounted sensory interface which employs fiber optic side adjusters to display information from such adjusters.

It is an object of this invention to provide a head mounted sensory interface which utilizes a LCD backlight comprised of optical fibers.

It is an object of this invention to provide a head mounted sensory interface which employs compound lenses to provide both a wide angle and a close-up viewing capability.

It is an object of this invention to provide a head mounted sensory interface which utilizes selectable color temperatures and light frequencies for backlighting of each of a pair of liquid crystal displays.

It is an object of this invention to provide at least one repeater within a chamber for transferring information between a control center and a wireless transceiver, which transceiver is connected to a head mounted sensory interface.

It is an object of this invention to provide a head mounted sensory interface which utilizes a fiber optic signal umbilical between the left and right earpiece of said interface.

It is an object of this invention to provide a head mounted sensory interface which utilizes a flexible belt clip for securing an infrared transceiver to a system user.

These and further objects of the present invention will be apparent to those of ordinary skill in the art with reference to the following description and figures.

SUMMARY OF THE INVENTION

A system for generating and processing synthetic and absolute real time environments comprises six separate, interconnected modules. The data storage and retrieval module is designed for storing high resolution digital image, sound and user position coordinate data. The retrieval side of this module is designed to instantaneously retrieve the stored data. The data storage and retrieval module includes image files of natural objects; digital sound files of natural sounds; image compression software which permits efficient data storage and retrieval; primitive image basic model files such as polygons, fractals, ray tracing and subprimitive existing elements; image pre-design data processing array for the storage and retrieval of already generated synthetic image data; and, interactive throughput image and sound processing which generates and processes images corresponding to the user's body parts in the user's field of viewing the generated synthetic or absolute environment.

The second system module is an umbilical-less sensor which senses and transmits user position and movement data obtained by co-matrixed averaging of at least two separate sensor modes. This sensor module detects and transmits user health telemetry data to the environmental modeling module, data storage and retrieval module, and the primary control module.

The third module is an environmental modeling module for the real time generation and processing of synthetic and absolute environment output which uses pre-selected commands and parameters to render synthetic images, sounds, forces and movements with realistic accuracy, including user-viewed interactive user body parts, through massive micro compute server parallel data processing techniques.

The fourth system module is the user stimuli module, referring to the output/input interface between the environmental modeling means output and the user's biological sensory input. This module includes apparatus for three dimensional visual input to the user's eyes, apparatus for multi-dimensional sound input to the user's ears and apparatus for tactile input to the user's hands, feet and other body parts.

The fifth module is the primary control module for overall system operation, including the interface between the data storage and retrieval module, sensor module, environmental modeling module and user stimuli module. The primary control means is configured to control remote robotics.

The final system module, in-system communications means, permits user vocal communication to and from the primary control module.

Prior to the user interactive session, the system user selects a synthetic or absolute reality environment which is then communicated to the primary control module. This user selection presets some of the computational parameters required to generate the synthetic and absolute realities, and creates a data library subset which can be more easily accessed and processed. Thereafter, the synthetic and absolute environment is computed and generated, allowing the system user to interact with the generated environment through the in-system communications means, sensor module and user stimuli module.

There are several embodiments of the three dimensional visual input device which is part of the user stimuli module. In the first embodiment, visual images are input to the user's eyes via biosynchronized peripheral microstrobes in combination with dual vision LCD color eye monitors disposed on a headset. A second embodiment of the visual input device employs fiberoptic stacked array dual color images from two high definition color monitors. In a third embodiment, direct retina scan and other internal eye image placement is achieved by low power laser diode imaging packs and magnetic light aiming field. A fourth embodiment of the visual input device uses projection of the image onto rear micro-screens mounted one-quarter of an inch in front of surface of the user's eyes from fiberoptically routed high definition color monitors. In a fifth embodiment, frame sequenced dense-pack fiberoptic image decompression onto rear micro-screens mounted one-quarter of an inch in front of surface of the eyes is obtained by belt mounted HDTVs. A sixth embodiment of a head mounted visual input device, this sixth embodiment hereinafter also referred to as a "head mounted sensory interface" further includes an apparatus for allowing a system user to selectively switch between a see-through mode and a totally displayed mode.

The sixth embodiment also includes a hypoallergenic foam material on the surfaces which contact the system user, such foam having characteristics to transport perspiration or other moisture away from the user to be efficiently evaporated.

The sixth embodiment in addition is secured to a system user's head through the use of compression at or near such user's ears with the user's nose functioning as a locating device. In this way, hair on the top of such user's hair is undisturbed by the head mounted sensory interface.

The sixth embodiment additionally includes a lens holder arrangement, which permits replaceable lenses to be removed and inserted to thereby alter the optical characteristics of said display.

The sixth embodiment further includes a six axis sensor to track a user's coordinates and/or orientation.

The sixth embodiment also includes a self-powered wireless transmitter for transmission of either the user's voice commands to a voice recognition apparatus.

The sixth embodiment also includes a sensor for sensing hand gesture commands and means for recognizing such hand gestures.

The sixth embodiment further includes a ribbon-to-multiline coax cable interface which functions to reduce electromagnetic interface generated by signals which drive the liquid crystal display plates.

The sixth embodiment also includes apparatus for multi-dimensional sound input to the user's ears and optionally includes apparatus for tactile input to a user's head. Given that such tactile input consists of basically low frequency sound of a sufficient amplitude to exceed a system user's tactile sensory threshold, it is possible to use the same electromagnetic or piezoelectric drivers to excite more than one sense of a system user.

The sixth embodiment additionally includes LCD plate drivers which are positioned within both left and right earpiece enclosures to thereby shift the center of gravity of the head mounted sensory interface closer to the center of the system user's head.

The sixth embodiment further includes adjustable attachment members which contain fiber optic material to thereby transmit light from a light source within one or both earpiece to each LCD backlight. Such adjustable attachments may also include intermediate light outputs on their outward facing surfaces to thereby visually display either a trademark or other message to be visually communicated from the system user.

The sixth embodiment also includes a stamped plastic compound fresnel binary lens configuration which provides both a wide angle and a close-up magnifying capability.

The sixth embodiment additionally includes a light source within at least one of the earpiece to illuminate a LCD backlight, the light source having selectable color temperatures and light frequencies.

The sixth embodiment further includes a fiber optic signal umbilical between the left and right earpiece.

The sixth embodiment of the head mounted sensory interface additionally includes a flexible belt clip for an infrared (IR) transceiver, wherein the belt clip utilizes a serrated edge and a wire structure to reduce slip.

The user stimuli module, in a preferred embodiment, includes components for enhanced tactile input. A three dimensional chamber is adapted to simulate gross environmental conditions such as smells, sonic rumbling, variable temperature and variable wind velocity. The chamber is equipped with a rectangular matrix of rods, which can be arranged with their longitudinal axis perpendicular to the chamber wall, or in a stand alone unit inside the chamber. The rods are electromechanically manipulated to generate shapes and textures for interaction with the system user. In another embodiment, the user is provided with boot shaving bladders which can be inflated and deflated to change the user's perception of the chamber surface. In the preferred embodiment, the chamber is equipped with a variable resistance treadmill.

Additionally, in the preferred embodiment at least one repeater is mounted on the inner surface of the chamber to thereby transfer signals between the IR transceiver of the head mounted sensory interface and the primary control module.

BRIEF DESCRIPTION OF THE FIGURES

FIG. 22(a) is a perspective view of a portion of the head mounted sensory interface detailing the structure of light transmission components.

FIG. 22(b) is a schematic perspective view of a second embodiment of the liquid crystal display shown in FIG. 22(a).

FIG. 23(a) is a perspective view of a third alternative embodiment of the liquid crystal display shown in FIG. 22(a).

FIG. 23(b) is a perspective view of a fourth alternative embodiment of the liquid crystal display shown in FIG. 22(a).

FIG. 24 is a perspective view of a user adjustment control of the head mounted sensory interface.

FIG. 25(a) is a side elevation view of the head mounted sensory interface, mounted on a system user and selected to operate in a pass-through mode.

FIG. 25(b) is a side elevation view of an alternative embodiment of mounted sensory interface, mounted on a system user and selected to operate in a pass-through mode.

FIG. 27(a) is a fragmentary side elevation view of a first embodiment of a coaxial cable to ribbon interface.

FIG. 27(b) is a partially enlarged fragmentary side elevation view of the embodiment shown in FIG. 27(a).

FIG. 27(c) is a fragmentary side elevation view of second embodiment of a coaxial cable to ribbon connector interface.

DETAILED DESCRIPTION OF THE INVENTION

Figure 1:
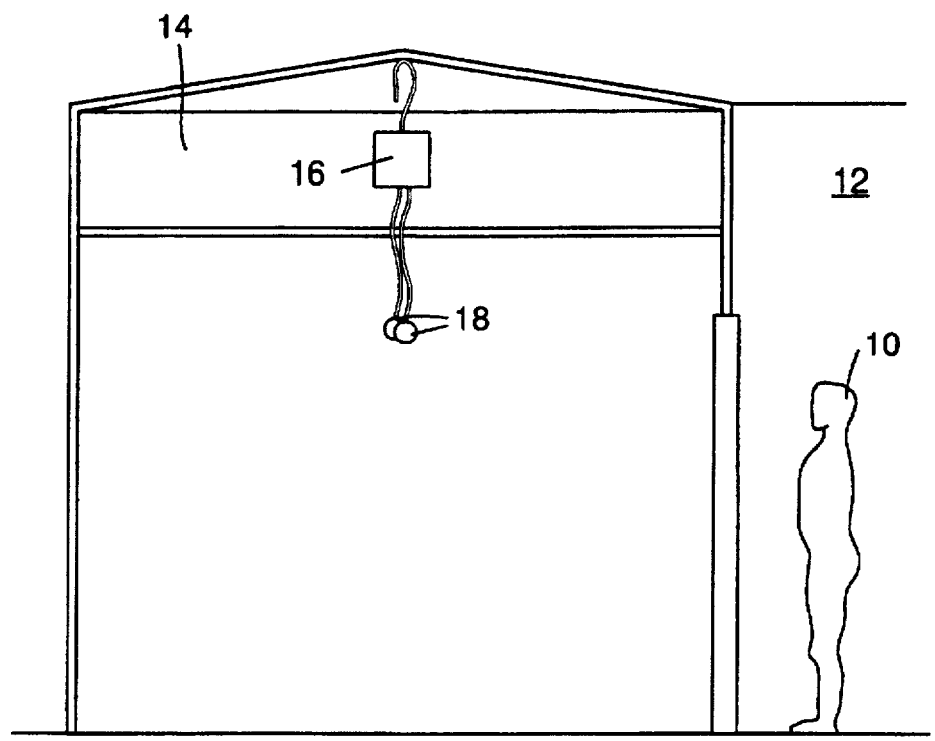
FIG. 1 is an elevation view of one embodiment of the user stimuli module of the present invention.

The present invention has applications in resource conservation, e.g., solicitation by non-profit organizations and foundations, research groups, scientific community or university related institutions for funding and advance support from potential contributors. For example, demonstrations involving ozone depletion, the effects of rain forest depletion on water and air quality control, reforestation concerns, etc. could be generated for fundraising purposes.

Additionally, endangered species and wildlife programs could be developed. The technology could be applied for evaluation studies of animal migration and habit patterns without the danger associated with actual field studies.

The system may be applied to study industrial systems for the design of recycling, waste disposal management and hazardous waste handling apparatus.

Synthesized environments may be applied in the procedure of adoption, permitting potential parents and children to preview the situation.

The system has unlimited direct medical applications, e.g., in the training of surgeons, nurses and other staff, in rehabilitation programs for the disabled, handicapped and substance addicted patients.

Unlimited educational applications in geography, mathematics, physics, health education and many other subject areas are possible.

There are law enforcement applications of this system in solving crimes by reenactment of events, securing witnesses and protecting their identities. The system can be used in the training mode as well.

Artistic applications of the three dimensional synthesized models to two dimensional surfaces is contemplated.

Each of these diverse applications of the system is facilitated by the creation of a set of data specific to the desired application at a time prior to the actual user interactive session. In other words, before the user actually interacts with the synthesized and processed environment, there is a selection by the user of the environment in which the interaction is to take place. So, e.g., if the user wanted to create and interact with a "nature" environment such as a beach, the user would select that environment, and the system technicians would then generate a series of data files which would contain the information necessary to generate and process the images, sounds, smells and tactile stimulations which correspond to the chosen beach environment. This initial pre-interactive data development session cuts down on the number of computations which must be made at the time of the actual user interactive session, by presegregation of the data required for a particular application from the larger system database.

The present invention is able to provide a fully integrated synthetic output by a programming technique known as cascade programming. According to this technique, each of the sensory outputs (sound, smell, touch) is tied to the visual image data associated with that sound, smell and touch so that a number of visual images can be tied together to create a scene, while simultaneously all of the associated sensory perceptions associated with those visual images are easily integrated into the total scene.

The present invention comprises six basic modules: data storage and retrieval module, user sensor module, environmental modeling module, user stimuli module, primary control module and in-system communications module. There are many different system models which practice the present invention through these six modules, beginning with the low end model which is essentially configured like a personal computer workstation, through the upper end auditorium-sized, synthesized environment outputs. All of these models contain the six modules, but each model has different capacity depending upon the output demands of the application. The claims appended hereto are intended to generically cover the system having six modules, without regard to the particular model into which these modules are incorporated.

In describing these six functionally-defined modules, it is sometimes the case that the functional modules are not actually discrete hardware units. For example, the data storage and retrieval module, the environmental modeling module and the primary control module share common hardware.

Figure 2:
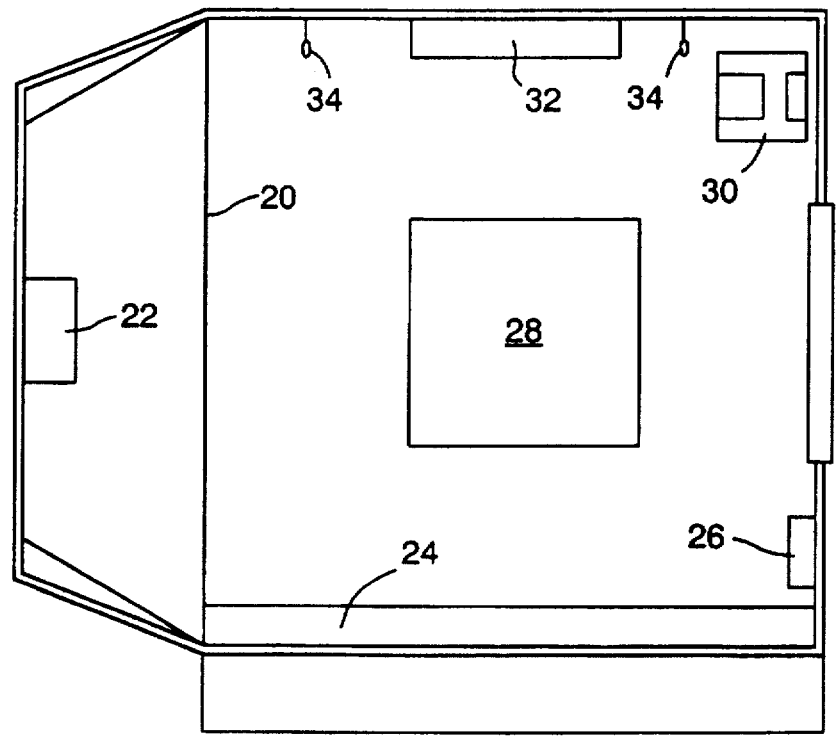
FIG. 2 is a plan view of an embodiment of the user stimuli module of the present invention containing additional stimuli apparatus.

FIG. 1 shows an elevation view of one embodiment of the user stimuli module, and FIG. 2 shows a plan view of a three dimensional chamber in which user stimuli components have been deployed. The purpose of these figures is to show the breadth of anticipated user stimuli modes which are generated by the instant invention.

Referring to FIG. 1, the user 10 prepares for the interactive session with the system in a ready room 12. Depending upon the model or embodiment, the user 10 may be required to don application-specific apparel, including suit, gloves and boots, which transmits user position and movement data to the system, and monitors user health telemetry data.

The user's sensory interaction with the system actually occurs in a chamber 14. This chamber is steel framed and modular, coming in cubic sections of six feet square. The size of the chamber 14 is dictated by the anticipated applications. The walls, ceiling and floor of the chamber 14 are easily adapted to fit a variety of situations. As seen in FIG. 2, the chamber 14 is adequately flexible to permit the installation of various sensory interface devices. The chamber 14 is designed to accept and operate coherent and incoherent biologically safe electromagnetic spectrum radiation devices to determine user position and movement within the three dimensional matrix defined by the chamber.

A high definition color television monitor 16 sometimes referred to as an image pump is suspended from the ceiling of the chamber 14. Headpiece 18 is fiberoptically linked to the monitor 16 to permit the user to receive three dimensional visual and multidimensional aural input from the system. Specific embodiments of the visual input device 18 are more fully described below in a section entitled USER STIMULI MODULE.

Additional stimuli apparatus are seen in FIG. 2. These apparatus are deployed in chamber 14. Rear projection screen 20, and accompanying projector 22, are used either in place of, or in combination with the visual input device 18 shown in FIG. 1 to provide visual input. The chamber 14 is equipped with a device 24 for system output to the user's tactile senses. In this embodiment of the tactile input device, the wall is comprised of a matrix of rods which are electromechanically driven by the system environmental modeling module. The rods are covered with flexible skins to provide continuous surface shape and texture input to the user's biological senses. This tactile mode is carefully controlled by the system, and is set to correspond with the visual and aural imagery which the user is simultaneously experiencing.

A programmer connection block 26 is provided for optional umbilical connections to the primary control module and other system components.

A variable resistance treadmill 28 is positioned in the floor of chamber 14, linked to the system output. Thus treadmill 28 can be used to provide user 10 with a sensation of actually walking through the synthesized and processed environment.

In the corner of chamber 14 is a chair 30 which is adapted to receive the user 10. A user would employ this chair as a stand alone demonstration unit or for tired or infirm system users.

On the chamber wall opposite to the tactile output device 24 is vehicle simulator 32 which is designed to provide the user with the sensation of riding or driving a vehicle through the synthesized environment. The vehicle simulator 32 is adapted to safely pitch and yaw to further enhance the feelings associated with the synthesized environment. Jet air streams 34 are provided in the chamber wall, and controlled by the system to enhance the feeling of movement through the synthesized environment.

With this overview of the levels of environmental modeling which are processed by this system, we can now proceed to describe the individual modules which comprise this system.

I. DATA STORAGE AND RETRIEVAL MODULE

The architectural design of the data storage and retrieval module accommodates large volumes of different types of data while simultaneously providing rapid access to this stored information. The system architecture enables infinite parallel computing and speed step-up capability through the addition of compute servers. Without these capabilities, it is not possible to generate and to continually process a super realistic, synthesized output, as is required in the present invention.

The data storage capacity of this module is obtained by using existing high performance workstations with local mass storage working off of servers. Write once read many (WORM) optical disks and removable CD ROMs offer tremendous storage capability in addition to the local mass storage.

According to a preferred embodiment of the present invention, Silicon Graphics' POWER Series provides 160 MIPS and 28 MFLOPS of sustained performance, up to 1 million Z-buffered 4-sided, Gouraud shaded, Phong lighted, independent polygons per second per unit, and a frame buffer access rate of 8 Million pixels/second.

A. CPU SUBSYSTEM HARDWARE

The fundamental design of Silicon Graphics' POWER Series workstation is a tightly coupled symmetric shared memory multiprocessing architecture. The CPU's in Silicon Graphics' 4D/210, 4D/220, 4D/240, and 4D/280 systems are the MIPS designed RISC processor, the R3000, coupled with a companion R3010 floating point chip. The CPUs in the 4D/120GTX and 4D/120S are the R2000 and its companion R2010 floating point co-processor.

Figure 3:
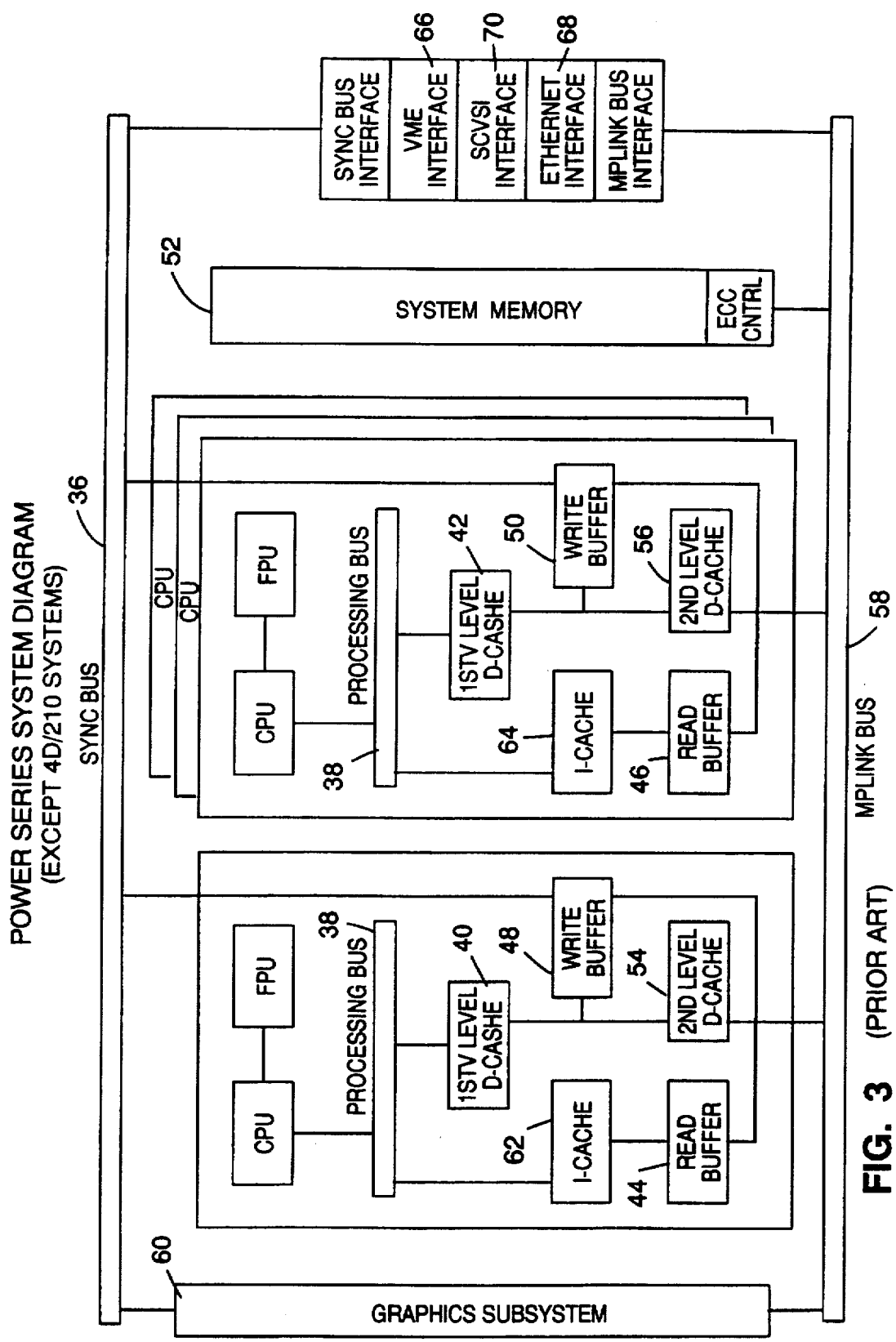
FIG. 3 is a block diagram of the major components of the high performance workstation used in the present invention, labeled PRIOR ART.

FIG. 3 is a block diagram of the major components of the system. Several of the important buses of the system are shown in this diagram. The Sync Bus 36 provides high speed synchronization between the main processors of the system in support of fine grain parallelism. The processor bus 38 allows full speed access (zero wait state) to instructions and data from the individual first level caches of the main processors 40 and 42. The read buffers 44 and 46 and write buffers 48 and 50 allow for the efficient flow of information between the processors and the main memory 52 of the system. The second level data cache 54 and 56 provides the additional bandwidth needed with such high speed processors to support an automatically consistent shared memory computing model. The MPlink Bus 58 supports protocols for consistent data sharing and high speed block data transfers among the processors, main memory, the I/O system, and the graphics subsystem 60.

1. Processor Bus

Each processor provides both an address and a data bus (known as the Processor Bus) that can support sustained data transfers at 8 bytes every clock cycle. Thus an eight processor system has a total processor-to-cache bandwidth of 1600 megabytes per second.

The first level caches 40 and 42, separate instruction and data, are each 64 kilobytes. The instruction caches 62 and 64 are fed by a custom read-buffer that allows extremely fast access to sequential instructions. The data cache drives out through a custom write-buffer that buffers off the MPlink Bus.

These buffers also provide a convenient point for an asynchronous interface between the processors and the MPlink Bus 58. The R3000 processors run at 25 Mhz, asynchronous from the MPlink Bus. Thus the speed of the CPUs in the system can be increased over time without changing the bus or memory timings. This architecture ensures upgrade capability without replacing a large portion of the system.

Each second level cache is 256 kilobytes in size, organized as 16 lines of 16 bytes each. (Second level caches in Silicon Graphics' 4D/120GTX and 4D/120S are 64 kilobytes. The 4D/210S and the 4D/210 GTX do not require a second level cache.) This cache provides block transfer capability for the MPlink Bus and provides the additional bandwidth necessary to keep all individual caches in a consistent state.

The second level data cache 54 and 56 watches every transaction on the MPlink Bus 58 and check for transactions involving data in its data storage. This checking is performed by matching every address on the MPlink Bus 58 with addresses in the tag storage sections of second level data cache 54 and 56. The first level data caches 40 and 42 are always a subset of the second level data caches 54 and 56 so data consistency is guaranteed.

In addition, since all the caches are physical address caches rather than virtual address caches, there are no aliasing problems caused by mapping different virtual addresses to the same physical address. The difficult system level issues that arise when dealing with multiple virtual address caches are not present in this system.

2. The Sync Bus

The Sync Bus 36 is designed for the synchronization need of a multiprocessor supporting efficient fine-grained parallelism. It is implemented as a proprietary Silicon Graphics VLSI part. The goal is for a single application to be able to make efficient use of parallel processors even at the individual loop level, in addition to the kinds of larger-grained parallelism found in many system simulation applications and the even larger-grained parallelism found in the process structure of UNIX™ system.

The Sync Bus 36 provides 65,000 individual test-and-set variables. These variables are in a special part of the physical address space. They are addressed as memory and can be allocated to individual applications by the operating system. They are arranged 64 to a page and can be mapped into the virtual address space of an application. The operating system itself makes use of them to provide very fine grained locks for the control variables of the operating system.

The operating system is thus a very parallel, fully symmetric multiprocessing operating system. In other words, the Silicon Graphics version of UNIX V.3 is a well developed parallel processing application on the POWER Series whose speed demonstrates the power of this approach to high speed computing.

The Sync Bus 36 provides for the distribution of interrupts from one processor to another, or from the I/O system to appropriate processors. The flexibility of the interrupt distribution system means that the operating system can provide scheduling algorithms that support the power of private caches rather than disrupt it.

3. The MPlink Bus

The MPlink Bus 58 is a pipelined, block transfer bus that supports the cache consistency protocol as well as providing 64 megabytes of sustained data bandwidth between the processors, memory, I/O system, and the graphics subsystem. Because the Sync Bus 36 provides for efficient synchronization between processors, the cache consistency protocol is designed to support efficient data sharing between processors. If a cache consistency protocol had to support synchronization as well as sharing, a compromise in the efficiency of the data sharing protocol would be necessary to improve the efficiency of the synchronization operations. With separate buses for each of these separate functions, each bus can be designed for optimal performance without compromise.

The cache consistency protocol used is sometimes called the Illinois protocol. Each second level data cache maintains the state values for each cache line. A line can be in one of four states: invalid, private read, shared read, or private write. If a processor writes into a shared read line, the processor must first invalidate other copies of that cache line before the write can be completed. Simultaneous writes into a shared read line by several processors will result in write misses in all the processors except the one which successfully acquired the MPlink Bus and issued an invalidate operation on it. In addition, any synchronization operation performed by a processor on the Sync Bus must not complete until all pending write activity by that processor is complete.

With these simple rules enforced by the hardware protocols of the Sync Bus and the MPlink Bus, efficient synchronization and data sharing are achieved with a simple shared memory model of parallel processing. The only data not visible to any processor are the data in another processor's registers. These sorts of invisible data are handled by the usual safeguards in modern optimizing compilers.

The physical structure of the MPlink Bus 58 is 32 address lines and 64 data lines. An MPlink Bus transaction is six cycles in length although the last two data transfer cycles can overlap with the first two cycles of the next transaction, resulting in a sustainable data transfer rate of 64 megabytes per second in a very economical configuration. New data arrives in the last two cycles. Old data from a swapped cache line is carried in the middle two cycles. Addresses are transferred in the first two cycles. Bus arbitration is pipelined and doesn't add to the cycle cost of transactions.

4. I/O Buses

Silicon Graphics' POWERpath™ architecture incorporates three separate I/O buses; VME 66, Ethernet 68, and SCSI (Small Computer System Interface) 70. These buses operate independently to maximize the I/O throughput of the total system. The VME bus 66 is supported via a proprietary SGI chip (DMAP) as a full functioning, full performance VME interface. VME support includes double and triple high Eurocard formats as bus masters and block mode transfer. The SCSI bus 70 provides a low cost, standard interface for disk and tape. The built-in Ethernet 68 provides access to TCP/IP and DECnet™ networks.

Silicon Graphics' IRIX™ kernal is designed to operate a symmetric shared memory multiprocessor efficiently and reliably. This is accomplished through a software architecture which allows each processor to independently execute kernal code. Independent execution allows full use of each processor by the process which is executing on it. Kernal data structures are protected via locks and semaphores, which allows data structures and I/O paths to be shared and used in parallel.

B. LOW LEVEL SYNCHRONIZATION

Low level synchronization is achieved through hardware-supported spinlocks. Each spinlock provides atomic access to a single-bit flag which indicates ownership of a resource.

If the lock is held by one processor, other processors will busy-wait, looping on the lock until it is freed by an owning processor. This form of synchronization is very useful when the waiting time will be short, typically less than the time it would take to switch contents.

If a resource is to be locked for a longer period of time, a semaphore is used instead. The semaphore queues a process for access to a resource and provides for the process to be unblocked when the owning process releases the resource.

C. DATA STRUCTURE ACCESS

All shared kernal data structures, such as inodes, buffers, or process table entries, are protected via some form of lock. This allows multiple processors to access the data structure in parallel without interference. This locking has been fine-tuned through-out the system. The use and format of shared data structures has been optimized to eliminate or minimize the amount of spinlocking required.

The key limiter of performance in a multiprocessor kernal is the contention that may occur for data structures. A fully configured IRIX™ kernal uses over 4000 spinlocks. Lock and semaphore metering are used to insure that these synchronization utilities are effectively utilized.

D. SELF-SCHEDULING PROCESSORS

The kernal maintains a single run queue for all processes. Each processor is self-scheduling. When a process blocks, that processor can immediately search the run queue for new work and dispatch it without interaction with other processors. Each processor is capable of executing any process which might be runnable, providing fast response and automatic workload balancing.

E. I/O HANDLING

Figure 4:
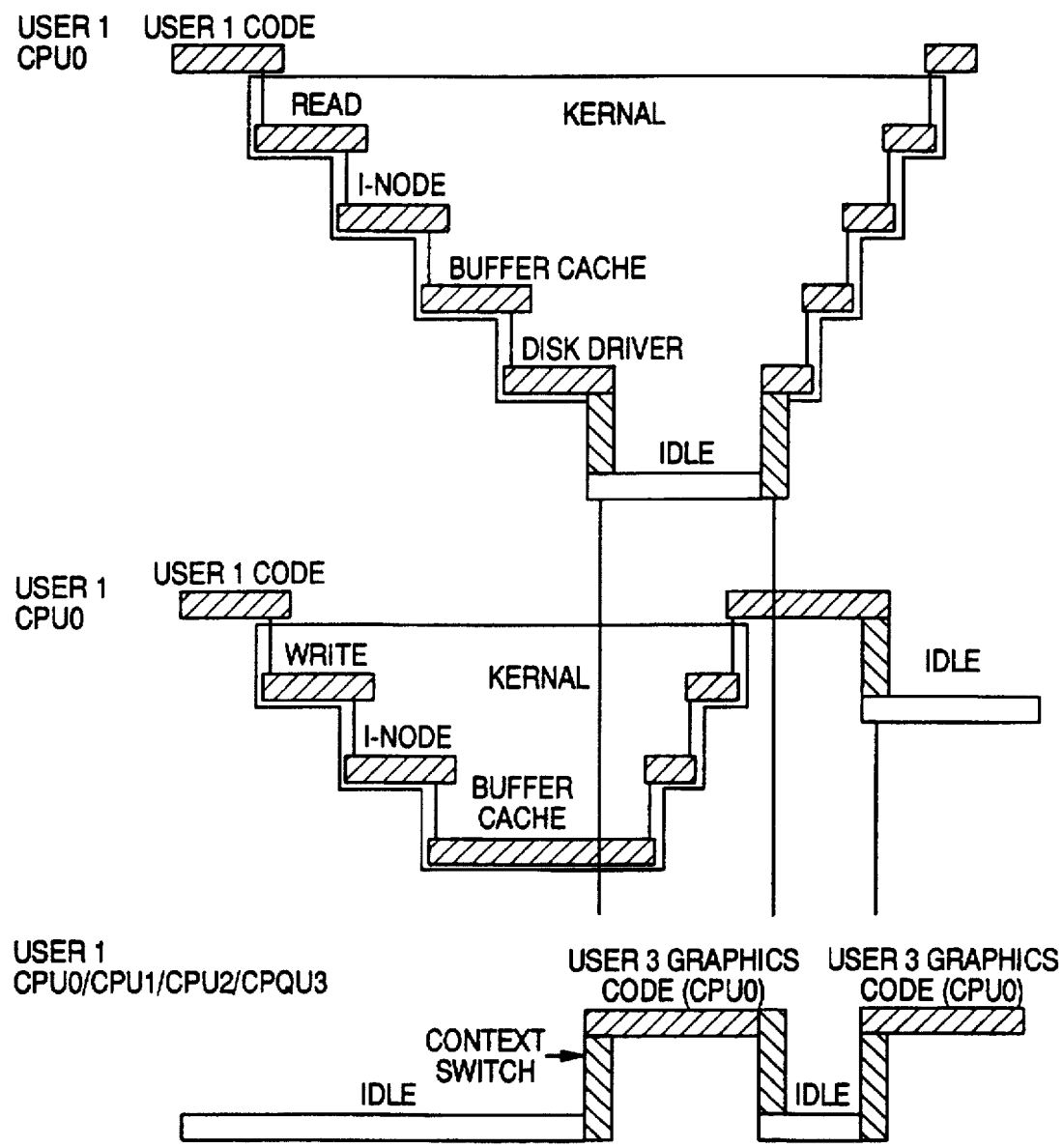
FIG. 4 is a block diagram of the input/output subsystem of the kernal of the high performance workstation, labeled PRIOR ART.

The I/O subsystem of the kernal 72 (shown in FIG. 4, labelled Prior Art) is constructed to allow each processor to independently access the drivers, such as the disk drivers, are fully parallelized, resulting in higher I/O throughput. A transparent driver locking scheme is incorporated to enhance portability of existing drivers.

F. REAL-TIME PERFORMANCE FEATURES

The trap and system call handling paths 74 in the kernal have been highly optimized. Exception condition handling is optimized for the no-exception case, unlike most other UNIX based systems. Self-scheduling processors provide an additional level of response, since a processor can be dispatched to handle an event more quickly.

The system run queue has been reorganized as a sorted list of processes based on process priority. This provides O(1) algorithmic performance for dispatching processes, which is extremely important in a self-scheduling system where multiple processors may be accessing the run queue simultaneously. Normal UNIX™ scheduling is O(n), where n is the number of runnable processes.

G. PARALLEL PROGRAMMING SUPPORT

The kernal supports parallel programming by providing a low-level resource shared model. Parallel programming is aided by getting the operating system out of the way and allowing processes to synchronize independently of the kernal. System calls are expensive in any system, and should be avoided if the programmer desires the best performance possible from his application.

The IRIX™ kernal introduces a new programming paradigm similar to threads or lightweight processes, with little of the additional programming burden caused by these schemes. This paradigm, called process share groups ("Beyond Threads: Resource Sharing in UNIX," Winter 1987 USENIX Conference), allows a process to share many of its resources, such as the virtual memory address space.

file descriptors, user and group IDs, working and root directory and others. Within the kernal, virtual address sharing is accomplished by sharing the kernal memory management structures between the processes, and providing simple locking for those structures.

Since other resources may be shared as well, it is possible to construct many sophisticated applications, such as network servers or asynchronous I/O handlers, with a minimum of effort.

H. TRANSLATION LOOKASIDE BUFFER SYNCHRONIZATION

The translation lookaside buffer (TLB) is a cache of virtual to physical address translations that is used by the processor to speed virtual memory handling. This cache is managed entirely by software. Hard synchronization is costly in terms of both dollars and performance. IRIX™ manages all TLBs in all the processors as a distributed resource. ("Translation Lookaside Buffer Management in a Multiprocessor System," Winter 1987 USENIX Conference Proceedings). TLB flushing is minimized through a sophisticated algorithm. The usual, low performance solution of TLB flushing on context switch is totally avoided.

I. GRAPHICS SUBSYSTEM SUPPORT

Support of Silicon Graphics' GTX graphics subsystem is integrated into the IRIX multiprocessor kernal. The graphics subsystem can be driven from any processor on demand. Access to the graphics pipe is achieved through direct mapping of the pipe to the use's address space. Management of graphics context switching is handled fully by the kernal.

The graphics subsystem is capable of direct DMA to the frame buffer. This is supported in the kernal through direct mapping of the user's buffer for DMA operations, which avoids all data copying.

J. GRAPHICS HARDWARE ARCHITECTURE

Figure 5A:
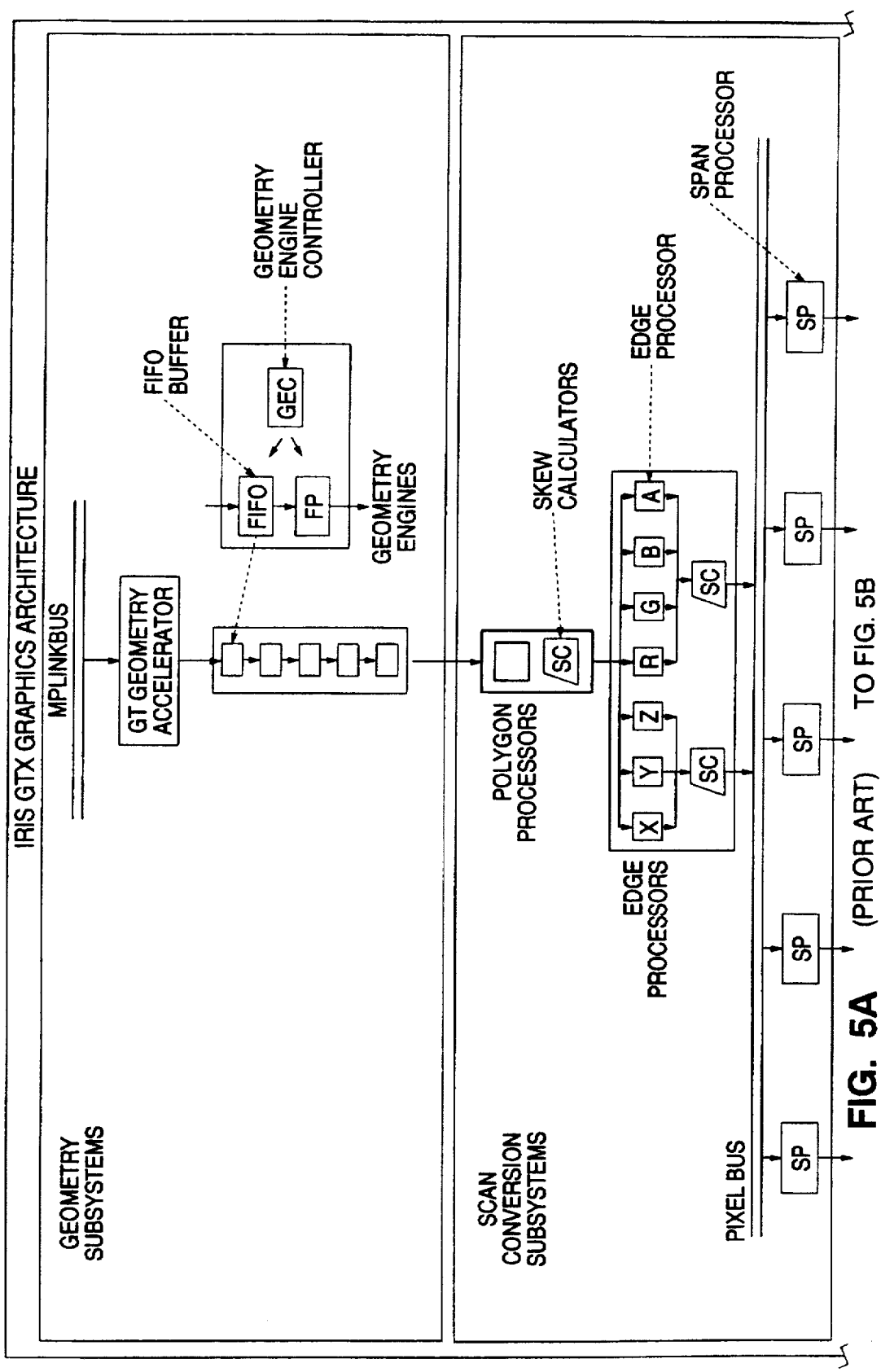
FIG. 5 is a block diagram of the architecture of the graphics subsystem of the high performance workstation, labeled PRIOR ART.
Figure 5B:
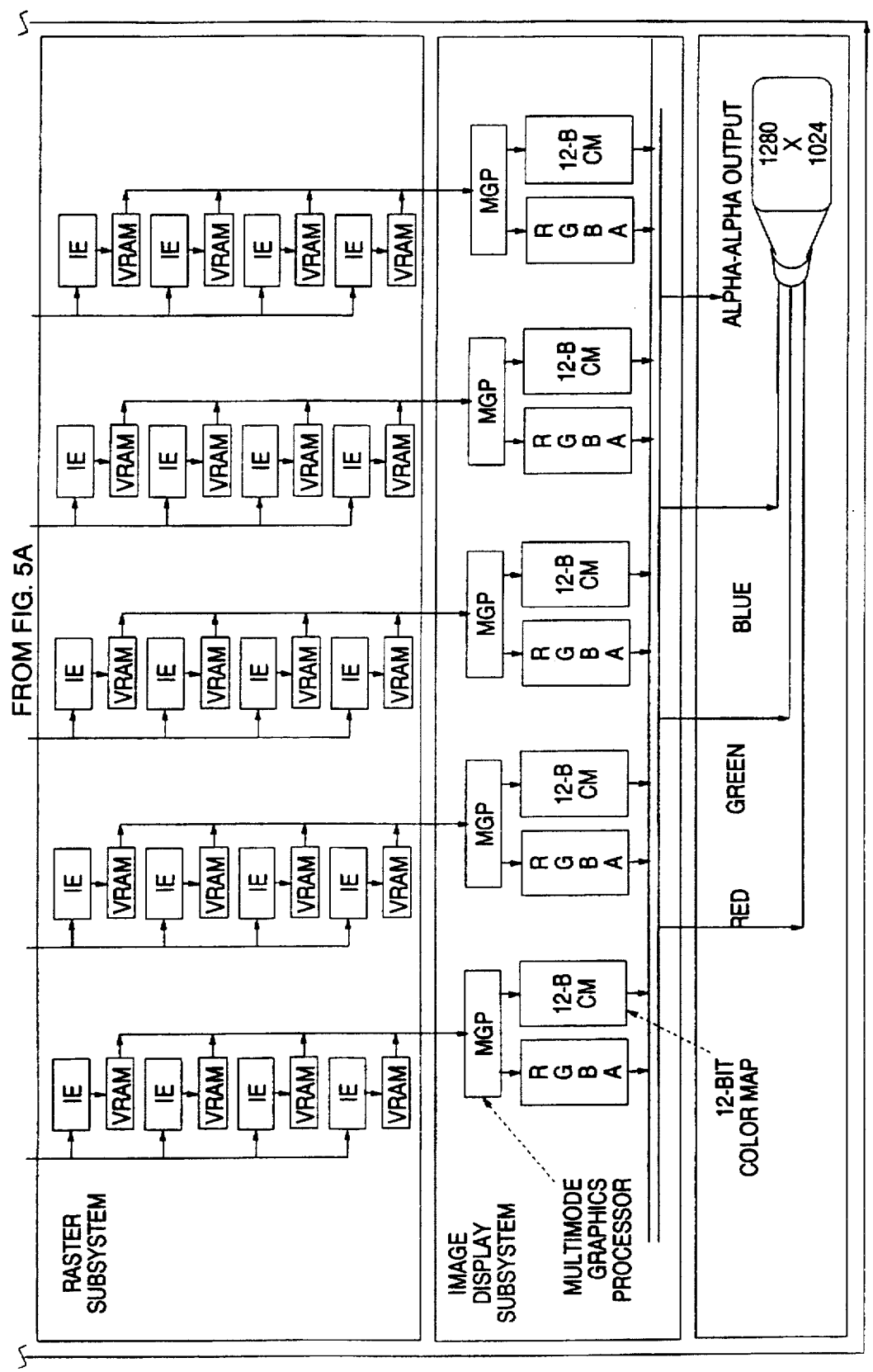

Through its use of parallel processing technology and 50 proprietary graphics processors, Silicon Graphics' GTX architecture (shown in FIG. 5, labelled Prior Art) allows users to interact with complex 3-dimensional images in real-time, under direct input device control.

Graphics data are processed by four pipelined graphics subsystems before being displayed on the screen:

Geometry Subsystem 76

Scan Conversion Subsystem 78

Raster Subsystem 80

Display Subsystem 82

The Geometry Subsystem 76 converts the 32-bit or 64-bit graphical data to screen space data. The Scan Conversion Subsystem 78 then breaks down points, lines and polygons into pixel data which are then fed to the Raster Subsystem 80, where the Z-buffer removes the hidden surfaces. The Raster Subsystem 80 also performs various blending functions on a pixel-by-pixel basis as the pixels are written to the image bit-planes, or frame buffer. The Display Subsystem 82 then displays the contents of the frame buffer on the color monitor.

1. Geometry Subsystem

The Geometry Subsystem 76 is connected to the CPU subsystem by the 64-bit MPlink Bus 84. This subsystem performs the specified transformations and lighting computations on the world coordinate geometric data before sending the screen-space data to the Scan Conversion Subsystem 78. The graphics processing in the Geometry Subsystem 76 is performed in the Geometry Pipeline™, a serial configuration of proprietary processors capable of delivering 100 million floating point operations per second (MFLOPS) of graphics processing power.

2. Geometry Pipeline

The Geometry Pipelines™ processes a stream of high level graphics commands with five Geometry Engines (GEs) 86, 88, 90, 92 and 94, each of which is a proprietary processor capable of 20 million floating point operations per second (MFLOPS). Every Geometry Engine in the pipeline includes local memory for loadable microcode and data.

The first Geometry Engine 86 uses a 4×4 coordinate matrix stack to rotate, translate and scale two dimensional and three dimensional homogeneous coordinates, a 3×3 normal matrix stack to transform surface normals The second Geometry Engine 88 performs lighting calculations. It supports up to eight point-source lights; material specifications including ambient, diffuse and specular reflectance; and lighting model information. The result of the lighting calculation is either a quad set of four 8-bit red, green, blue and alpha values (in RGB mode) or a single 12-bit color index (in color index mode).

The third Geometry Engine 90 clips coordinates to a 6-plane bounding box. A fast accept/reject clip-checking algorithm eliminates the need for complex clipping calculations in most cases. When complex clipping is required, the affected vertices are forwarded to the fourth Geometry Engine 92, which performs the actual clipping calculation. The fourth Geometry Engine 92 also performs perspective division.

The fifth Geometry Engine 94 calculates depth-cued color values and clips color components to a maximum value before converting all coordinates to screen space integers.

3. Scan Conversion Subsystem

Screen coordinates sent from the Geometry Pipeline™ to the Scan Conversion Subsystem 78 specify the vertices of points, lines and polygons. The Scan Conversion Subsystem performs the calculations required to reduce vertex data to individual pixels. Each pixel is assigned an X,Y and Z coordinate and an R, G, B and Alpha value. Color data are always linearly interpolated between vertices and between the edges of polygons.

The task of scan-converting polygons in three stages, each performed by one of three specialized processors:

Polygon Processor 96

Edge Processor 98

Span Processors 100

The Polygon Processor 96 sorts the incoming vertices of polygons from left to right. The stored vertices are then decomposed into the vertices of trapezoids before being used to calculate slopes and Z, R, G, B and alpha values.

The Edge Processor 98 uses the vertex and slope information to compute X, Y, and Z coordinates and color values for each pixel that lies between the two vertices. The results of these calculations are used by the Edge Processor 98 to calculate Z coordinates and color values for every pixel along each vertical span of 1024 pixels.

The Edge Processor 98 passes span coordinates and slopes to one of five parallel span processors 100. Span Processor 0 manages spans 0, 5, 10, etc. Span Processor 1 manages spans 1, 6, 11, etc. Since spans generated from a single polygon are always adjacent, the span processing load is evenly distributed across the five processors.

4. Raster Subsystem

The Raster Subsystem 80 contains 20 Image Engines 102–140, each of which controls 1/20th of the pixels on the screen in a an interleaved pattern of 2-dimensional sections. A single Image Engine owns 65,536 of the screen pixels; each pixel is associated with 96 bits of data. Each pixel's 96 bits are organized as follows:

Image bit-planes: 32 bits of R, G, B, and optional Alpha Information per buffer (2 buffers); supports either double-buffered 32-bit color (R, G, B and optional Alpha) or double-buffered 12-bit color index modes of operation.

Depth planes: 24 bit Z-buffer

Overlay/Underlay planes: 4 bits

Window planes: 4 bits

An additional feature of the Raster System 80 is the fast pixel read and write rate. The pixel write rate is 16 million pixels per second in image mode. This allows the hardware to implement a real-time pan and zoom capability by reading pixels from the frame buffer, replicating them, and writing them back to the frame buffer.

5. Display Subsystem

Five Multimode Graphics Processors (MGPs) 142, 144, 146, 148 and 150 concurrently read the contents of the Image and Window Planes. These MGPs allow simultaneous display of up to 64 different windows in various color modes. This allows users to display both static and dynamic images without having to consider the underlying color representation scheme.

The GTX graphics subsystem displays multiple images simultaneously, in an overlapping window environment, in single buffered RGB, double buffered RGB, single buffered color-index and double buffered color-index color modes.

For more information on the graphics architecture, see Silicon Graphics' "IRIS GT Graphics Architecture: A Technical Report.")

K. GRAPHICS SYSTEM SOFTWARE ARCHITECTURE

Silicon Graphics' IRIX™ graphics system software manages the graphics subsystems, as well as providing a high-speed path for delivery of graphics data to the subsystem.

1. Graphics DMA

To achieve the graphics performance possible with the GTX, it is necessary that an order of magnitude more data be delivered to the graphics system in the same amount of time. One key element in delivering this data is optimization of the graphics hardware to accept vertices as the basic drawing primitive. Taken together, a set of vertices describes a polygon that the hardware draws and fills as appropriate. Each vertex may have several pieces of information, such as location, color and normals of lighting.

Each piece of information can be delivered to the graphics subsystem through a DMA transaction, which allows overlap between moving the data and setting up the next vertex. Each transaction typically moves four 32-bit words of data. These four words are enough to describe the location (<x,y,z,w>), or the color (<r,g,b,a>).

This DMA transaction is initiated by the processor through a single load instruction to prime the DMA engine, followed by a store instruction to the address of the vertex in user virtual memory. This triggers the DMA transaction immediately. This allows the user total freedom in placement of graphics data in his address space. All this occurs within the Graphics Library, transparent to the user application, requiring no special coding techniques.

2. Pipe Access and Feedback Areas

The graphics pipe is mapped into the user address space, along with a separate portion of memory called the feedback area. The pipe can thus be accessed either directly (for short commands) or indirectly through graphics DMA (for high speed drawing). In addition, each process using graphics has a private communication area with the graphics mapped into its address space. This feedback area is used to return results of queries or other interaction with the graphics subsystem.

3. Graphics Context Switching

The graphics subsystem supports up to 16 contexts in parallel within the graphics subsystem. Additional contexts may be managed in a "virtual context" manner by swapping an entire graphics hardware context as needed.

As the kernel context switches among processes using the graphics hardware it informs the subsystem of each host context switch, which results in a parallel context switch within the subsystem.

Graphics processes without a current context in the subsystem have the pipe and feedback areas unmapped from their virtual address space. Thus they may continue to run and process data as long as no graphics access is made. If graphics access is attempted, a page fault occurs, the process is blocked, and the window manager informed of the event. The window manager can then schedule the process to a hardware context as desired.

4. Kernel Graphics Management

Many implementations of graphics under UNIX™ treat the graphics subsystem as just another device, and force all management to be done at user level. This approach has severe drawbacks. For instance, heavy context switching between the user level processes and the graphics manager is often seen. This approach makes consistent and integrated graphics support difficult or impossible.

The IRIX™ kernel integrates graphics management into the basic functionality of the kernel. This is not the simple "text output" mode of many primitive graphics subsystems—the GTX graphics subsystem knows how to draw a simple character set on its own. Instead, a sophisticated protocol for controlling graphics operation is built into the kernel. Swapping buffers on vertical retrace, exceptions in the pipe, and other conditions result in interrupts to the host, which are then handled with high level protocols.

L. SIMULTANEOUS ANALYSIS AND GRAPHICS

By combining tightly coupled processors sharing a common memory with fast access to the graphics pipeline, it is possible to support multiple processes using the CPU and graphics subsystems simultaneously. Ownership of the graphics hardware can be allocated between competing processes on a per context switch basis. While one process is accessing the graphics pipe, others can be taking full advantage of the other CPUs and FPUs.

Take, for example, a two process application, one drawing while the other renders the next frame. The analysis is processed by the full power of up to seven CPU/FPU pairs, while another is drawing the previous frame at full speed to the graphics pipe.

M. LEVELS OF PARALLELISM

In order to provide linear throughput increases within multiple processors, it is important to exploit the hardware parallelism in the system. In the IRIX™ system, this is accomplished by providing three levels of software parallelism, a multi-threaded kernel, explicit parallelism constructs for user applications, and a data-directed parallelizing FORTRAN compiler.

1. Multi-Threaded Kernel

At the heart of all Silicon Graphics' POWER Series systems is the multi-threaded kernel, which permits multiple processes to be running simultaneously in both User and System space.

As processes become eligible to run, the first available CPU picks up that process and beings to execute it. Which CPU that process was running on previously is immaterial except in so far as the kernel utilizes a cache affinity scheduling algorithm to match processes to their previous CPUs to maximize cache and TLB hit rates.

All CPUs can access the graphics pipe or I/O subsystems simultaneously providing a symmetric rather than a master/slave arrangement. This makes it unnecessary to switch a process from one CPU to another when it accesses an I/O device.

The multi-threaded kernel provides high bandwidth system access. Processes enter the kernel on the CPU they are currently running on, perform the system service, and return. The individual data structures (such as process blocks, inode table, buffer, cache, etc.) are semaphored so that multiple CPUs can be executing the particular code simultaneously. Contention for operating system resources is regulated via the use of spinlocks and semaphores.

2. User Directives

The multi-threaded IRIX kernel provides a seamless way to increase throughput of a multi-user and/or multiple process environment. But it is also desirable to increase the throughput of a single process application.

This is possible using the multi-processing library "limb" which includes support for application level spin locks, semaphores, shared memory, and dynamic allocation. It also includes a full "libc" with the most often used library routines semaphored.

Synchronization is possible between both share group process and unrelated process. This provides a quick way for existing multi-process applications (for instance, an analysis process talking to a display process) to exploit the multiple processor-using the primitives in the "libmp," a shared region can be created between them. If any synchronization is required (over and above a simple producer-consumer queue) spinlocks and semaphores are available. For simple synchronization, shared memory may also be used.

With the new arenamalloc( ) library call, dynamic space may be allocated inside this shared space. Thus existing communication mechanisms such as pipes, sockets, or files can be replaced with a high bandwidth memory messaging scheme.

If the application is a single large process, then the explicit multi-threading afforded via share groups can be used. If a process executes an sproc(2) system call then a share group is formed. Any number of processes/share group members may be created, and each will run on a separate processor (up to the number of processors).

A share group, by virtue of a common address space and file descriptors, can execute parts of an application in parallel. For instance, one part can perform data generation while the other is displaying the data. Synchronization is again performed using either memory, or the libmp spin locks and semaphores. Using libmp, share group members may also request system services, since the library routines such as malloc, perror, and printf have all been semaphored.

3. Parallelizing Compiler The IRIX™ kernel supports a sophisticated program development environment, based on the MIPS compiler suite. Multiple language front ends convert each language to a common intermediate form which is then handled by common tools for optimization and code generation.

The MIPS optimizer provides several levels of optimization. Like other systems, local optimization and pipeline scheduling is performed easily. In addition global optimization and procedure inlining are also supported, allowing the programmer to achieve extremely high performance levels.

Layered on top of the FORTRAN front end is the POWER FORTRAN accelerator. The data flow analyzer is one of the most sophisticated analysis tools available for producing parallelized FORTRAN. Its output is parallelization directives interspersed in the original output file. These are recognized by the FORTRAN front end, which generates appropriate common intermediate code containing parallelization direction. The common code generator then produces parallelized code which takes direct advantage of operating system thread support and hardware locks.

In cases where the automatic analyzer is unable to safely parallelize a piece of code, the user can explicitly add parallelization directives to her code if she knows that the section of code is indeed safe to parallelize. The directives used are the same as the analyzer uses and thus are treated identically in the common processing steps.

A parallel processing library has support for shared address processes, semaphores, spinlocks and barriers. A fully semaphored standard C library completes the software support for the procedure level model of parallelism.

As a result of this strategy, the optimizer can be used directly to further enhance the performance of parallelized code. As technology becomes available to parallelize other languages, they can be added to the compiler suite easily, leveraging off the existing parallel programming support.

N. I/O THROUGHPUT

The hardware interface for the primary I/O—SCSI, Ethernet, and VME—provides a parallel interface to the kernel. Multiple drivers can be talking to the different I/O subsystems at the same time. Interrupts from different devices (including each device on the VME) are routed to different processors so that interrupt servicing is also distributed.

Multiple processor I/O access is combined with state-of-the-art disk controllers to provide control of up to four disks per controller, each with full track caches, overlapped seek optimization, and disk sorting. This combined with the IRIX EFS file system provides up to 2000 Kbytes/sec. per controller through the file system (using SMD disk drives). Even using only a single SCSI disc drive, file system throughput surpasses 1000 Kbytes/Sec.

Networking is supported via an integral Ethernet adapter, access to which is completely independent of access to the VME adapter. The SCSI adapter, useful for cartridge tape and lower speed disks is also independent of other I/O activity.

Devices on the VME bus that don't support page scatter-gather DMA can still be utilized as high speed controllers by using the integral hardware page maps. To further speed reads from an I/O device the hardware detects data in the caches that is going to be made 'stale' by the read request and invalidates it. This eliminates the need for the operating system to do a costly cache flush. Silicon Graphics' IRIX™ operating system is based on AT&T System V UNIX™, Release 3.1. This version of UNIX™ has a substantial set of features to easily support both the programmer and the user. In addition to these features, the following facilities have been added to further enhance the value of the preferred embodiment system.

O. PARALLEL PROGRAMMING SUPPORT

To take full advantage of a multiprocessor, a parallel programming model which is easy to use and powerful is necessary. This is accomplished through several levels of new functionality.

Process share groups provide a lightweight processing facility with all of the advantages of thread-like schemes and little of the burden. A parallelized version of the C library is available for using in a threaded process to insure that commonly used facilities like Standard I/O and malloc( ) are available and work as expected. Arena based memory allocation is supported.

Included in the parallel C library are locking and semaphore primitives which operate without kernel interaction. This avoids performance penalties for invoking kernel facilities. The primitives included debugging support to ease tracking down problems in complex multi-thread applications. In addition, metering is available to determine the usage and contention of semaphores and locks for fine-tuning an application.

P. REAL-TIME PROGRAMMING SUPPORT

Several features of IRIX™ provide support for high-speed interactive and control applications.

Non-degrading priorities provide a method for the programmer to precisely control the priority of his application in relation to other processes on the system. Normal problems associated with the standard UNIX™ scheduling paradigm can be avoided.

High-precision timing is supported through one millisecond accuracy of the time reporting mechanism, as well as being available through a signal-based timer facility based on Berkeley timers.

Fine-grained memory locking allows the programmer to insure that critical code or data is always memory resident.

Mapped files and devices provide the programmer access to files or physical devices as if they were part of the process address space. Complex file manipulation is simplified, and devices can be accessed and managed directly from user level.

Q. BERKELEY FEATURES

Many features of BSD 4.3 are supported in IRIX™. Job control, 4.3 networking facilities, and many Berkeley commands are supported. For the programmer, BSD 4.3 system calls are supported where they do not conflict with System V semantics.

R. LANGUAGE SUPPORT

IRIX™ supports C, FORTRAN 77 with VMS extensions, Pascal, ADA, and PL/1. This support is integrated with the multi-process graphics debugger Edge, which is based on a multi-process version of dbx. This debugger also allows attaching to an arbitrary running process, which is convenient for debugging demons. Many processes may be debugged in a single session, even though they are unrelated.

Returning now to a description of the present invention, and in particular to the data storage and retrieval module of the present invention, the data stored in this module includes image files, aural characteristic files and tactile data files for all natural objects. The module is loaded with image, aural and tactile data for unique items which are specially designed and which are intended to be used in a specific application. For example, a prototype to be modeled by the system user would be considered a unique item in this context. Its unique characteristics would be specially input to the data storage module to permit user investigation of the prototype under the selected environmental conditions. A three dimensional laser scanner which digitizes its output is the most efficient means for data input concerning unique items. Presently, we contemplate a three dimensional scanner and reader which can be aimed at small to forty foot size objects for a vectored three dimensional input of the object's face, or entire surface as the device is moved around the object. It is portable, mounted in a van or other vehicle.

Another category of stored data utilized in the generation of synthesized environments is primitive image basic models. This data file contains basic polygon, fractal and ray trace information which is involved in the computational handling of the stored, generated and processed images. A subcategory of this file would be subprimitive image basics which include pre-processed image data, e.g., pre-computed color and texture data for naturally occurring objects.

Another data category which is used in the processing/computational aspects of generating synthetic environmental modeling output are physics, natural laws and physical properties. The best interfacing model for the physics of light as applied to computer imaging is the Pixar RenderMan interface available from Pixar, San Rafael, Calif. This software package offers primitives for a variety of light sources and conditions that can be easily adapted to graphics programming conventions where speed and object code size are major constraints.

Similar physical behavior/graphics interfaces are used to handle motion and sound. Starting and stopping motion, in-betweening and object deformation upon impact are computed based upon pre-selected parameters once an animation pipeline is established. In the sound dimension, the importance of the physical law and property information would be best understood by the classic example: an automobile horn sound heard from a second automobile moving in the opposite direction. The cumulative impacts of ambient noise, atmosphere, pressure and the Doppler effect on the sound image would have to be defined to create an accurate image in a synthesized output.

Because the system involves radiation from the entire electro-magnetic spectrum, and offers the capability of experimentation with the physics of relativity, customized interfaces for these applications would be needed, as would interfaces to non-Euclidean geometries. These interfaces involve a long-term synthesis of scientific expertise and efficient programming conventions.

A possible alternative to calling pre-defined procedures is to integrate a list-based approach from artificial intelligence into the "C" environment as in AutoLisp to AutoCAD or Borland Prolog into Turbo C.

A modem to publicly accessible science databases permits programmers to draw current physics data for the environment they are creating, during the development session, prior to actual interactive environmental modeling. Reference data for all available computerized physics data is stored in the digital library for call up from a visual menu as the programmer requires data in the computation of specific and general environmental conditions. Wavefront Software (Santa Barbara, Calif.) provides a significant visual physics package useful in this application.

In order to effectively utilize all of this stored data, the data storage and retrieval module of the present invention utilizes data compression software. Raster image data is compressed using hardware with less loss of speed than with software. However, there is a trade off between unrealistic storage demands and compression/decompression times. Software designed for document scanning, and adaptable to the present invention, is available from Optigraphics Corporation, San Diego, Calif.

Fractal raster images may be stored as iterated function system (IFS) codes that achieve compression ratios of 10,000 to 1 or higher as shown by Barnsley and Sloane. Byte January, 1988. An IFS-image synthesizer is needed to accomplish rapid encoding and decoding. Iterated Function Systems, Inc., Atlanta, Ga. provides such a synthesizer. Vector databases, because of their richer primitives and smaller size can most efficiently be handled in software routines such as are found in PKARC, a public domain program similar to the archive compression command and process in MS-DOS, with compression ratios between 2 to 1 and 10 to 1.

These compression methods may be tolerable for mass storage only. Sufficient main memory or virtual main memory may be required to achieve adequate system response to handle entire databases during a system user session.

The data file management system is another important feature of the storage and retrieval module system architecture. A mass memory filing system based on Unix hierarchial conventions and common library classification systems is the simplest and easiest way to begin data file organization. Broad classifications of data subject matter are maintained by emulating the Dewey decimal system, either manually or by machine. Icon tools on workstation platforms are invaluable in providing user interface that saves substantial data input effort. More importantly, this configuration places the full point-and-click functionality of the entire system in the hands of the system user with a synthetic workstation operated primarily by means of the vision system and tactile modules discussed below.

HyperCard on the Mac is an excellent basic alternative for data file management because it interactively handles many different kinds of data with links to other material all along the way during a session. It utilizes hardware and software integration which might require substantial programming effort, but might also result in a satisfactory tradeoff because of lowered platform costs and because of a potential increase acceptance of this technology by non-programmer developers, particularly in education. Assuming support of high-quality imaging and sound by means of add-in boards on the Mac or high-speed connections to peripherals, the generality of the microcomputer systems represents the clearest opportunity for second sourcing of fundamental subject matter in the target system. Another possibility along these lines is the hypertext model from Project Xanadu, San Antonio, Tex. Its founder, Theodor H. Nelson described in Byte, January 1988, a system of text, graphics or other functions, and maintaining the links of original authorship and subsequent variations.

A fundamental principle behind reasonable data file management is that the known elements needed for a particular system user session are laid out in primary system memory prior to a user session. The result is that the system is not required to access the entire system data file library to locate and to process the data necessary for the user session.

Several other subsystems are included in the data retrieval and storage module. A stereoscopy dualizing computer is part of environmental modeling module output as described below. It activates the dual image overlay operation on all visual image data prior to its contact with the single imagepump or super-CRT. This component detects the vectors of a three dimensional object, and then generates two dimensional outputs from slightly different views. This component is stored and processed in the high performance workstation as described above. Stereographics (San Rafael, Calif.) and Tectronix provide sequential opto-mechanical shutter devices for use with monitors to obtain three dimensional images from offset signals.

An automatic back up data storage system for the data storage and retrieval module of the present invention is provided to avoid inadvertent loss of data. In the preferred embodiment, we use optical disks to back up the data on a regular five minute interval basis. Electronic bubble memory is acceptable for this automatic back up application.

Another important sub-system component of the data storage and retrieval module of the present invention is a positioning and movement standardized data software which receives ACSII data and converted position and movement scan vector data. The purpose of this sub-system is to convert all user position and movement scan data (as described below in USER SENSOR MODULE) into a single file format. Presently, we translate all relevant data to vector codes in ASCII in our own file format called VECT.XFR. The program looks for vector data and writes them in consecutive spaces in the file with identification codes for each group.

Each sensor has an existing address, known by the system, and known relative to its adjacency to the next sensor address. When all of the sensors are moved around in the sensing environment, their position vectors are seen to move by the computer and on an image check monitor. The adjacency addressing of the sensors helps to confirm the overall position data because the software and system know the human shape ("Model" in FIG. 6) is capable of doing and can double check its assumptions relative to default guidelines.

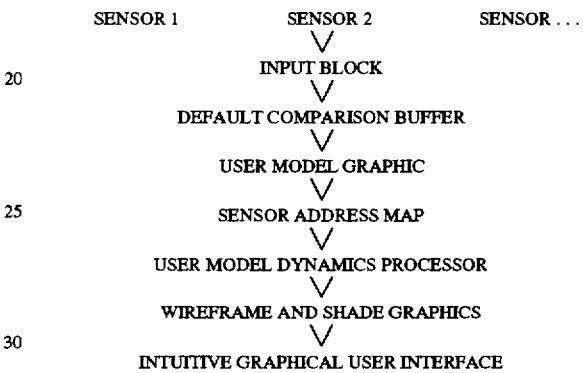

Another subsystem which forms part of the data storage and retrieval module of the present invention is image pre-design data processing array. This involves writing information into the system for a pre-selected environment, part of the pre-session development work. This feature uses the system's existing libraries to pull up the required data and to store it in an immediately accessible mode. All of the user session elements can be pre-designed, as in an architectural walkthrough. It is possible, however, to begin a user session without a set up, as in a "paint your own universe" application.

The images are pre-designed using graphics primitives from Wavefront's ADVANCED VISUALIZER™, or using our own three dimensional vector shaded image software. Vector points and scanned-in data are continuously detailed out by this component to a photo realistic image, or a compressed, archived image for library storage. The pre-designed images can be stored on hard drives, WORM drives and tape cartridges. Pre-designed images that are being set-in to first stage use-ready mode are placed on the system hard drives. The workstation storage systems previously described, and magnetic bubble memories would be the desired storage modes. The data is stored off the workstation in our own file format, and translated back into the workstation format as required. In the preferred embodiment, we use three dimensional image modeling and animation structure software, ADVANCE VISUALIZER™, which is available from Wavefront (Santa Barbara, Calif.). Since the image files are processed in accordance with the cascade programming software, image files are able to cue other system occurrences. The data storage and retrieval module of the present invention includes an interactive through-put image and sound processor. This processor is designed to place the user's body parts into the generated images when viewed by the user through the visual input device. In other words, the user will be able to see her hand in the visual output if her hand belongs in the generated image. This software is event driven with a graphic user interface. It uses human form vector models which have been "tailored" to the user. Wavefront Software provides graphics primitives for this application. We have developed our own three dimensional vector shaded image software. This user-mirror body is imaged by the vector and shading system to appear in perspective, relative to all viewed environment vectors. Hidden line removal is supplied by the software to make background image elements drop out of view in the same space that the user-mirror body, or parts, occupy. The user position and movement sensors described below provides data which commands this component to move the mirror-body in the same manner that the user body moves. The software vector checks everything in the image to make sure that one element stops when it bumps into something unless that element or elements have been set to transparent. This component also looks at the cascade program data sequence and operates sound sequences that are appropriate to the environment at any given time relative to the master user-mirror vectors and primary cascade data.

Figure 6:
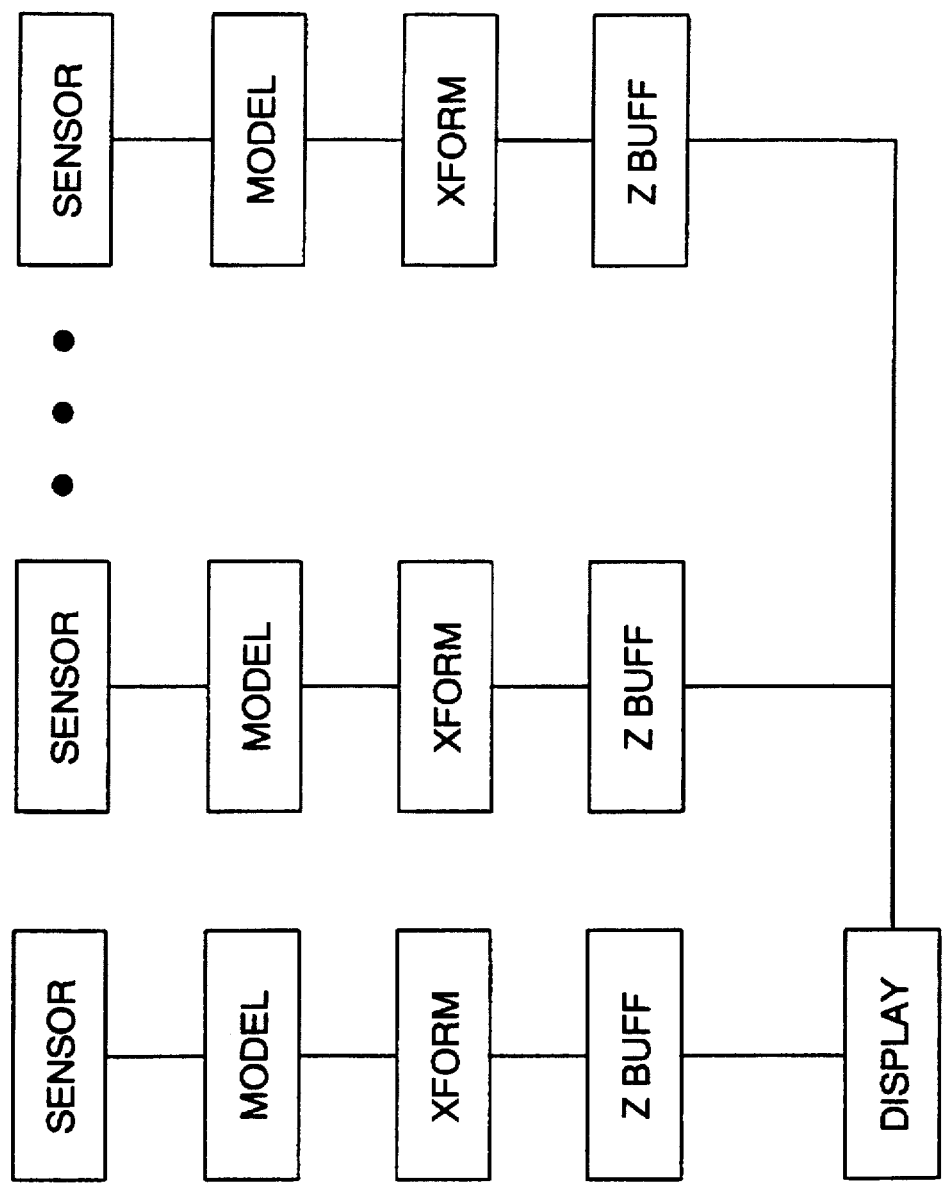
FIG. 6 is a block diagram of an interactive through-put image and sound processor according to the present invention.

FIG. 6 shows a block diagram of the interactive throughput image and sound processor. Sensors 152, 154 and 156 (more fully described below in USER SENSOR MODULE) are used to obtain information about the user's body position and movement within a three dimensional matrix. This data is then used to create the use-mirror body by vector and shading systems, model blocks 158, 160 and 162, and to ensure that the modeled user-mirror body moves in the same manner that the sensed user body moves. This result is then transformed (Blocks 164, 166 and 168) to data which can be used to generate the appropriate visual images (as well as the cascade-related sound and tactile images) during the user session. This transformed data are stored in Z-buffers 170, 172 and 174 where it will be combined with the other synthesized environment elements for display to the system user 176.

Figure 7:
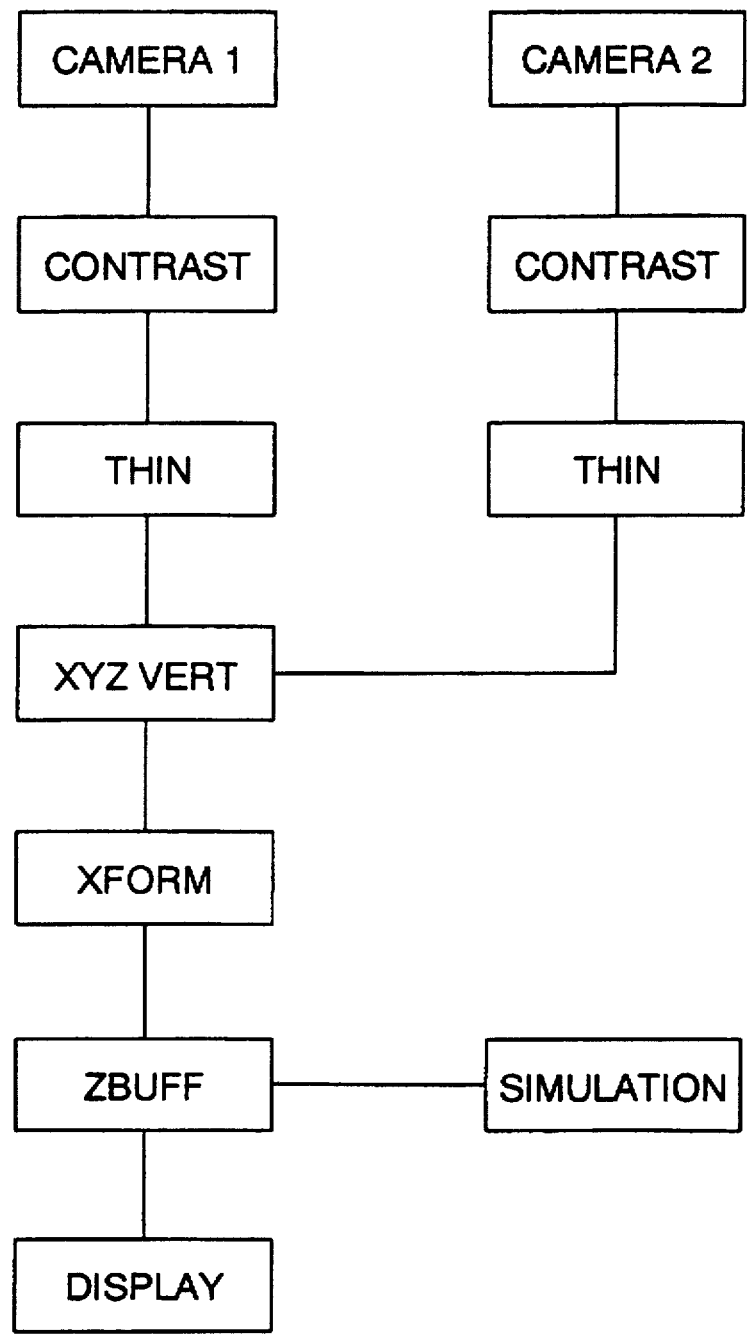
FIG. 7 is a block diagram of an interactive through-put image and sound processor utilizing video camera data collection techniques.

FIG. 7 is a block diagram of a slightly different embodiment. The difference is that the video cameras 178 and 180 are used to determine user position and movement data. (This is more fully described below in USER SENSOR MODULE.) Position and movement data are obtained by using high contrast video images to remove ambient data (Blocks 182 and 184). The video image data is thinned (Blocks 186 and 188) to leave only information about the position and movement of the user data points. The data is the vectored in block 190, transformed in block 192, stored in Z-buffer 194. It is then combined with the other synthesized environment elements 196 and the user-mirror body forms part of the display 198.

The "model" feature relates to predicting human body part movements and images based upon stored and archived male and female body parts, of all shapes and ages. When a particular user first employs the system, that user is "fitted" for a mirror-body and that information can be stored and used during the user's system interactive session. The mirror-body is brought up, as are the other primal visual elements, from a wireframe to a shaded to a high density image with appropriate foreground and background image removal when the user mirror-body elements are dropped into the vision field. The user mirror-body file also carries attribute notations which make it cast shadows reflect light and other predictable environment interactions.

Finally, in order to protect the data storage and retrieval module, power conditioners, surge protection and power back up are provided to prevent damage to the module.

II. USER SENSOR MODULE

The next module of the system of the present invention is the user sensor module which is designed to detect user position and movement data and transmit that information to the environmental modeling module. This data is used in the generation and processing of synthetic and absolute environments according to the present invention. Rapid determination, transmission and processing of user position and movement data enhances the reality of the user's experience in interacting with the present system.

The complexity level of the sensor module is directly related to the expected applications of the system. For example, it is possible to use the system on its simplest level, utilizing information concerning only the position, movement, flexion and extension of the user's hand. On the other end of the application spectrum is full body position, movement and health telemetry sensing which requires a more sophisticated sensor system.

In one umbilical-less embodiment of the user sensor module, a specially created full body suit, including gloves, boots and headpieces, is employed to monitor user position and movement in a three dimensional chamber having walls, ceiling and floor. This fully body suit is equipped with a plurality of six-axis positioners to transmit via radio frequencies user position data to receivers which are within the walls ceiling and floor of the three dimensional chamber in which the user interacts with the system. Commercially available Polhemus six-axis position sensors (McDonnell-Douglas) are adequate for this application. In addition to the six axis positioner sensor devices, electromagnetic and sonic proximity sensors are incorporated into the suit in order to monitor user body part movement relative to other body parts. These proximity sensors are miniature feedback sensors which fits into the palm of the suit-glove. Miniature output studs are mounted on each hand point.

These umbilical-less proximity sensors preferably use sonic or infrared waves. Photon beams can only be used in scanning mode. All of these sources are able to monitor all body movements where change in proximity from one part of the body to another is measurable. The feedback loop is from sender to sensor and from sender to receiver block on the perimeter of the chamber via infrared beams and FM radio signals. In another embodiment, sensors pick up energy pulses (light or sound) from the sensor. The frequency of pulses increases as sensor and sender get closer together.

It is important to note at this point that the added complexity of multiple system users impacts upon the proximity sensor design, as well as user position detection because the sensors will be unable to easily distinguish among different data points or different users. In this case, some or all of the user's will have to use umbilical systems to keep the user position and movement data separate.

In this first embodiment, the suit headpiece contains a pitch, roll and yaw positioner feedback device mounted to the front center of the head piece for the visual input device. Pitch, roll and yaw devices can also be mounted on other suit locations, depending upon the need for this additional information.

In the present embodiment, Polhemus devices are used on the headpiece to measure pitch, roll and yaw of the user's head. We find these devices to be physically too large for anything other than developer work because data transmission is too slow, and the resolution is not high enough. In our preferred embodiment, a cable-less, lightweight device is provided to transmit six-axis relative vector information in ASCII-type code at a minimum of one hundred positions per second. The initial transmission to the receiver unit in the chamber wall is via infrared beam.

According to a preferred embodiment, the suit can be used with specially designed boots for the user's feet containing frequency generating devices which transmit position and movement data to receivers in the three dimensional chamber floor which has been set up in an antenna grid.

In a second embodiment of the user position and movement sensor module, the user dons colored body wear upon which has been disposed sensor points which will interact with the electromagnetic radiation sources and receivers disposed in the chamber's walls, ceilings and floor. This suit is considerably less cumbersome and intrusive than the suit used in the previous embodiment. Remote scanners in the infrared and ultraviolet frequencies will pick track the suit's data points. This collection technique is effective both in measuring the user's gross movements, and in measuring the movement of limbs and the fingers relative to the user's body as a whole. The suit data points are reflectors, light sources and sound sources. Laser range finding devices are also employed. Antennae grids in the chamber's walls, floor and ceiling provide overlapping coordinate data of the user's actual full dimensional space within the chamber. Moire interferometry and sonic impulses are also used to collect position and movement data.

In this second embodiment of the user sensor module, position and movement data is gathered in at least two separate modes (separate electromagnetic radiation signals), and then the two modes are co-matrix averaged to provide a single file of position and movement data to the environment modeling module. Technology exists to practice this aspect of the present invention. Fiberoptically wired suits are used to generate multiple light points which can then be detected. Transformation matrices (identified as 164, 166 and 168 in FIG. 6 and 192 in FIG. 7) are 4×4, although 7×7 might also be used here.

According to a third embodiment of this invention, CCD color, black and white and infrared video cameras are used to detect user position and movement. It is preferable to use a plurality of cameras at different electromagnetic radiation frequencies to scan light or color points on the user's suit. The basis for the raster transformation of this position and movement data is found in "Projection Transform Points in a Coordinate System n into a Coordinate System of Dimension n," Pavlidis, Theo, Algorithms for Graphics and Image Processing, Computer Science Press, 1982. In two dimensional raster scanning, the sampling is usually done 1:1 per pixel. In three dimensional space, voxels would be scaled as follows: assuming a world coordinate system which maps into screen coordinates of the video (CCD color, black and white or infrared) output device you can use the overall value prevailing at the user's position in the scene divided by the raster to determine sample size. This raster/vector synthesis method would have the advantage of being least invasive to the user. A schematic of how this process can be integrated into the overall system is shown in FIG. 8.

An aspect of this raster transformation process is to use high contrast imaging followed by image processing to thin the video data. See blocks 182, 184, 186 and 188 in FIG. 7. This thinning process helps to remove the unimportant ambient information, leaving only the useful sensor points.

Figure 8:
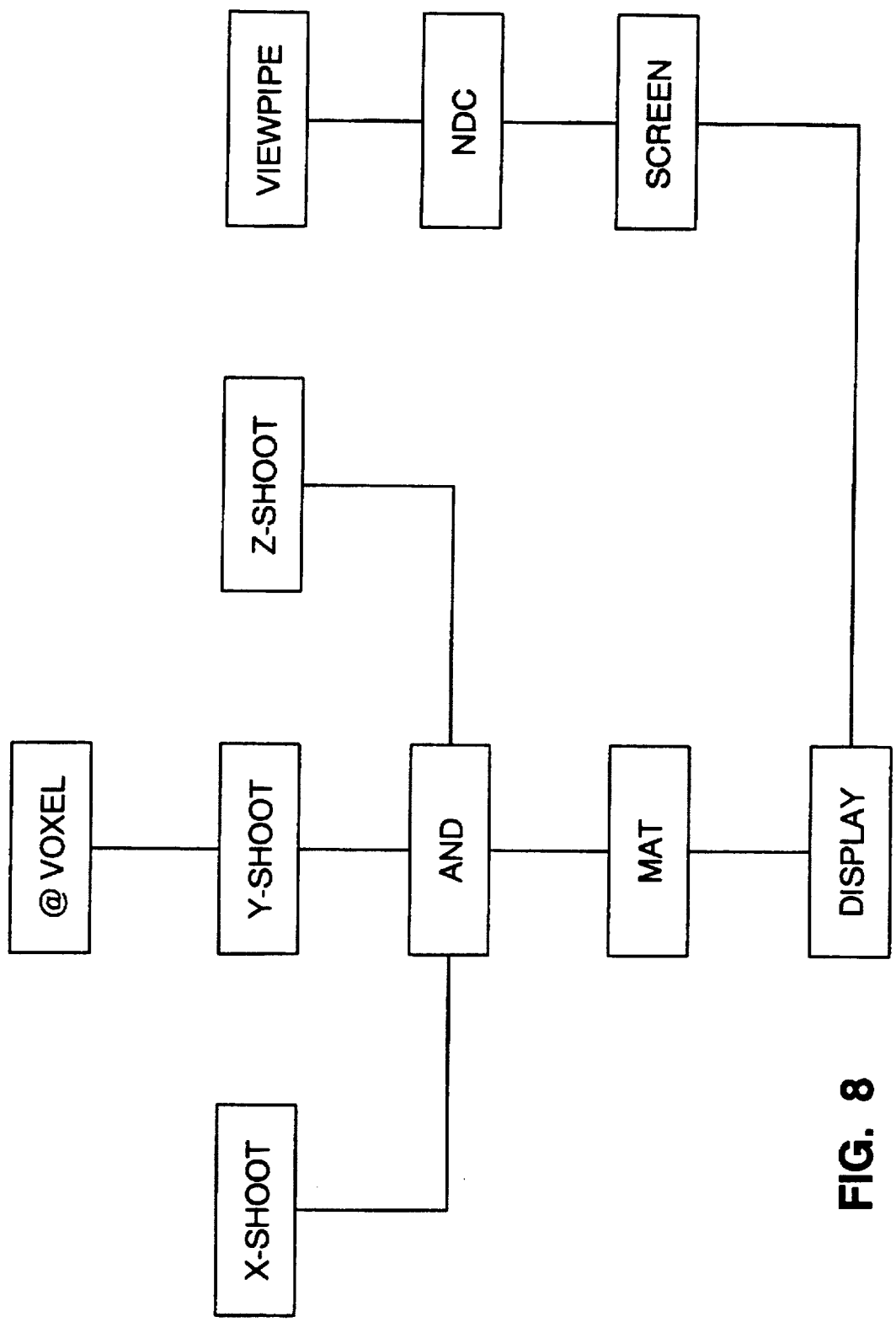
FIG. 8 is a block diagram of a raster-based sensor method could be used to determine user position and movement data which can be integrated with the environmental modeling module of the present invention.

Referring to FIG. 8, user information (from block 200) is combined with single axis position and movement data from X-shoot 202, Y-shoot 204 and Z-shoot 206. This information is combined, thinned and processed in AND block 208. This data is then formatted in Mat 210 for use in the display mode 212. Viewpipe 214 provides the remainder of the environment elements which are combined with the user-mirror body (see above) for the generation and processing of a single output mode.

User health information is typically obtained for monitoring the system user's response to the generated environment, although it is possible to use this information for a scientific study of a response. The information is maintained for liability purposes, and would normally only be set to alarm during a user biological overreaction. The user health information is not normally transmitted to the environmental modeling module, thus it does not usually end up in the computational processing of the generated environment. Health information is sensed via body pickups which is transmitted via infrared frequencies to receivers in the chamber walls.

All of these embodiments of the user sensor module are non-intrusive and do not require cumbersome umbilical cords.

A component of the user sensor module is the three dimensional chamber itself. See 14 in FIG. 1. From the sensor perspective, this chamber is filled with coherent and incoherent biologically-safe electromagnetic spectrum scan grids operating at many frequencies. The chamber physically consists of a square metallic framework which is modular and can be configured and reconfigured to adapt it to varying applications. The modules can range in size from 6 feet to 20 feet square. The modules can be provided in multiples for installation in auditorium or gymnasium sized rooms.

Another use of the present invention involves the use of remote probes to gather data about an absolute (existing) environment, which might be too dangerous, too small or too remote for humans. For example, remote microsurgical probes could be used to gather information about a patient's physiology. Remote probes could also be used to explore physical areas which are too dangerous for actual human contact, e.g., undersea or in nuclear power plants. Information about these remote absolute environments is then radio transmitted back to the remainder of the system apparatus. The user in a generated version of the absolute environment can then manipulate a simulated probe which could then activate remote robotics.

The remote probes are controlled by the user's position and movements within the chamber. If the user turns her head in the chamber, the probe will turn the same way. The photorealistic accuracy of the generated synthetic and absolute environments provides the user with three dimensional visual and aural output to make the user feel like the probe itself. The remote probes communicate with the chamber and system primary control module via geosynchronous satellite transponders, fiber-optic telecommunications lines, microwave beams and other systems in a network from user to probe to link all signals, real time, to input and output from both user to probe or probes.

III. ENVIRONMENTAL MODELING MODULE

The system environmental modeling module uses as its input: pre-selected image files, sound files, tactile data files and data concerning the applicable natural laws of physics and nature, to provide real time generation of synthetic and absolute environments, objects and interactive user-viewed user body parts. The data storage and retrieval module described above contains high powered workstations and painting, modeling and sculpting software which can render photorealistic visual imagery and other user stimuli. Since it is an inherent feature of the environmental modeling module to be part of, and to be stored in the data storage and retrieval module, most of the environmental modeling module has already been described above. See particularly stereoscopy dualizing computers, primitive image basic model files, positioning and movement standardized data software, image pre-design data processing array and interactive through-put image and sound processor.

One aspect of the environmental modeling module is not provided by the Silicon Graphics' POWER Series workstations is a tactile sensory output. We have written software in which the tactile information is cascade programmed from a visual element in the viewed synthetic environment. A vector surface graph of the visual element is chosen by the user. The vectors of this surface are translated into pixel addressed points in the shapewall hardware to set the tactile surface parameters required. The environment is modeled, based on the pre-user session creation of a three-dimensional computer animation file of all required elements for the user session. The user sensor module determines the appropriate speeds and pressures for the variable treadmill, and for the air velocities based upon user movement and positions. Bladders in the user's boots, operated and controlled by FM radio frequency signals effect the foot tactile mode.

With respect to absolute environments, the real time mode is processed via cascade programming which combines images, sound, smell, tactile actions, input and output into a cohesive common machine language and file adaption system.

IV. USER STIMULI MODULE

The output of the environmental modeling module is structured to be input into the user's biological senses. This means eyes, ears, smell and touch. Each of these senses requires a different sensory interface with the environmental modeling module output.

Beginning with the visual sense, there are several embodiments of the present invention for input of the model output to the user's eyes. All of these embodiments take off from the same general output mode of the environmental modeling module: particularly, a fully dimensional raster-vectorized mode in which a single compute server generates stereoscopic information by optically offsetting the images.

Figure 9:
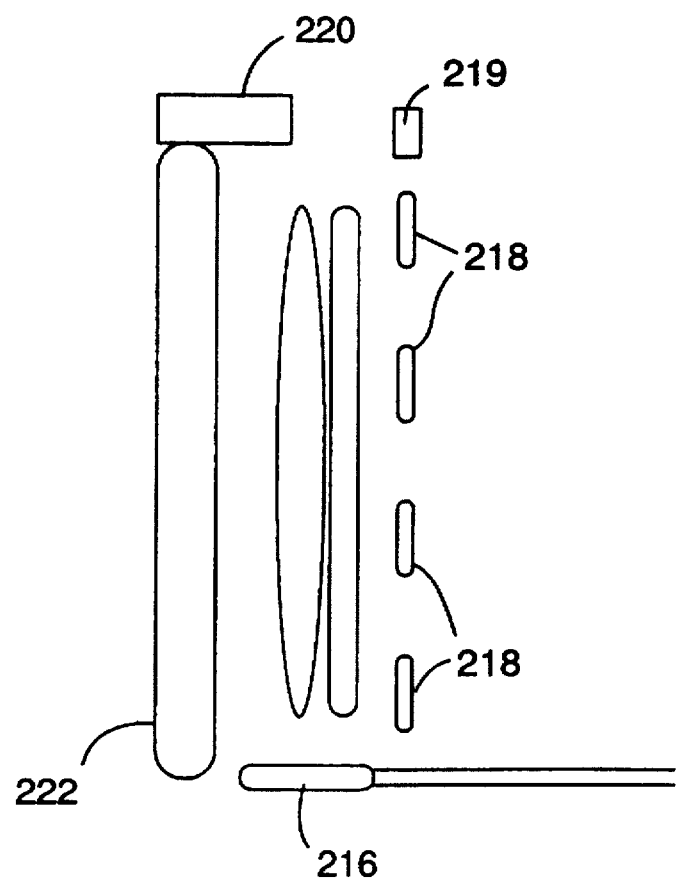
FIG. 9 is a side elevation view of the first embodiment of the visual input device.
Figure 10:
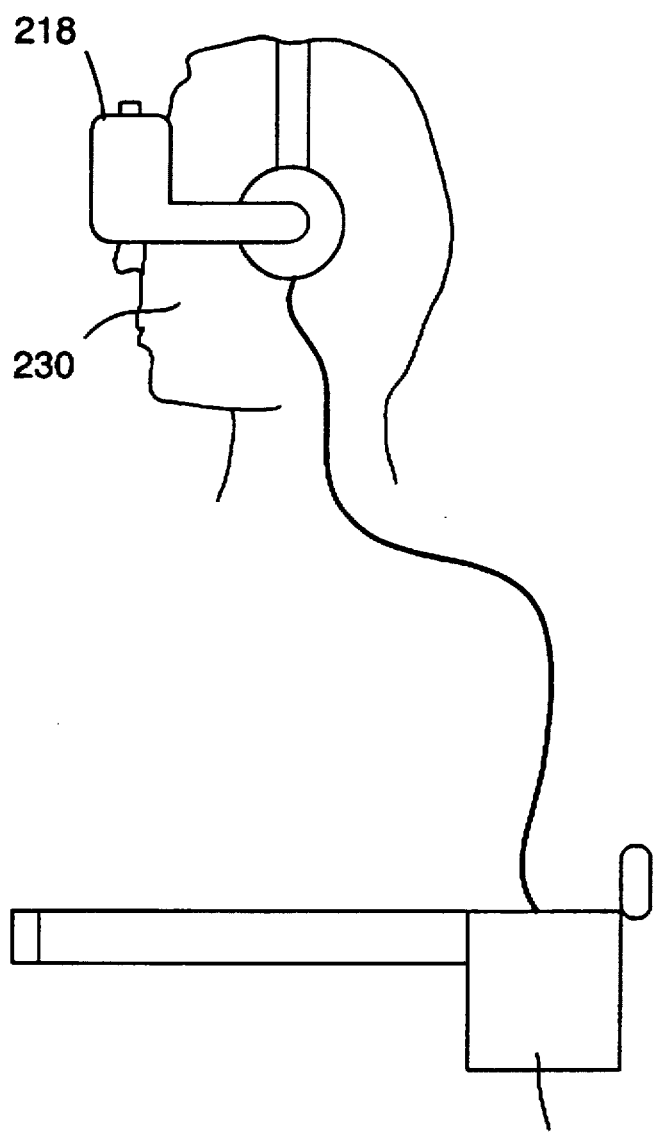
FIG. 10 is a schematic view of the first embodiment of the visual input device.

From this modeling module output, the first embodiment of the visual input device of the present invention uses bio-synchronized peripheral micro-strobes and dual vision LCD color eye monitors. A diagram of this device is shown in FIGS. 9 and 10. In this figure, micro-strobes 216 are biosynchronized by pre-set cycles which are cascade activated by the various image element in the visual output mode of the environmental modeling module. The micro-strobes 216 are controlled by eyepiece biological feedback muscle sensors 218 and brainwave sensor 219 which gather information on the user's alpha and other brain waves. User head 230 pitch, roll and yaw is monitored by sensor 220. These sensors all effect the geometrically equal and faster offset rates of the micro-strobes. The strobes are triggered at high speeds asynchronously in a manner that disrupts brain vision signals and causes internal vision imaging to be generated in the visual cortex. The microstrobes 216 are positioned in the lower corners of visual input device 228, one per side, to illuminate the screen 222. The microstrobes are high frequency sub-miniature strobes with long life.

In this embodiment, the stereovisual images are offset in the single output mode according to programming language entered into the environmental modeling module. The program directs the computer to generate the final visual image as two images, taking into account human parallax and other human visual traits, the two images being approximately offset from each other. The images are optically differentiated in one of two ways: either by receipt aboard multiple image guides to each eye, or by multiple image projectors at each eye.

LCD Plates 222 are available from Sony (Model FDL-3305) and Toshiba (Model TFD 40W01), and are modified to adapt to the headpiece. Wide angle lens 224 and focus diopler 226 are provided to correctly focus the image for the user. The device is connected to a belt-worn broadcast unit 232.

Figure 11:
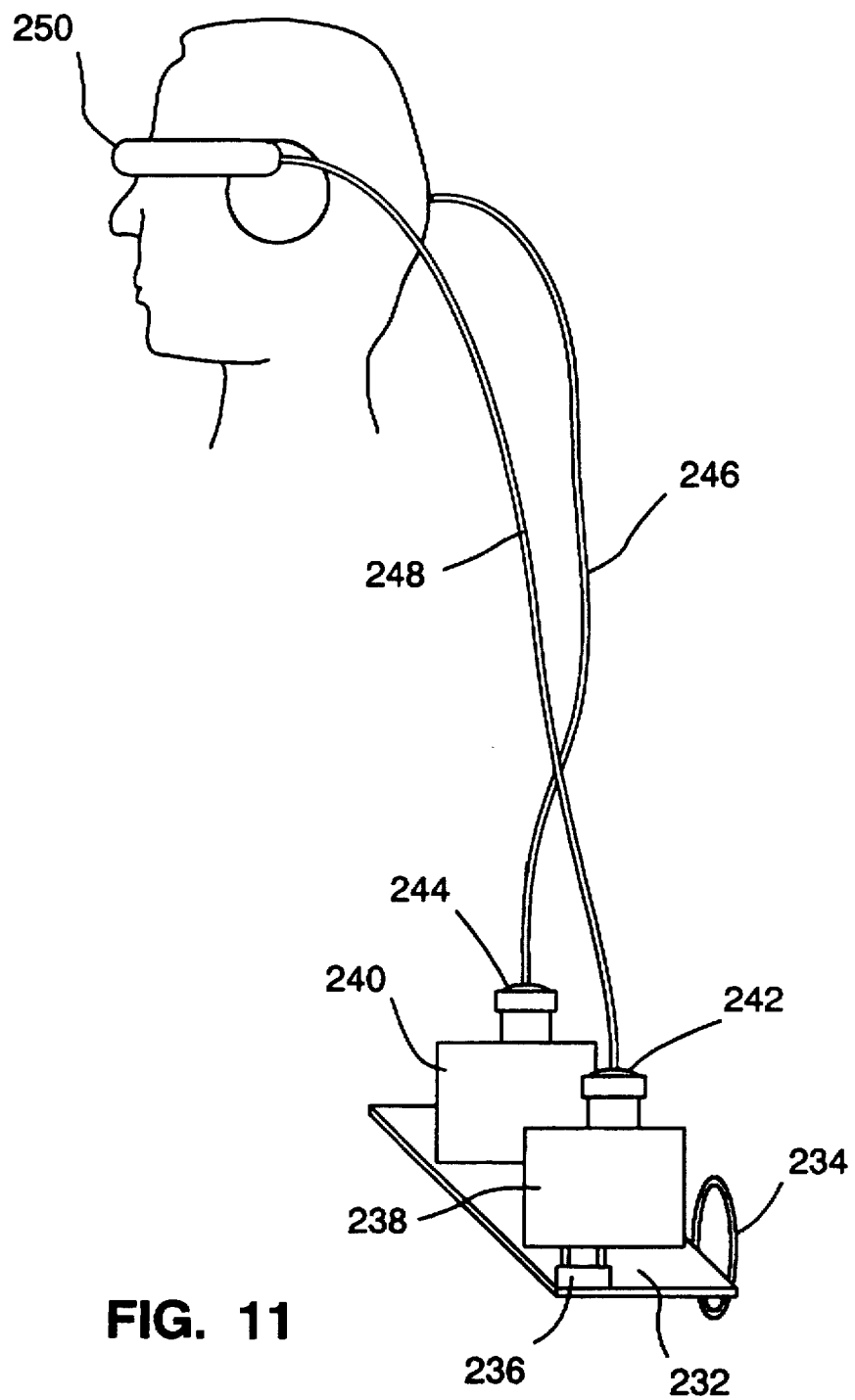
FIG. 11 is a schematic view of the second embodiment of the visual input device.

The second embodiment of the visual input device is shown in FIG. 11 where a broadcast board 232 receives data either through antenna 234 or back-up umbilical cord connection 236 to power and feed two high definition monitors 238 and 240 to create two separate images which are then transmitted to the user's eyes through lenses 242 and 244 and fiberoptic stacks 246 and 248, terminating in headpiece 250.

The high definition monitor screens 238 and 240 can range from two to twenty inch diagonally. In either case, the monitors would have a nominal resolution of 1280 dots by 1024 lines minimum. When selecting from the two inch through twenty inch diagonal monitors one of the primary considerations is monitor weight. Two to four inch diagonal monitors may be user-mounted on a specially adapted belt. Larger monitors are too heavy for the user to wear, and provisions must be made for access of the generated images from remote locations. User mounted units use broadcast power or batteries to power the monitors. The remote units use standard AC power, and have wired image reception. User mounted units employ low-power broadcast reception.

As shown in FIG. 11, images are input from the monitors 238 and 240 to the fiberoptic stack 246 and 248 through optical lenses 242 and 244 at one end of the fiber bundle. In certain embodiments, a shutter can be installed at the end in each image guide, allowing stereoscopic images which are compressed into overlaid scans on a single high definition television monitor to be split to each eye. A specially designed headband 250 mount holds the image-out ends of the fiberoptic stacks at the front of the user's eyes.

In one embodiment of this visual input device shown in FIG. 1, the high definition television monitors are cable mounted to steel girders which contain the chamber. As the user moves in the chamber, the entire assembly is designed to follow the user's movements.

Figure 12B:
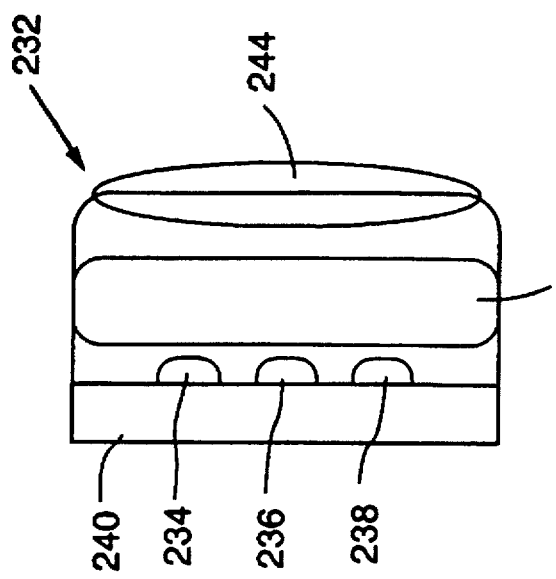
FIG. 12b is a side elevation.
Figure 12C:
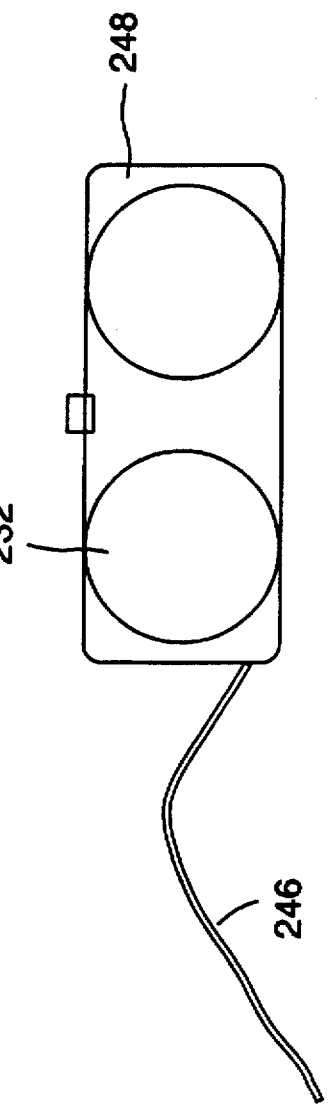
FIG. 12c is a schematic view of the third embodiment of the visual input device.
Figure 12A:
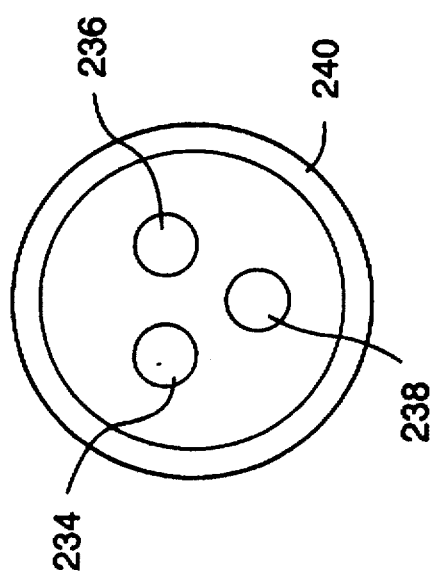
FIG. 12a is a plan elevation.

The third embodiment of the visual input device is shown in FIG. 12. This device uses a direct retina scan to place the image directly into the user's eye via lower power laser diode imaging packs 232.

According to the present invention, retinal scan uses red 234, green 236 and blue 238 laser diodes which are scanned via electromagnetic pressure fields 242 on a target alignment focused on the interior eye element, the retina, via magnetic field focus ring 240 and lens. Retinal scan devices must meet established FDA safety requirements. This whole array is mounted in a closed eyemask unit 248 worn like a pair of goggles. The optics of the eye and custom manufactured optical units 244 work cooperatively to focus the image onto the biological visual receptors. This unit may operate with an umbilical 246 to place the image into the diodes, or may use low-power broadcast to transmit the image data to the diodes 234, 236 and 238.

Figure 13:
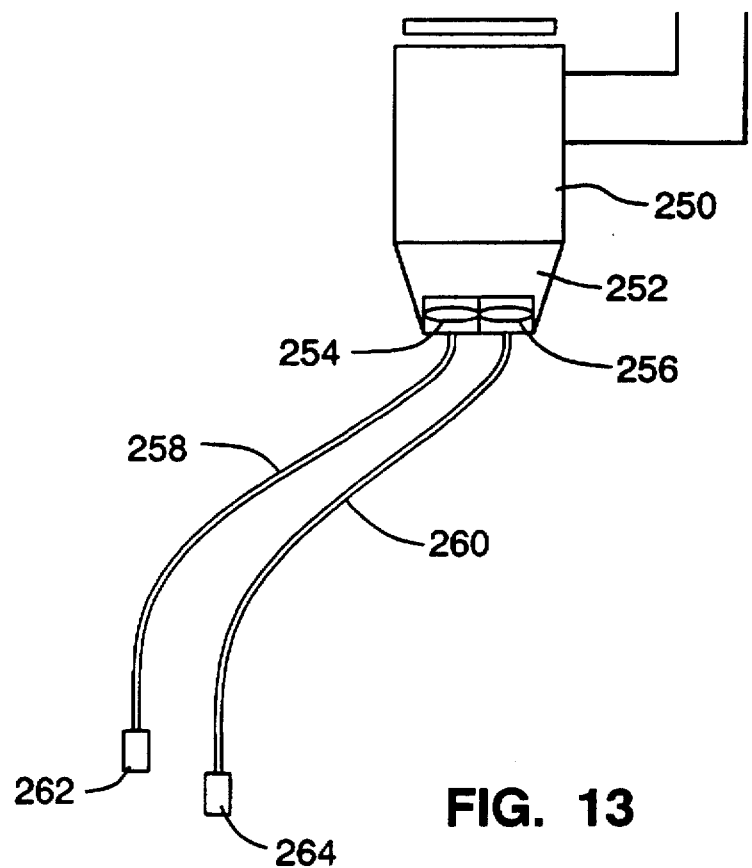
FIG. 13 is a schematic view of the fourth embodiment of the visual input device.

In the fourth embodiment of the visual input device shown in FIG. 13. The image is taken from a high definition color monitor 250, through light shield 252 and lenses 254 and 256 via fiberoptic cables 258 and 260. Erecting prisms 262 and 264 which are eyemask mounted are at the user end. Synchronized shutters, either magnetic or opto-electrical are mounted in the front of the eyepieces 262 and 264.

Figure 14:
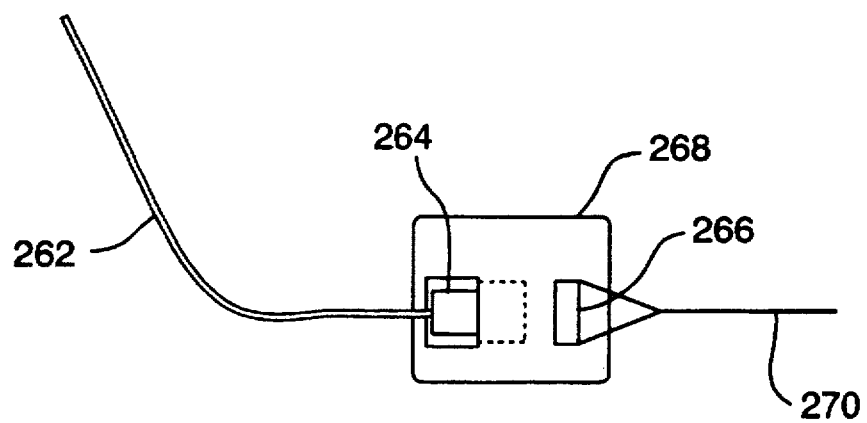
FIG. 14 is a detailed side elevation view of an optional addition to the fourth embodiment of the visual input device.

In an add-on feature shown in FIG. 14, the visual image is carried through fiberoptic cable 262 into projecting lens 264 and projected onto microscreen 266 which is mounted in housing 268 and held one-quarter inch in front of the surface of the user's eyes by elastic headband 270. The microscreen 266 is fabricated from a translucent resin plastic material with a high transmission rate and a frosted face on the thinnest level on the surface facing the projected light. Typically, the screen's dimensions are oval shaped 2 inches by 1¼ inches. The front face is ½ inch from the rim and is an oval 1½ inches wide and ⅞ inch tall. The microscreen is mounted in the housing 288 and held to the user's head via elastic cord 270.

Figure 15B:
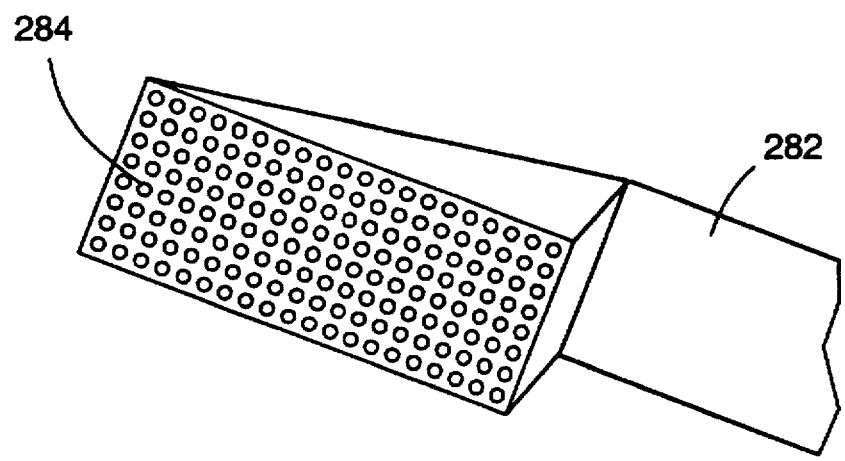
FIG. 15b is a detailed view of the user end of the ribbon cable.
Figure 15A:
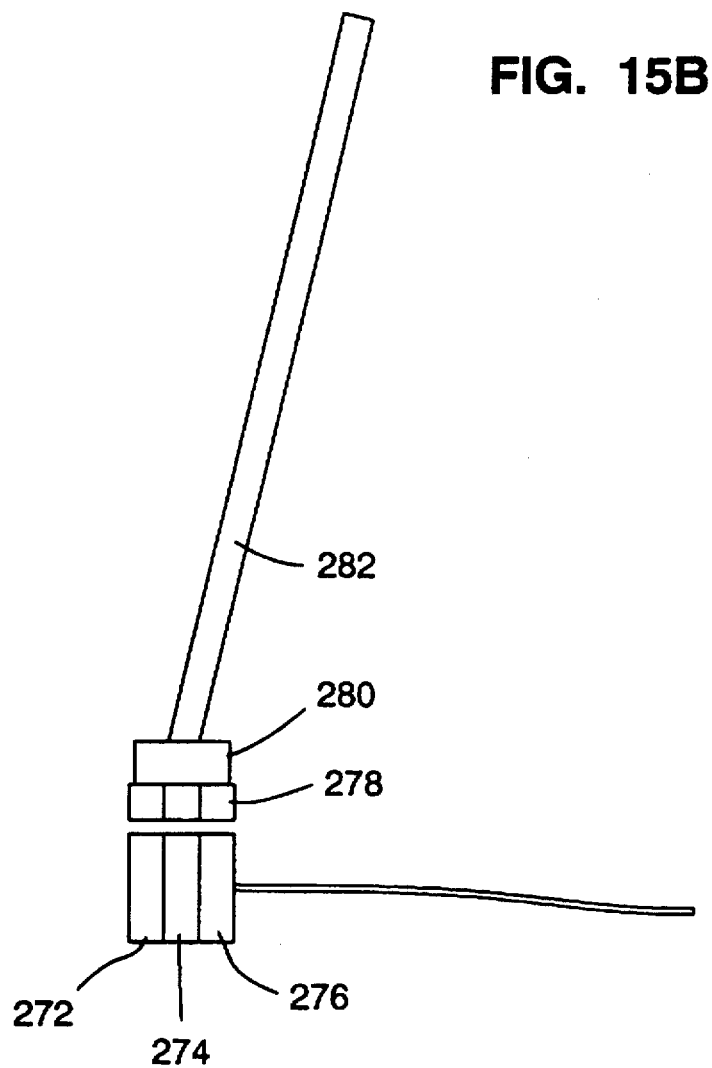
FIG. 15a is a schematic view of the fifth embodiment of the visual input device.

FIG. 15 shows a fifth embodiment of the visual input device. High definition color monitors 272, 274 and 276 are mounted on the user's belt. Then, frame sequenced dense-pack fiberoptic image decompression via lenses, enhancer 278 and multiplexer/field generator 280 is used to project the image output to the user's eyes, as in the fourth embodiment. The fiberoptical cables 282 are bonded in a vertical line-up from left to right, and then cut and polished at an angle. This allows the bundle 282 to come to the user's eye as a flat ribbon 284, rather than as a thick tube. The image signals are frame sequenced in that each of the three primary colors has its own high resolution and high brightness remote HDTV monitor. Photo discharge 280 through the fibers is enhanced by an electromagnetic coherency field generator 280 which basically makes the image brighter. The fiberoptic cables 282 use erecting prisms to put the image on the expected horizontal plane that the user would want to see. The fiberoptic cables, at the user end, have dioptic adjustment for user focus, and electronic shutters in the case of final stereoscopy offsetting. Microscreens, as in FIG. 14, may be used as well.

The next sensory interface event takes place at the user's ears. The environmental processing module has an audio signal which provides multidimensional digital sound to accompany the generated visual imagery. As described above, the sound output is cascade programmed to correspond to the visual imagery.

There are two embodiments of the aural input device. In the first, matrixed individual microspeakers are arranged to provide a multidimensional sound output. In this embodiment, a multi-microspeaker array is affixed to the perimeter of the chamber at floor, mid- and top levels. In the second, a headphone-like piece is created in which multiple subminiature speakers are arranged around the user's ears. The audio signal is transmitted to the headphone via stereo infrared beams which are split down to eight to fourteen mono signals. The volume and phasing of each signal is automated and cascade programmed to correspond to a particular image element. The sound output speakers are full range miniature speakers in a geometric pattern arranged to work with the human ear architecture to make each sound to appear to be coming from an apparently different geographical position. In one of our preferred embodiments, we use Sony miniature speakers.

In either embodiment, the speakers are all connected to a multi-port bus which takes switched, volume modified, phase and effect modified signals from a "MIDI" interface control, and sends them through the different ports, or simultaneously through any given port as the environment demands.

Other user sensory input is accomplished in the context of a three dimensional chamber. This chamber 14 in FIG. 1) has already been described above relative the sensor mode to accumulate user position and movement data. The chamber is adapted to be interactive with the system user's biological senses. In addition to the visual and audio input previously described, the chamber is also equipped with a tactile output system 24 which permits the user to walk right up to it, and experience the generated environment through her tactile senses.

The tactile output device 24 can be made integral with the vertical walls of the chamber, or it can be free-standing. It is composed of one foot square modular sections which attach to each other to form any size wall surface or free standing pod in the chamber. One of these modular sections contains a series of hundreds (low resolution) or thousands (in high resolution designs) of metal rods with a rounded polygonal teflon head which interconnects to each of its adjoining heads. The rods are electro-mechanically driven forward or backwards via pixel-type addressing as explained below. A three dimensional computer vector grid image is used to design the shape and vectors are transposed to pixel address points. The rods are driven forwards or backwards according to the shape to be generated. The rods push against interchangeable flexible skins placed between the rod heads and the user. The rods are held in position via level-by-level friction brake until released to reform. The rod brake has an assignment for degree of spring or give which makes the spring mounted rod feel more spongy or rocky as required. This is accomplished by making the brake set harder or softer. Air impulse or electro-pneumatic servos would be used to drive the metal rods. Magnetic levitation floaters can also be used.

A basic set of woven, laminated flexible skins could be stored on roll down tracks, and easily installed for each experience relative to the anticipated surfaces for that environment. Gloves can also be used in conjunction with the flexible wall skins. These gloves would have an additional layer of padding that would further sooth the effect of interaction with the rod-shaped wall. As noted above, stand alone modules can be set up in the chamber to stimulate small items. The modules can be placed on robotically driven podiums which are simple mechanoids with bump-avoidance proximity sensors and free roaming wheeled base. The robotics are assigned positions in the chamber by the cascade programming, and the robotics are able to locate their position by referencing the chamber floor antennae grid. These tactile units are also equipped with compressed air stream capability with a similar pixel addressing system to form a back pressure surface simulation with a different type of effect or feel. Rods and jet streams can be configured in the same block.

Figure 16:
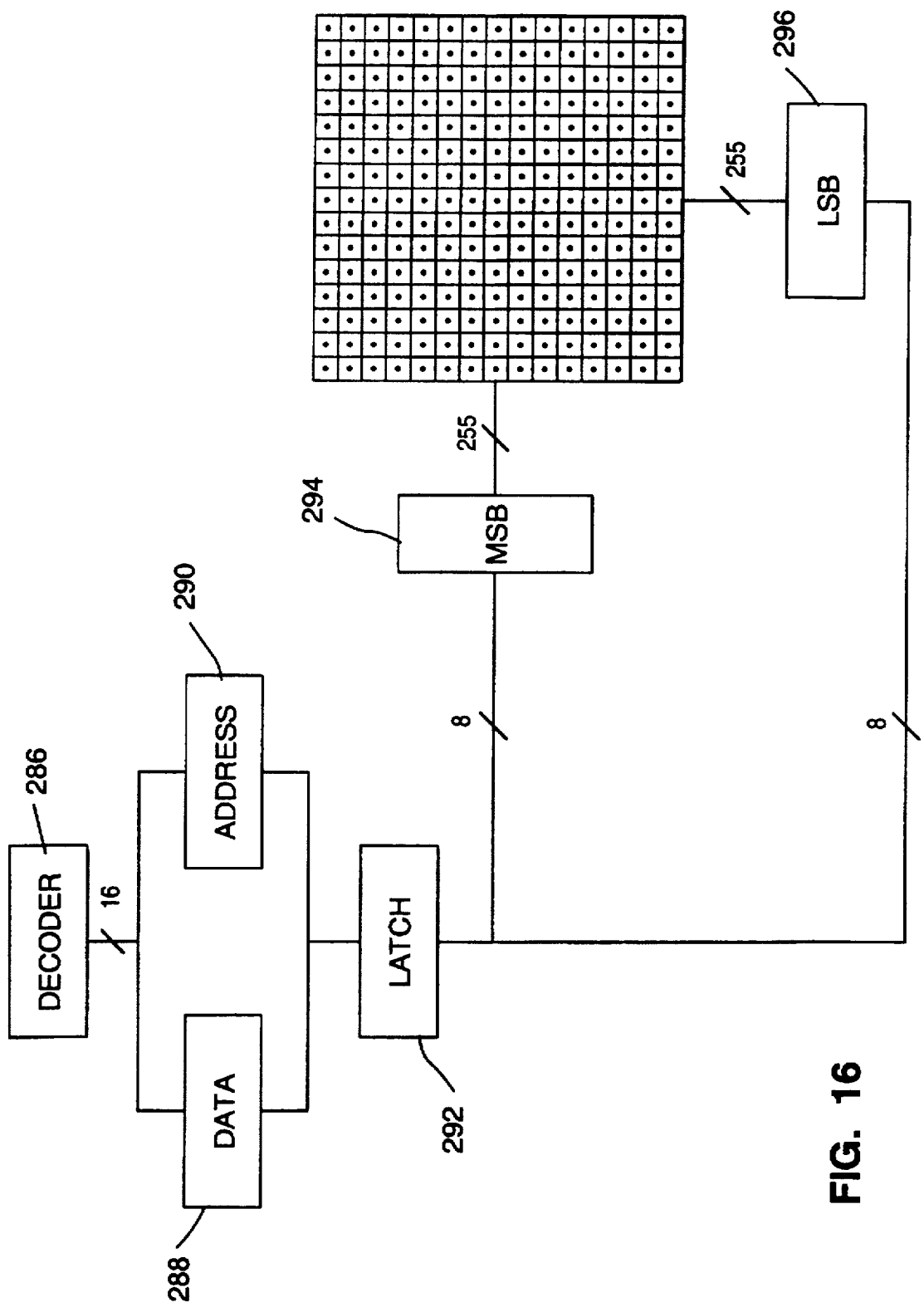
FIG. 16 is a block diagram for a pixel addressing scheme.
Figure 17:
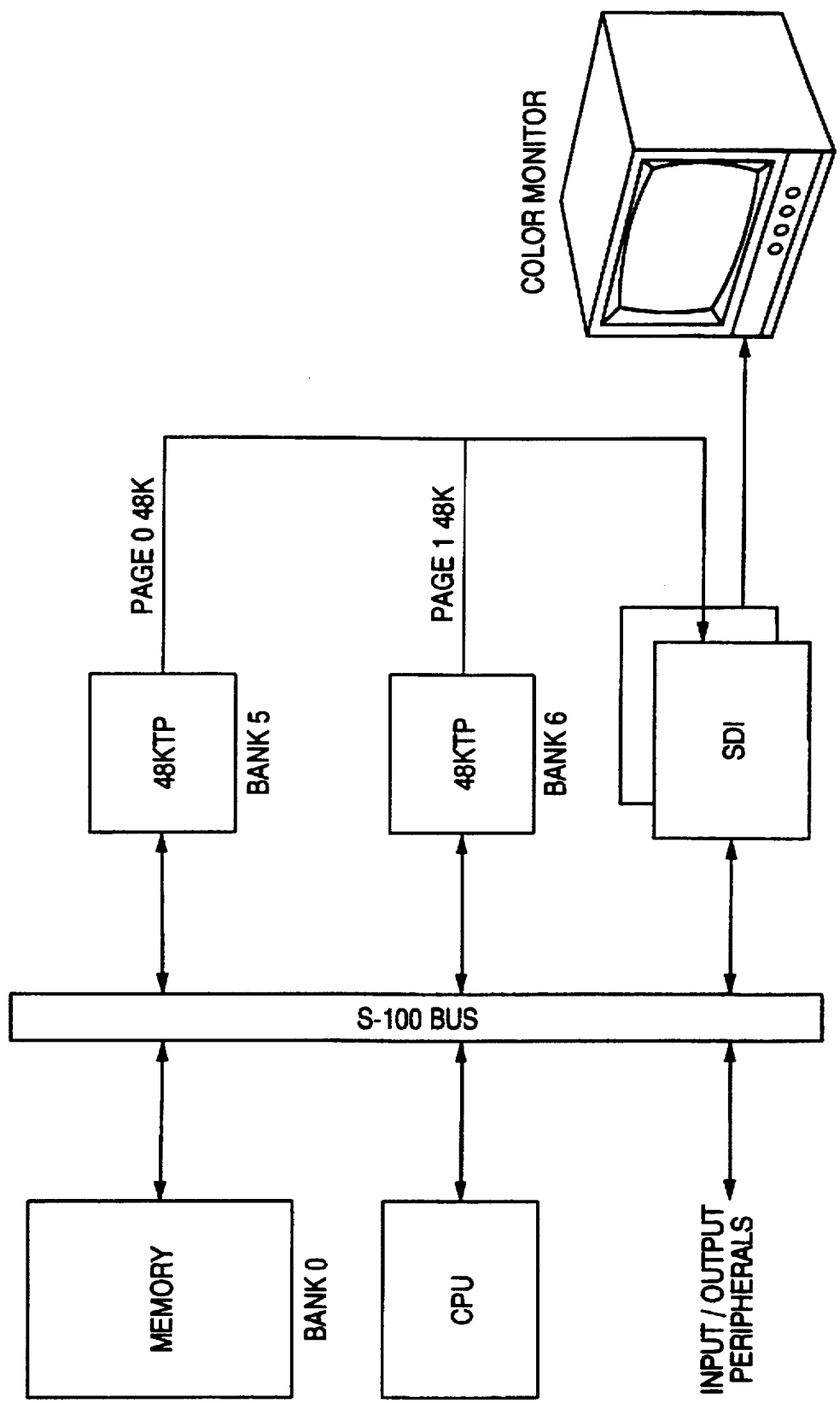
FIG. 17 is a block diagram for a two port pixel addressing scheme.

The pixel addressing scheme for the tactile output device is illustrated in FIG. 16. The decoder block 286 accesses the environmental model output and then enters the data and address blocks 288 and 290. Latch block 292 provides an x,y coordinate address for the pixels and the servomotors are activated by block MSB 294 and block LSB 296. In UNIX programming code, the call would be:

texture_pad (x, Y, pin_height, device)

Int x, y, pin_height, device

A two port scheme for pixel addressing is shown in the block diagram of FIG. _17. This scheme is capable of supporting a 48K module using three arrays of eight 16K×1 4116 dynamic RAM chips capable of supporting a medium resolution display with 4 bits/pixel or a high resolution display of 1 bit/pixel. The embodiment described above implemented read/write access from an application by means of bank switching, resulting in the memory location being addressed in the same way as main memory. To a programmer, the call for the two port scheme still looks like the following:

```
Texture_block (x, y, pin_height, block_device)
    unsigned int x, y, pin_height, block_device
```
The program then handles the memory access details of bank switching and the video display board would handle the details of reading and displaying the memory contents three bytes at a time according to an on-board switching scheme which is not required for the texture pad. The 4116s are replaced by actuator circuitry that alters the pin height, and determines response time. This two port scheme achieves its purpose in 811 [MU] sec. cycles, half of this time devoted to host read/write, one byte at a time, and the remaining half devoted to video display memory accesses. In the case of the rod-driven tactile unit, add the following:

```
Texture_wall (x, y, pin_height)
    Unsigned int x, y, pin_height
```
Here, range checking and device blocking would be preformed.

The user stimuli module contains a smell output device. Small vials containing distilled oils from odor producing organic and inorganic compounds are stored in a storage rack with a liquid vial carriage access similar to those used in automated hematology analyzers. Cascade programming connects the smell output to the visual images. A heated drip pad is used to introduce the odors into the chamber upon command.

Another component of the user stimuli module is a vehicle simulator 32 in FIG. 1. It simulates high speed and long distance flight while creating a dynamic focus of, and a creating station for, user operating commands while being transported. It has functioning controls which alter the sensory perspective of user.

As previously mentioned, the user may don specifically designed boots whose inner soles contain bladders which are filled with a material which can be hardened or softened by stimulation from air pressure or electric DC current input. These boots contain receivers which can activate the inner soles via radio transmission of data.

The chamber can be equipped with enhancements such as air jet streams 34 which provide user stimulus to simulate forward and backward motion. Sonic resonators may also be installed to relax user's brain functions and increase susceptibility to the synthesized environmental modeling output. Temperature variations can be effected by regulating chamber temperature, or modifying the temperature inside the user's suit.

V. PRIMARY CONTROL MODULE

The overall system operations are controlled by the primary control module. In the high end systems, this means a control room. In single user systems, it may mean administrative automation software. As shown in the embodiment pictured in FIG. 1, the primary control module would be physically adjacent to the chamber 14. In the case of smaller, personal systems 30, it is built directly into the workstation. In larger configurations, the primary control module can be staffed with two monitoring technicians. In other configurations, the system may set the control module to full automation.

The primary control module is assigned a variety of functions. The control module is equipped with time management and scheduling software to monitor system files to allocate accounting charges to the proper account. It provides record keeping capability for memory and other system capability. The primary control module has input consoles and workstations to permit data input, pre-session imaging and other preparation, and in-session controls of the environmental modeling output, including controlling user stimuli input. The primary control module uses real time camera monitors to follow remote probe operation. This module communicates with, reports and monitors user health telemetry data. It includes digital activity recorders for memorializing system activity parameters. The primary control module provides for audio-visual communications with all staff, users and technicians. The module maintains read out screens on all functioning system components and data-gathering gear.

The primary control module maintains control over remote probes which are typically equipped with a vision module—including dual CCD, color, high resolution, human eye aligned, automatic, housed video cameras with variable wavelength sensitivity, including pitch, roll and yaw movements matrixed to follow user's movements.

Another feature of the primary control module is user menus. There are graphical translucent images which drop into the user's field of view. As the user raises his hand toward the command grid, the menu driven command button that she is aiming for glows brighter as her finger nears it. This image enhancement helps to aim for the target. When activated, the button glows brightly, sound "binks" and then the command menu disappears. The command menu may also be called up via voice activation: "COMMAND GRID". The use may call up a single menu, a series of menu, or operate from a master menu directory. The user is able to call up the functions that a keyboard in any out of chamber work station could implement. The user maybe required to control all aspects of all parameters, or write an environment during an interactive session. In the case of remote probes, a user would need to use the command menus extensively to control real-time activities.

VI. IN-SYSTEM COMMUNICATIONS MODULE

This module of the system is designed to permit voice-activated commands. It is designed to cover communications from the system user to the primary control module, or technicians manning the primary control module. The user will be supplied with a microphone connected to the system via electromagnetic spectrum transmission mode. The in system communications module is designed to provide communication from remote probes, including issuing commands and receiving data.

Kurzweil voice command systems are currently available for creating an application based vocabulary which can then be employed in particular user sessions according to the present invention. Special floppy disks or other portable data storage devices are used to import user-specific voice phonetics and user voice recognition information for the user session.

VII. HEAD MOUNTED SENSORY INTERFACE

The preferred embodiment of a head mounted sensory interface is first shown in FIGS. 18(a), 18(b), 19 and 20. A head mounted sensory interface 298, which is shown mounted on a system user 300 and in part positioned by a nose 301 of the system user 300, is comprised of a hand gesture sensor 302, a front housing 304, a first voice command microphone 306, a six axis sensor 308, a main unit housing 310, and a first combination adjustment pivot light tap 311.

The head mounted sensory interface 298 also includes a first hinge assembly 312, a first adjustable mounting bow 314, a first earcup housing 316, a first earcup cushion 318, a first adjustable mount 320, a first end stop 322, a first signal umbilical 324, and a first bow connector 326.

Figure 20:
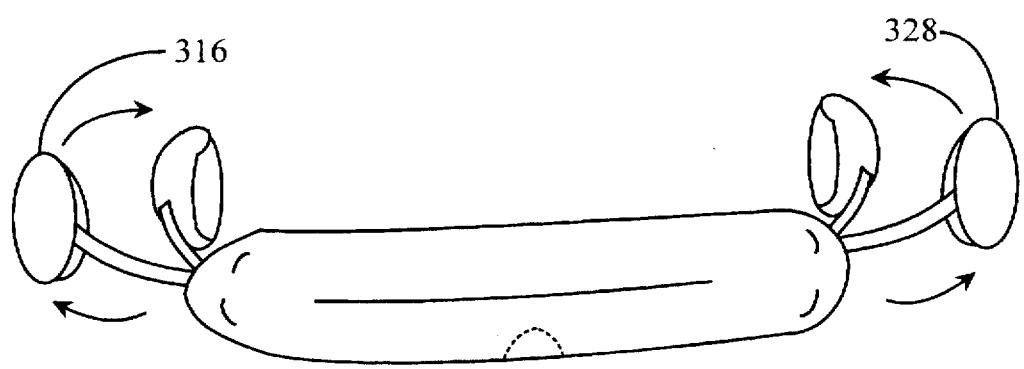
FIG. 20 is a front elevation view of the head mounted sensory interface.

FIG. 20 illustrates an aspect of the adjustability of the first earcup 326 and a second earcup 328, both earcups being shown in a first position and in a second position.

Figure 18:
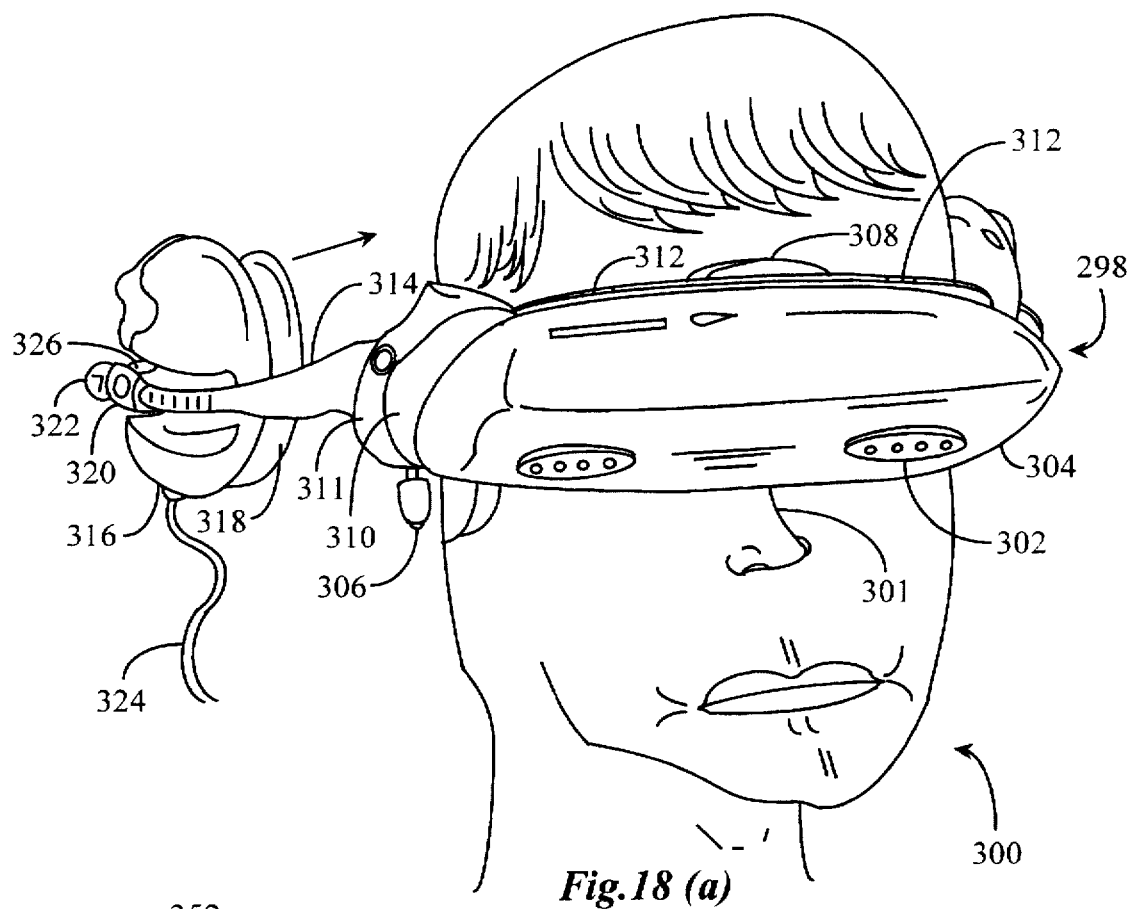
FIG. 18(a) is a perspective view of the head mounted sensory interface as mounted on a system user with the right earpiece moved away from the system user.
FIG. 18(b) is a plan view of the head mounted sensory interface as mounted in the system user.
Figure 18:
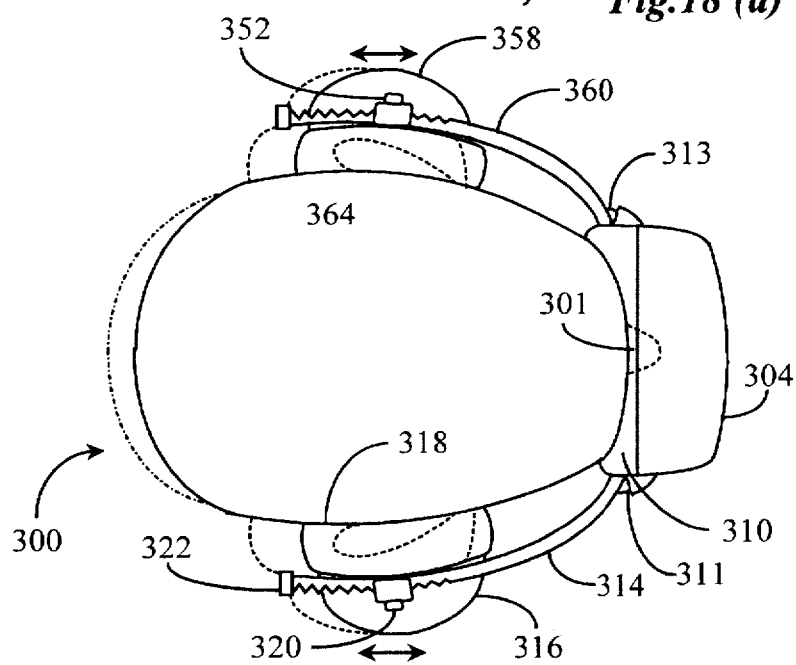
Figure 19:
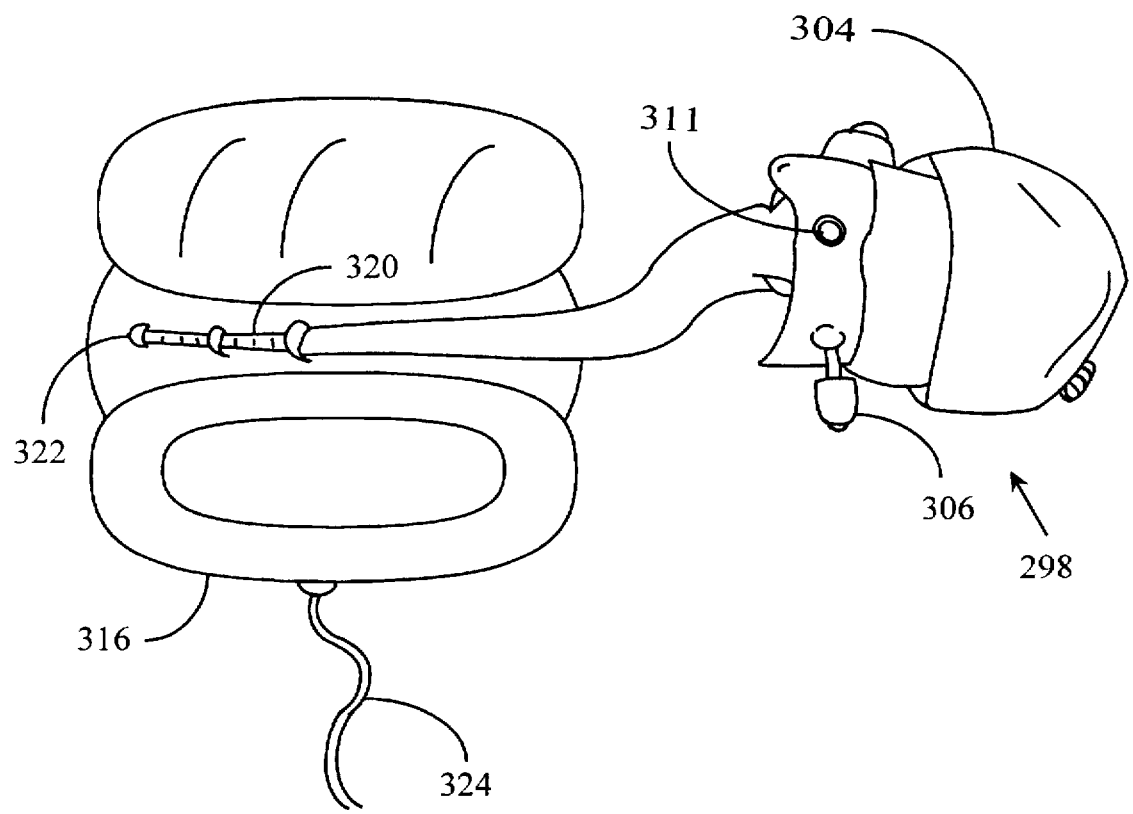
FIG. 19 is a side elevation view of the head mounted sensory interface.
Figure 21:
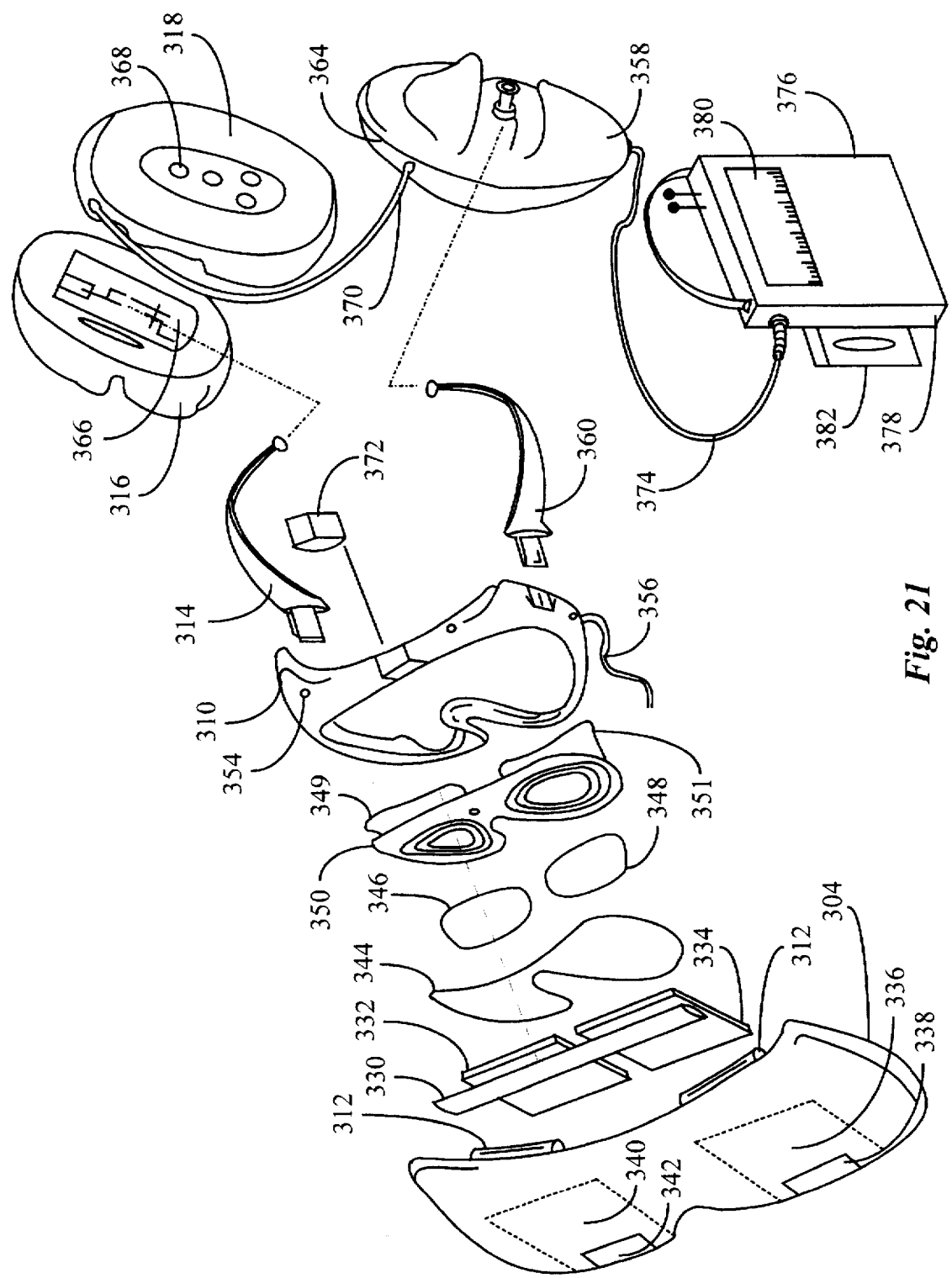
FIG. 21 is an exploded perspective view of the head mounted sensory interface.

Referring now to both FIGS. 18(a) and 21, the head mounted sensory interface 298 is shown in greater detail.

A fiber optic light bar 330 operates to illuminate the rear of a first LCD plate 332 and a second LCD plate 334. The LCD plates 332 and 334 may be replaced by a single LCD plate if desired.

A first overlay plate 336 is secured to the first housing 304 by way of a first plate hinge 338. Similarly, a second overlay plate 340 is secured to the first housing 304 by way of a second plate hinge 342.

The head mounted sensory interface 298 further includes a holos lens 344, third lens 346, a fourth lens 348 and a combination lens holder and eye mask mount 350, which in part serves to secure the holos lens 344, the third lens 346 and the fourth lens 348. The combination lens holder-eye mask mount 350 fits into the main unit housing 310. A first eyepiece 349 and a second eyepiece 351 are secured to the combination lens holder eye mask mount 350. Contained within the main unit housing 310 is an overlay mirror image activation switch 354, and attached to the main unit housing 310 is a user voice command microphone 356.

The main unit housing 310 is secured to the first earcup housing 316 and to a second earcup housing 358 by the first mounting bow 314 and a second mounting bow 360. One end of the first mounting bow 314 is attached to the main unit housing 310, while the other end of the first mounting bow 314 is adjustably attached to the first earcup housing 316.

Similarly, one end of the second mounting bow 360 is adjustably attached to the second earcup housing 358 with a second adjustable mount 360. As described further herein, both the first and second mounting bows, 314 and 360 are each constructed of a fiber optic lightguide surrounded by semi-flexible housing which acts as a spring to thereby press the first earcup cushion 318 and a second wicking earpad 364 against a system user's head.

The first earcup housing 316 contains electronic circuits 366 and a light source. Similarly, although not shown in FIG. 21, the second earcup housing 358 also contains electronic circuits and a light source.

Attached to the first earcup assembly 316 is a minispeaker array 368. Also attached to the first earcup housing 316 and surrounding the mini-speaker array 368 is the first earcup cushion 318.

Similarly, the wicking earpad 364 is attached to the second earcup assembly 358. A first data and power cable 370 carries signals and power between the electronic circuits 366 in the first earcup housing 316 to the electronic circuits is the second earcup housing 358.

A six-axis sensor 372 is mounted within the main unit housing 310. A second data and power cable 374 connects the electronics within the second earcup housing 358 to an infrared ("IR") transceiver 376.

The IR transceiver 376 operates to transfer data to and from the head mounted sensory interface 298. The IR transceiver 376 includes an outer housing 378, an IR window 380 and a belt clip 382.

Referring now to FIG. 22(a), as an alternative embodiment of the second mounting bow 360, a light emitting mounting bow 362 is shown attached to a second combination adjustment pivot-light top 384. The other end of light emitting mounting bow 362 is adjustably attached to the second earcup housing 358 at a first light tap 390. A portion of the opaque material is removed to thereby form an illuminated image 376 of a trademark or other information as shown in FIG. 22(a).

The first mounting bow 314 could also utilize either embodiment.

A second adjustable mount 388 operates to allow the light emitting mounting 362 to slide within said mount 388 to thereby vary the distance from the combination adjustment pivot-light tap 384 to the second earcup housing 358. The opposite side of the head mounted sensory interface 298 operates similarly.

In operation, a high intensity micro-light within the first light tap 390 provides light through light tap 390 to the light emitting mounting bow 362. The light emitting mounting bow 362 contains optic fibers to thereby conduct light from the first light tap 390 to the combination adjustment pivot-light tap 384. The combination adjustment pivot-light-tap 384 in turn transfers such light to a continuous light bar 392. This light bar 392 corresponds to the light bar 330 in FIG. 21. Light is further conducted through light bar 392 to fiberoptic backlight diffusion panel 394 which panel may be either burnished or grooved, depending upon the precise optical qualities desired at such panel 394. A burnished embodiment of a diffusion panel is shown in FIG. 22(b). More specifically, in FIG. 22(b), an LCD 398 and an LCD 400 are backlight through a continuous burnished panel 402. In the embodiment shown in FIG. 22(b), light is fed directly into diffusion panel 402 without the use of a light bar.

As detailed further herein, each of LCD plates 332 and 334 is modulated to produce desired images within each eye of the system user. In a first embodiment of the second mounting bow 360, the fiber optic materials within the bow are fully encased by an opaque material except at those points where light energy is to be transferred between the light tap 386 and the combination adjustment pivot-light-tap 384.

Referring now to both FIG. 21 and FIG. 23(a), in one embodiment of the head mounted sensory interface each of the LCDs 332 and 334 are driven using signals from at least one electronics module within each earcup housings 316 and 358, electronic module 365.

With reference to FIG. 23(b), an alternative embodiment to the LCD 334 employs a single LCD 404 in place of LCD's 332 and 334.

In such an embodiment, the single LCD 404 can, if desired, be driven by signals to display separate images on the left and right sides of the LCD 404 to thereby provide a separate image within each of the system user's two eyes.

Referring to FIG. 24, there is provided a brightness control 406 and a light frequency control 408. The controls 406 and 408 are connected to the electronic circuits within each of the earcups 316 and 358 to thereby control both the high intensity micro-light at light top 390 and its counterpart within the earcup 316. The controls 406 and 408 may be either potentiometers to electrically control the light intensity and frequency or they may be mechanical systems which, in the case of brightness could vary the size of an aperture, and, in the case of frequency, could vary the angle of a prism.

In the preferred embodiment of the invention, both of a controls 406 and 408 are mounted within the main unit housing 352.

Referring now to FIG. 25(a), there is shown a second embodiment of the head mounted sensory interface 298 mounted on the user 300, the interface 298 configured to operate in a see through mode. In this particular embodiment of the head mounted sensory interface 298, when a front electronics module 410 is raised, a semi-transparent overlay plate 412 is positioned in front of the eyes of the user 300. In this embodiment, images from the user's environment are passed through plate 412 to be combined with images that are projected into plate 412 from the electronics module 410.

Referring now to FIG. 26(a), which further details the embodiment shown in FIG. 25(a), the front electronics module 410 is pivotally connected to the main unit housing 414 by a hinge 416. One end of the hinge 416 is held within a first mounting recess 418 by a first screw 420 and the other end of the hinge 416 is held within a second mounting recess 422 by a second screw 424. A tension spring 426 operates to counteract the force of gravity on the front electronics module and the various components mounted thereto. The spring constant of the tension spring 426 is selected to balance the force of gravity to thereby permit a user to position the front electronics module 410 and the plate 412 in an optimum location for viewing.

Referring further to FIG. 26(a), an opaque collapsible baffle 428, which is secured at one end to front electronics module 410 and at the other end to the edge of plate 412, prevents peripheral light from striking the plate 412, and also operates to position the plate 412 at an optimum angle for viewing by the system user 300. Applied to the surface of plate 412 which is furthest from the eyes of the system user is a frosted coating 441 and anti-reflection coating 443, both of which operate to improve the image transmitted to the system user.

Plate 412 is attached to front electronics module 410 by a dual pivot 430. A dual pivot 430 is utilized to provide greater positional stability for plate 412 than would be provided by a single pivot of the plate is similarly attached to the electronics. A pivot 431 is utilized in conjunction with a concentration lens assembly 433, as shown in FIG. 26(b). The concentration lens assembly 433 includes a concentration lens 435, a lens holder 437, and flip-in spring hinge 439.

In operation the user lifts the front electronics module 410, and gravity causes plate 412 to move baffle 428 into the position shown in FIG. 26a. Baffle 428 expands to the point where the force exerted on plate 412 by gravity balances upward force of baffle 428 on plate 412. Additionally, when the user lifts the front electronics module 410, concentration lens assembly 433 is positioned in front of the LCDs within front electronics module 410 to thereby concentrate the image from the LCDs onto plate 412.

Additionally, when the user lifts front electronics module 410, a spring loaded mirror image switch 432 actuates a mirror image signal reverse circuit 434 to thereby reverse each of the images projected onto plate 412 by front electronics module 410. Image signal reversing circuits are well known in the art and any of one of a number of such circuits may be utilized.

Referring now to FIG. 25(b), here is shown a third embodiment of a head mounted sensory interface 299 mounted on system user 300, said third embodiment is configured to operate in a see-through mode. In this particular embodiment when the front electronics module 410 is raised, a semi-transparent mirror plate 413 is positioned in front of the eyes of system user 300. In this particular embodiment, the mirror 413 is hinged from the bottom of the main unit housing 310 in contrast to the top hinging of the embodiment shown in FIG. 25(a). A hinge pivot 415 operates to allow the top edge of mirror 413 to move within a track 417 contained within electronics module 410. In operation, images from the LCDs within the electronics module 410 are reflected from the mirror 413 to the eyes of the system user 300, however images which are within the field of view of the system user 300 are also partially passed through the mirror 413 and combined within the eyes of the system user 300.

Referring now to FIG. 27(a) there is shown a first preferred embodiment of a ribbon to coaxial cable interface 435. A ribbon cable connector 436 in normal use plugs into a corresponding jack which is part of the LCD 332. In order to reduce electromagnetic interference to the six axis sensor 372 as well as to the earcup mounted electronics 366 a conductive interface 438 is employed to reduce electromagnetic interference generated by signals which drive the LCD 332.

In greater detail, referring now to both FIGS. 27(a) and 27(b), the ribbon cable connector 436 has a set of pins 442 which are each connected to at least one of a set of conductors 444. The conductors 444 are then braided together within the conductive interface 433, thereby causing electromagnetic radiation in the vicinity of the conductive interface 433 to be partially attenuated through the addition and subtraction of electromagnetic fields radiated from the conductors 444.

The conductors 444 at the output of the interface 438 are arranged to be connected to a set of conductors 441 within the shielded multiconductor coaxial cable 440. By virtue of its shield, the coaxial cable 440 significantly attenuates any further electromagnetic radiation from the signals which drive the LCD 332.

The use of such an arrangement not only minimizes electromagnetic interference but also reduces weight.

Referring now to FIG. 27(c) there is shown a ribbon cable connector 446 housing a group a conductive pins 448 which plug into a socket of a device such as an LCD.

In the preferred embodiment of the system shown in FIG. 27(c), signals which drive an LCD are carried through a ribbon cable 450 and through a coupler 452. Those signals then modulate a plurality of discrete light waves utilizing an optical frequency division multiplexer 454. The output signals 456 of the multiplexer 454 are coupled to a set of optical fibers 458 which are in turn terminated into an optical frequency division demultiplexer 460. The output of the demultiplexer 460 consists of electrical signals which connect to a set of leads 462 of the ribbon cable connector 446.

In this embodiment, since the length of conductors over which electrical signals are carried is kept to a minimum, the electromagnetic interference arising from signals which drive an LCD is minimized.

Though described with reference to LCD 332, both of the embodiments shown in FIGS. 27(a), 27(b) and 27(c) may be used to drive either or both of the LCDs 332 and 334, or other types of devices where the reduction of electromagnetic interference is desired.

Figure 28:
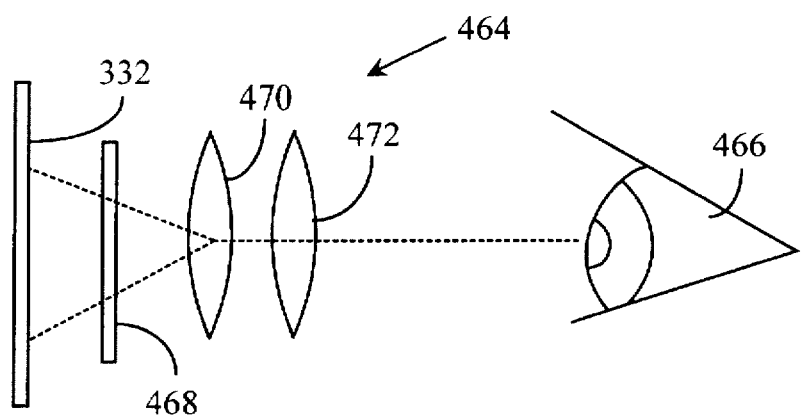
FIG. 28(a) is a schematic elevation view of first embodiment of a compound lens of the head mounted sensory interface.
FIG. 28(b) is a schematic elevation view second embodiment of a compound lens of the head mounted sensory interface.
Figure 28:
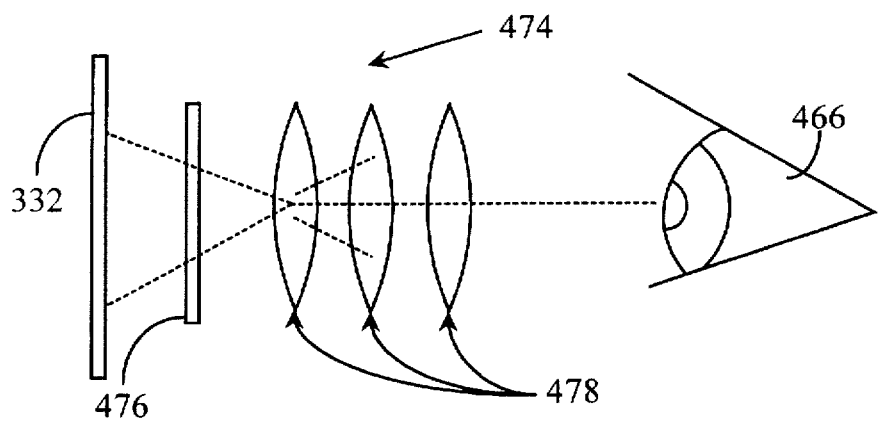

In FIG. 28(a) is shown a first lens array 464 for providing one selected view of the LCD 332 to one eye 466 of a system user. The lens array 464 consists of a holos lens 468, a binary lens 470 and a fresnel lens 472. The holos lens 468 is a diffraction lens which has been fabricated using a high powered laser to create a selected diffraction pattern on the surfaces of the lens. In this embodiment, the lens array 464 provides to the eye 466 a narrow angle view of images formed in the LCD 332.

In an alternative embodiment shown in FIG. 28(b) a second lens array 474 includes a holos lens 476 and three lenses which together form a compound lens 478. In this embodiment of the invention the compound lens 478 is an aspheric array.

In this embodiment, a given cross section of the LCD 332 appears to an eye 466 of a system user to be magnified in comparison to the image provided with lens array 464.

In the preferred embodiment of the head mounted sensory interface 298, and as detailed in FIG. 21, the various lenses between a system users eyes and each LCD may be customized for a particular LCD display.

Figure 29:
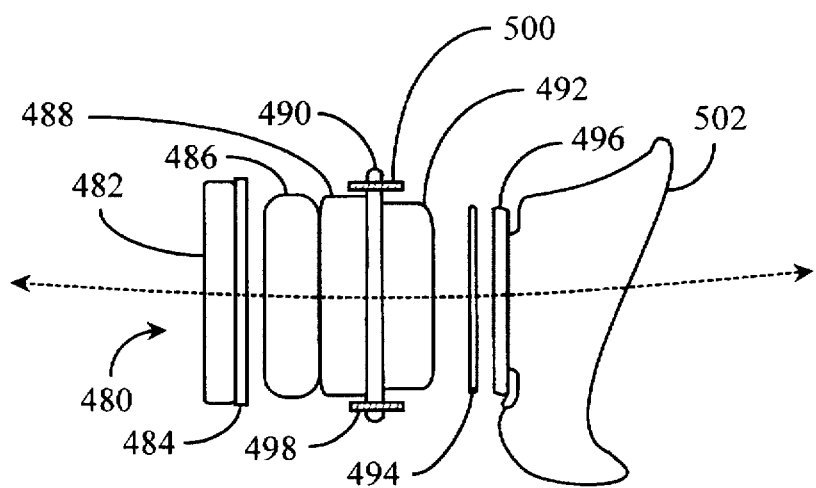
FIG. 29 is a schematic side elevation view of a compound lens assembly of the head mounted sensory interface.

Referring now to FIG. 29, a third lens array 480 is comprised of a holding seal 482, a holos lens 484, a first lens 486, a second optimal lens 488, a lens mount holder 490, a lens securing bracket 492, a third optimal lens 494, an adjustable diopter lens 496, a pair of threaded focus rods 498 and 500s and a flexible eye cushion 502.

In the preferred embodiment of this third lens array 480, the first optimal lens 486 is a depixelization diffusion lens.

Each of the first lens array 464, the second lens array 474 and the third lens array 480 functions to provide extended eye relief and a close-up magnification of the immediately adjacent image plane of LCD 332.

In the preferred embodiment of the invention each of the three lens arrays 464, 474 and 480 provide a 110° horizontal field of view for two eyes together, 82° horizontal field of view for a single eye, and 65° vertical field of view for either or both eyes. Each of the lens arrays 464, 474 and 480 also operate to depixelize, in part, the images formed by LCD 332. Circuitry within the front electronics module 410 also functions to depixelize the images formed by LCD 332.

Figure 26:
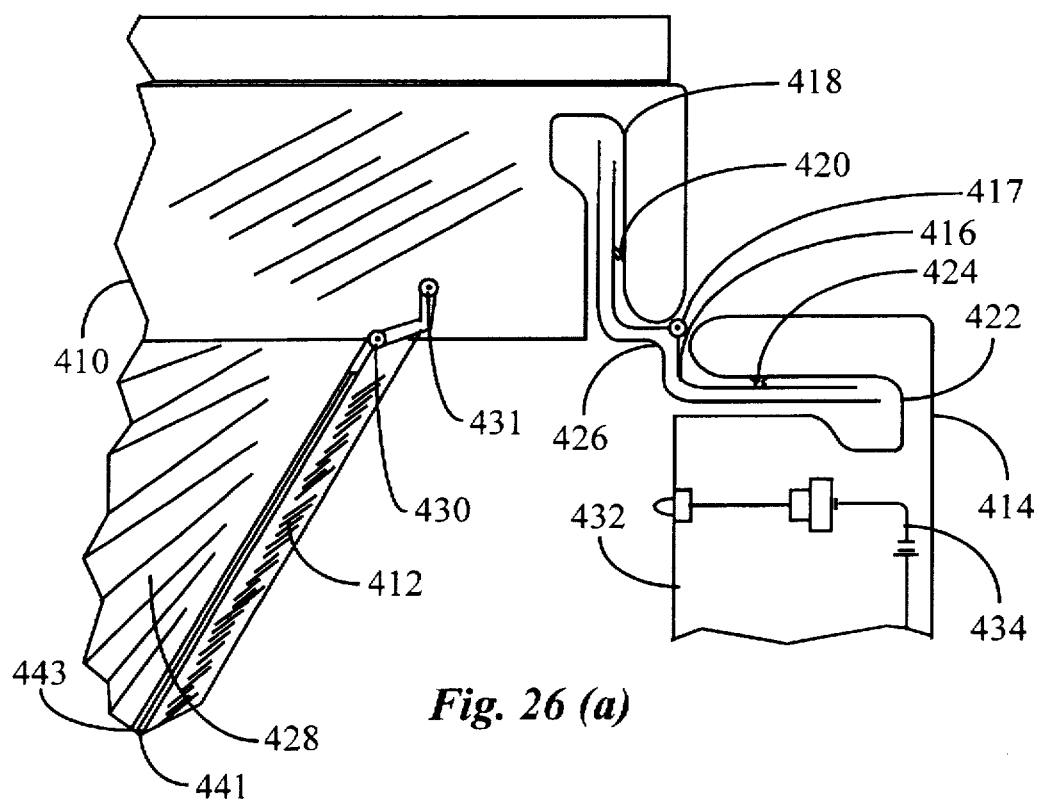
FIG. 26(a) is a fragmentary elevational section view of the pass-through structure of FIG. 25(a).
FIG. 26(b) is an elevation view of a concentration lens assembly.
Figure 26:
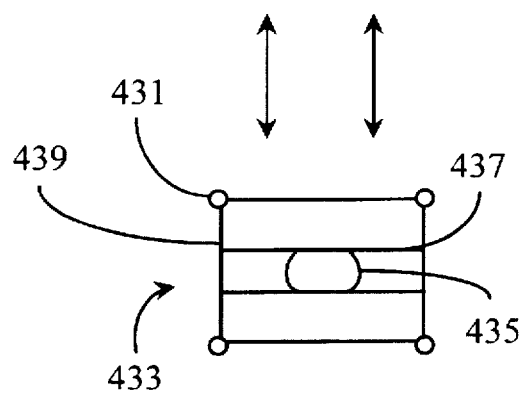
Figure 30:
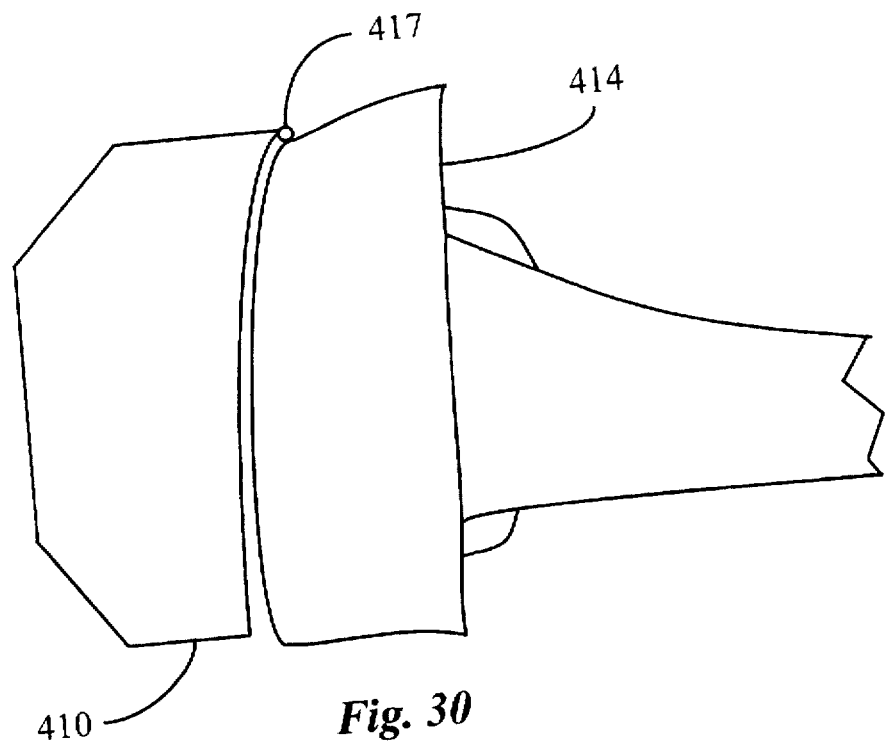
FIG. 30 is a side elevation view detailing the mounting of an electronics module of the head mounted sensory interface.
Figure 31:
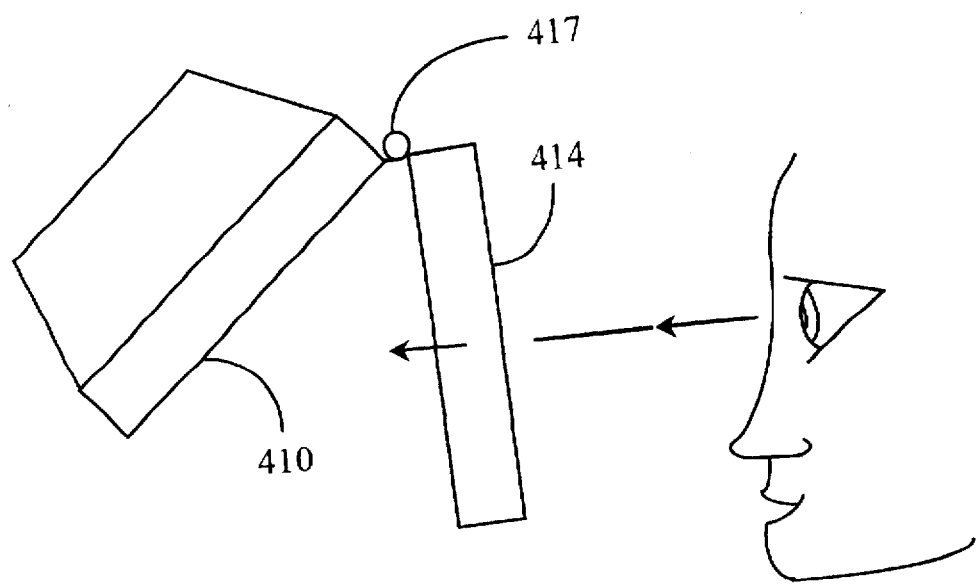
FIG. 31 is an exploded side elevation view of the electronic module shown in FIG. 30.

Referring now to FIGS. 26, 30 and 31, it is shown that the front electronics module 410 is secured to the main housing unit 414 by a hinge 416. The hinge pin 417 may be removed to allow the front electronics unit 410 to be separated from the main housing unit 414 and replaced with a front electronics module having different characteristics and operational parameters.

Figure 32:
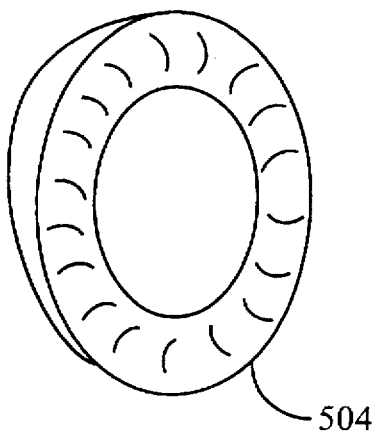
FIG. 32 is a front view of an earpiece cushion of the head mounted sensory interface.
Figure 33:
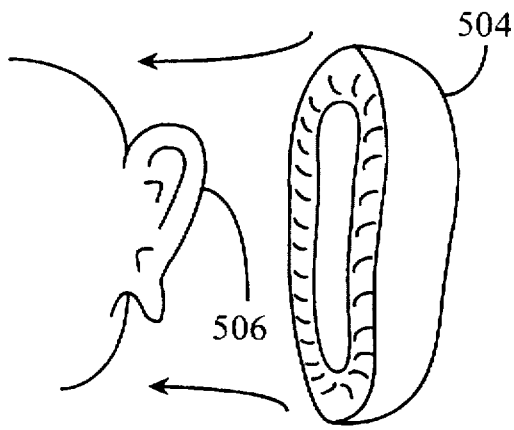
FIG. 33 is a side view of the earpiece cushion shown in FIG. 32.

In FIG. 32 there is shown an embodiment of an earcup cushion 504. As shown in FIGS. 18(a), 18(b), 20 and 33, when the head mounted sensory interface 298 is mounted on a system user, the earcup cushion 504 is pressed against a system user's ear 506.

A problem often encountered with earcup cushions is that of perspiration forming on the contact areas of a system user and such perspiration making the system user uncomfortable. Various prior solutions have included the use of chemical agents applied to the skin to act as anti-perspirants. However, the use of such chemical agents on the ear, face and eye contact areas and a system user is likely to cause, at a minimum, dermatitis. Another solution has been the use of a low density open cell foam, for example on Sennheiser brand headphones or on ski goggles.

The problem with the use of a open cell foam is that such material is not soundproof, and in fact is intended to allow a substantial portion of ambient sound through to a system user's ears. In the present invention, any ambient sound which is intended to reach a system user's ears is transmitted by way of a sonic interface as detailed later herein.

The present invention avoids both of these problems by providing at the ear, face and eye contact areas an ultradense foam material which operates to wick away perspiration and transport it away from the ear, face and eye contact areas to peripheral areas of the foam material for evaporation.

Figure 34A:
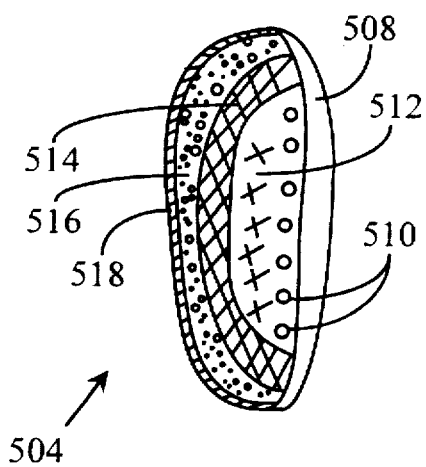
FIG. 34(a) is a elevational section view of the earpiece cushion of FIG. 32.
Figure 34:
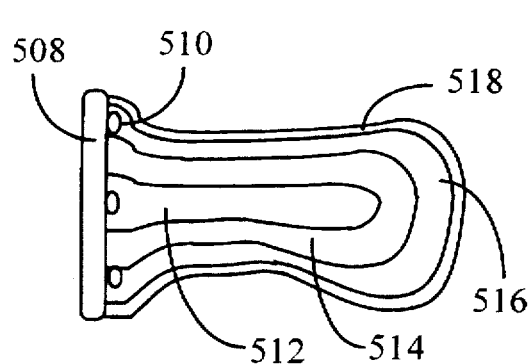
FIG. 34(b) is a side elevation view of the earpiece cushion of FIG. 34(a).

In further detail, referring now to FIG. 34(a) the earcup cushion 504 consists of a hypoallergenic multidensity expanded latex foam with the contact surface areas coated with a microporous semitextured silicon coating 518. Such coatings are available from Voltek, Inc. of Lawrence, Mass. under the brand names Volara® (a fine celled irradiation crosslinked polyolefin), Minicel® (a chemically crosslinked polyethylene foam), and Volextra (a fine celled irradiation crosslinked polyolefin with an extruded coated surface).

The earcup cushion 504 includes a non-porous adhesive mounting base 508 which is in the preferred embodiment 15, attached as shown in FIG. 18(a) to an earcup housing 316.

The earcup cushion 504 further includes holes 510 placed through the outer edge of the earcup cushion 504, such holes 510 being substantially parallel to the vertical sides of a system user's head.

Referring now to both FIGS. 34(a) and 34(b), the earcup cushion 504 is comprised of a first density foam 512, a second density foam 514 and a third density foam 516.

The microporous semitextured silicon coating 518 is applied to the areas of the earcup cushion 504 which contact the ear 506 of the system user. The friction between the coating 518 and the ears of the system user 300, in conjunction with, the system user's nose 301 of FIG. 18(b) and the spring action of each of the adjustable bows 314 and 360 of FIG. 21, function to keep the head mounted device 298 of FIG. 18(a) secured to the head of a system user 300.

The semitextured quality of the silicon coating 518 also operates to more efficiently transport perspiration through the coating 518 into the third density foam 516. In the preferred embodiment of the invention, the third density foam 516 is denser than either the second density foam 514. Further, the second density foam 514 is denser than the first density foam 508. As a direct result of the difference in density of the foam 516, the foam 514 and the foam 512, and the capillary action resulting from the differences in foam density, perspiration passes through the coating 518 is transported through the foam 516 to the foam 514, and then to the foam 512. The holes 510 increase the rate of evaporation of the perspiration by not only providing a greater surface area from which perspiration may evaporate, but also by making such areas available to the inner regions of the foam 512.

Figure 35:
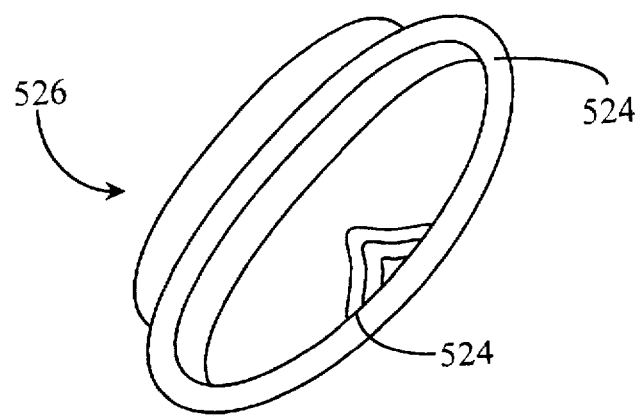
FIG. 35 is a front view of the face contact surfaces of the main unit housing.

Referring now to FIG. 35, the contact areas 524 of a main unit housing 526 utilize on the face contact areas 524 a foam structure as shown in FIG. 34(a). Using the same perspiration transport arrangement as with the earcup cushion 504, perspiration is transported away from a system user's face to keep such system user comfortable.

Figure 36:
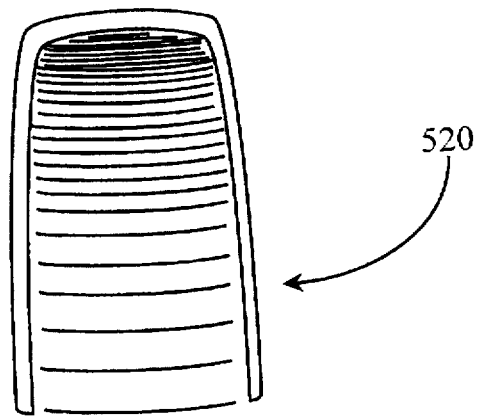
FIG. 36 is a schematic elevation view of the wicking material utilized on the face contact surface of the main unit housing shown in FIG. 35.

With reference now to FIG. 36, in this alternative embodiment of the invention, instead of three separate densities of foam, a continuously increasing density is utilized. In particular, foam 520 in FIG. 36 is comprised of a structure where the density of the foam increases as the distance from a user contact surface 522 increases. This structure provides the same capillary action as in the other embodiment.

Figure 37:
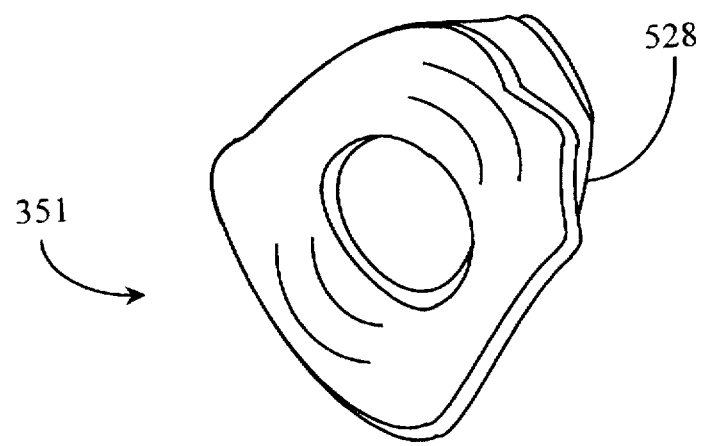
FIG. 37 is a perspective view of an optical eyepiece of the main unit housing of FIG. 35.

Referring now to FIGS. 21 and 37, the eyepiece 351 is also constructed with a foam structure as shown in FIG. 34(a). In this case, an eye area contact surface 528 is coated with a microporous silicon coating which operates to pass perspiration into the foam structure of the eyepiece 351. The eyepiece 349 is similarly constructed.

Figure 38:
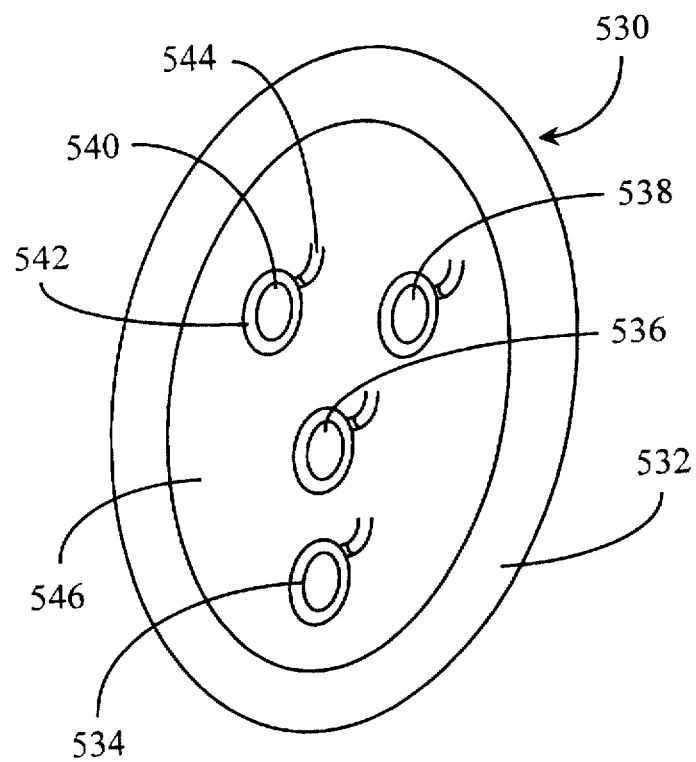
FIG. 38 is an elevation view of a first preferred embodiment of a sonic interface of the head mounted sensory interface.

Referring now to FIG. 38, a sonic interface 530 includes an earcup housing 532 which surrounds a first microspeaker 534, a second microspeaker 536, a third microspeaker 538 and a fourth microspeaker 540. Each of the microspeakers 534, 536, 538 and 540 is surrounded by a housing 542, as shown with the microspeaker 540, and each is connected to a pair of signal/power wires 544, as also shown with the microspeaker 540. All of the microspeakers 534, 536, 538 and 540 are mounted on a mounting gasket 546.

Figure 40:
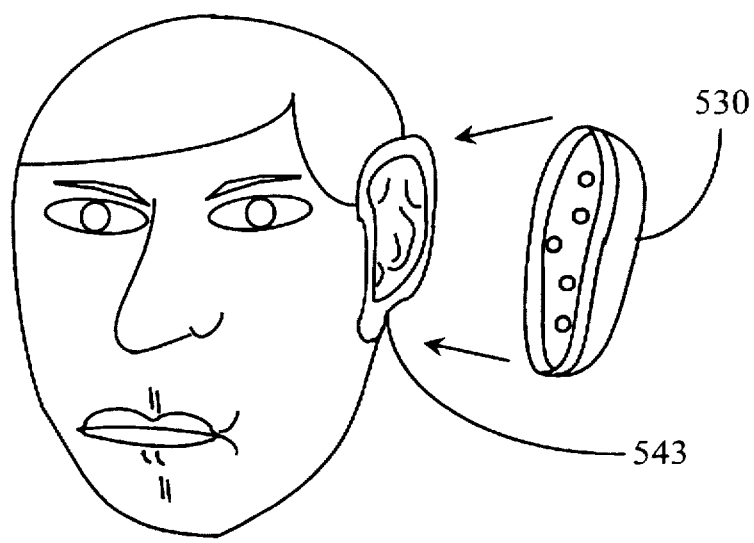
FIG. 40 is an elevation view of the ear and a system user in proximity to the sonic interface shown in FIG. 38.

Referring now to FIG. 40, the sonic interface 530 in normal operation, as previously detailed presses against an ear 548 of a system user 300. It is well known that the sounds which humans (or other mammalian species) perceive are not only a function of incidental sound reaching an ear and a person, but is also greatly dependent upon both the general and specific structure of a person's ears, as well as the structure and density of that person's skull. In further detail, the precise aural impression made upon a person is a complex combination of aural information which (1) directly enters a person's ear canal and strikes that person's ear drum with minimal reflection, (2) is reflected by the outer ear and enters the ear canal, (3) is conducted (instead of reflected) by the cartilage of the outer ear and fed into the auditory canal at various intermediate points, and/or (4) is conducted by a person's skull into various intermediate points of the auditory canal.

In further detail, the human ear consists of the visible ear, which is also known as a pinna, the auditory canal, and the drum membrane, or eardrum. The middle ear is located within the drum membrane and consists of an air-filled chamber containing the ossicles which are three tiny bones linked together. These bones transmit vibrations in this membrane to an inner ear. The inner ear is a liquid-filled cavity located within the bony structure of the skull. The inner ear further contains nerve endings by which sounds are detected and transmitted to the auditory nerves. Although the pinna of the ear is relatively ineffective with respect to gain, coupled together with the subject invention it effectively serves to conduct sound from the sonic interface to the middle and inner ear. In some species, however, the pinna provides an appreciable gain, particularly over certain frequency ranges. Overall, the human ear is a forward looking biological device intended to best hear sounds emanating from the space in front of a person.

Relying upon this configuration of the human hearing mechanism, the subject invention is configured to take advantage of the sound conductive and reflective structure of the average human adult ear to thereby provide a full 360 degree sonic effect, using in part a doppler effect. Tests have shown that four microspeakers positioned in the shape of "Y" are optimal for each sonic interface. The sonic resolution of the interface increases as the number of microspeakers increase. Tests have shown, however that an increase in the number of microspeakers beyond sixteen per sonic interface is not perceptible by human subjects, but it is expected that this particular limitation does not apply to all species. The Y-shaped configuration shown in FIG. 38 has been shown in tests to be the most effective sonic interface which utilizes four microspeakers. The subject invention takes advantage of the shape of the pinna, or outer ear, by relying upon the changes in density of the cartilage of the outer ear to create the sense of sound directing.

In operation, each of the microspeakers 534, 536, 538 and 540 are separately driven by signals communicated from the control module to the IR transceiver 376. Additionally, signals generated from or processed solely within the head mounted sensory interface 298 may also drive each of the microspeakers 534, 536, 538 and 540.

In further detail, each of the microspeakers is specifically placed to rely upon the conductive and reflective characteristics of an outer ear 548.

With respect to a single audio signal, the signal could have its phase and frequency shifted to various degrees, with a separately shifted signal used to drive each of the microspeakers 534, 536, 538 and 540. Such a phase shift and frequency variation will, for example, provide an aural impression of sound emanating from moving objects.

Figure 39:
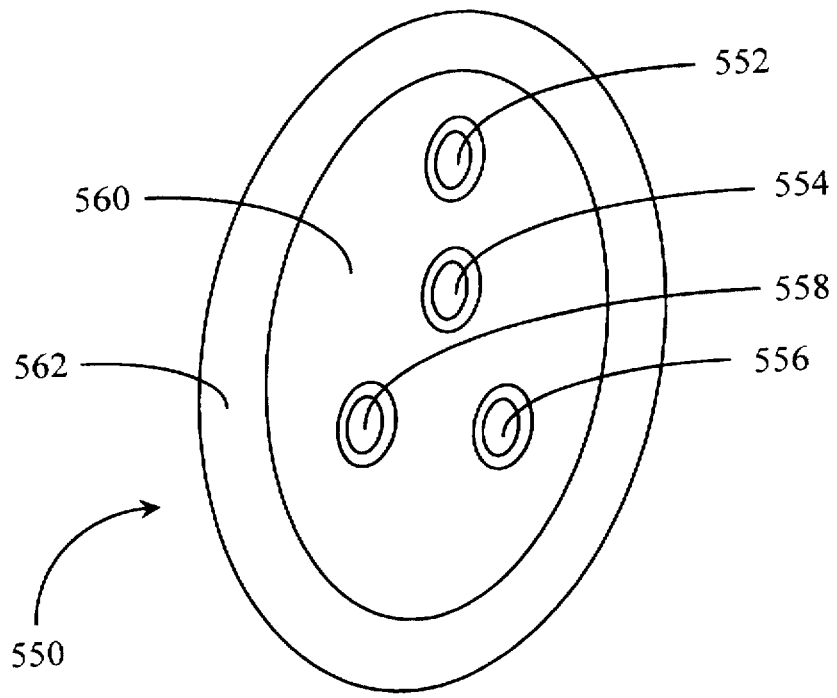
FIGS. 39(a)–39(e) are elevation views of a second through sixth preferred embodiments of a sonic interface of the head mounted interface.
Figure 39:
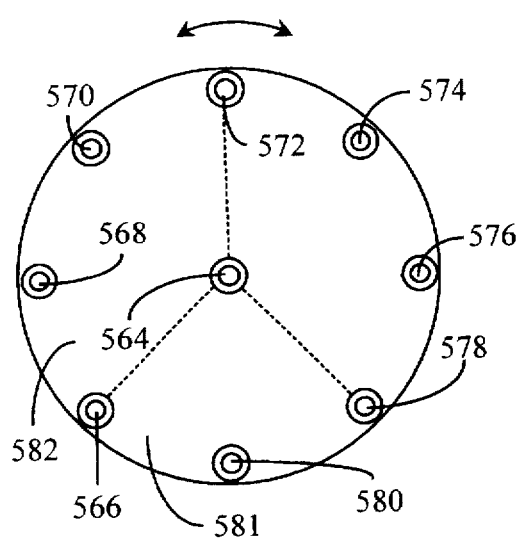
Figure 39:
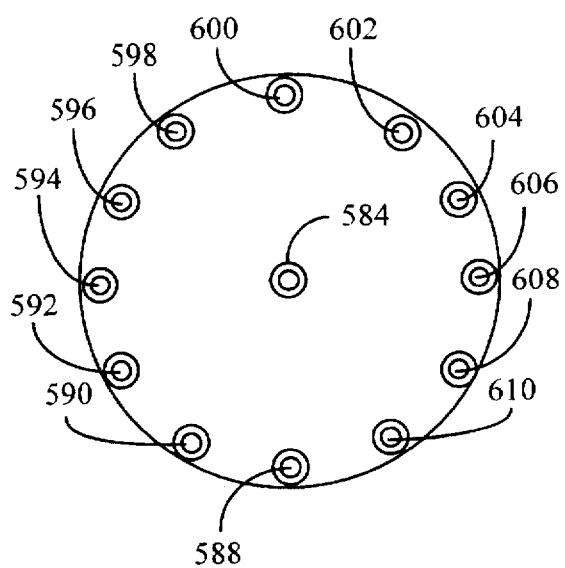
Figure 39:
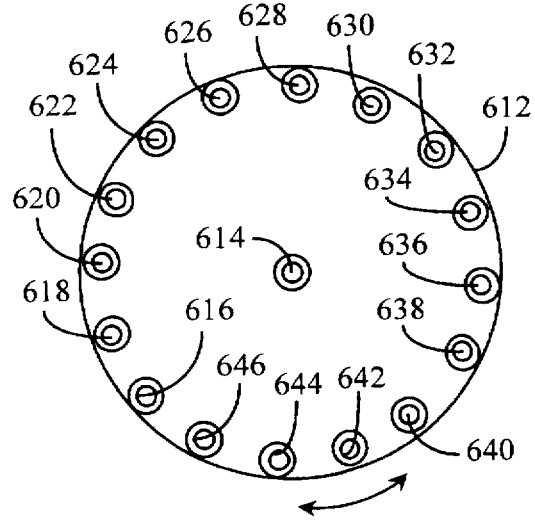
Figure 39:
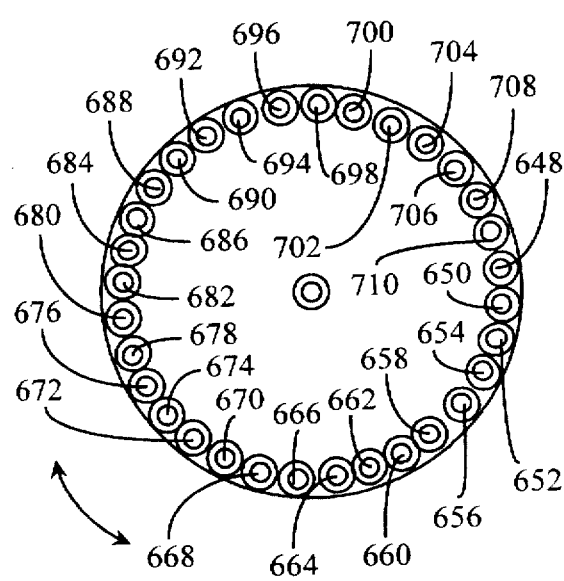

Another way of providing a different aural impression is to use one of the embodiments shown in FIGS. 39(a)–39(e). The second embodiment 550 of FIG. 39(a) is similar to the embodiment shown in FIG. 38, except that the configuration of the microspeakers 552, 554, 556 and 558 are now in the shape of an inverted Y. These microspeakers 552, 554, 556 and 558 are mounted on mounting gasket 560, with gasket 560 mounted to an earcup housing 562.

Referring now to FIGS. 39(b), 39(c), 39(d) and 39(e), there are shown other preferred embodiments of the subject invention. In particular, in FIG. 39(b), one central microspeaker 564 is surrounded by eight microspeakers 566, 568, 570, 572, 574, 576, 578 and 580 each mounted on a mounting gasket 581. In operation, the center microspeaker 564 is driven together with any three other microspeakers which in combination roughly form the letter Y. It is apparent that more than one combination of microspeakers may be selected thereby forming the letter Y.

Referring now to FIGS. 39(c), 39(d) and 39(e), alternative embodiments of the transducer arrangement are shown. In FIG. 39(c), a centrally mounted microspeaker 584 is mounted on a mounting gasket 586. As shown, twelve microspeakers 588, 590, 592, 594, 596, 598, 600, 602, 604, 606, 608 and 610 are all mounted near the perimeter of the mounting gasket 586. Again, the microspeaker 584 is driven and any three of the other microspeakers which, together with the microspeaker 584, form the letter Y are selected. It is possible to rapidly alternatively select different combinations of microspeakers to create various aural effects, as desired.

Referring to FIG. 39(d), there is shown yet another alternative embodiment of the invention shown in FIG. 39(c), wherein the number of microspeakers on the perimeter of gasket 612 is increased from twelve to sixteen. The embodiment shown in FIG. 39(d) includes a centrally mounted transducer 614 together with a set of sixteen microspeakers 616, 618, 620, 622, 624, 626, 628, 630, 632, 634, 636, 638, 640, 642, 644 and 646.

The embodiment shown in FIG. 39(e) utilizes thirty-two microspeakers 648, 650, 652, 654, 656, 658, 660, 662, 664, 666, 668, 670, 672, 674, 676, 678, 680, 682, 684, 686, 688, 690, 692, 694, 696, 698, 700, 702, 704, 706, 708 and 710 mounted on a mounting gasket 712. As shown, the centrally mounted microspeaker is selected together with three peripherally mounted microspeakers to thereby form the shape of the letter Y.

Of course, the aural effect would be increased by also providing sound to a second ear of a system user 300.

Figure 41:
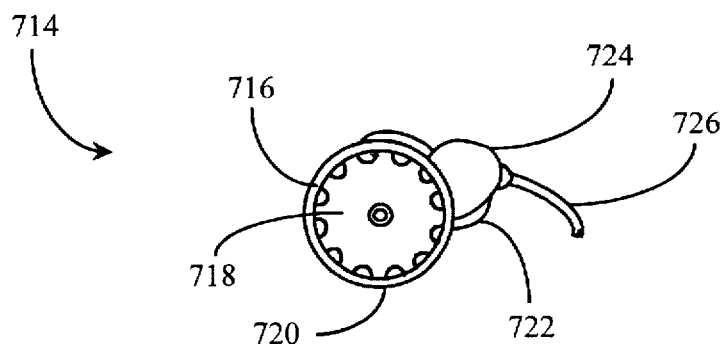
FIG. 41 is an elevation view of a multiple transducer earphone.

With reference now to FIG. 41, there is shown an ear chip phone 714. The ear chip phone 714 is comprised of a perimeter speaker assembly 716, a center speaker assembly 718, a rubberized housing 720, a thin film transistor chip 722, a pre-amplifier 724 and a signal cable 726. The perimeter speaker assembly includes a plurality of speaker elements on the perimeter of the assembly. In operation, the ear chip phone 714 is placed adjacent to or within the ear canal of a system user 300 and through the system cable 726 various speakers are driven in much the same fashion as the sonic interface assemblies shown in FIGS. 39(a) through 39(e). The rubberized housing 720 operates to provide an effective seal between the ear chip phone 714 and an ear canal. In the case of the ear chip phone 714, however, the ear chip phone basically does not rely upon the outer ear of the system user 300 but instead capitalizes upon the structure and sonic conduction characteristics and resonate chamber characteristics of the ear canal of the system user 300. By varying the phase frequency and amplitude of the signals provided to the speakers of the perimeter speaker assembly 716 and the center speaker assembly 718, the same range of sonic effects which can be produced with the interfaces shown in FIGS. 39(a) through 39(e). In further detail, the speakers of the perimeter speaker assembly and the center speaker assembly are either solid state or piezoelectric devices having a broad frequency response over the range of human sensation.

Figure 42:
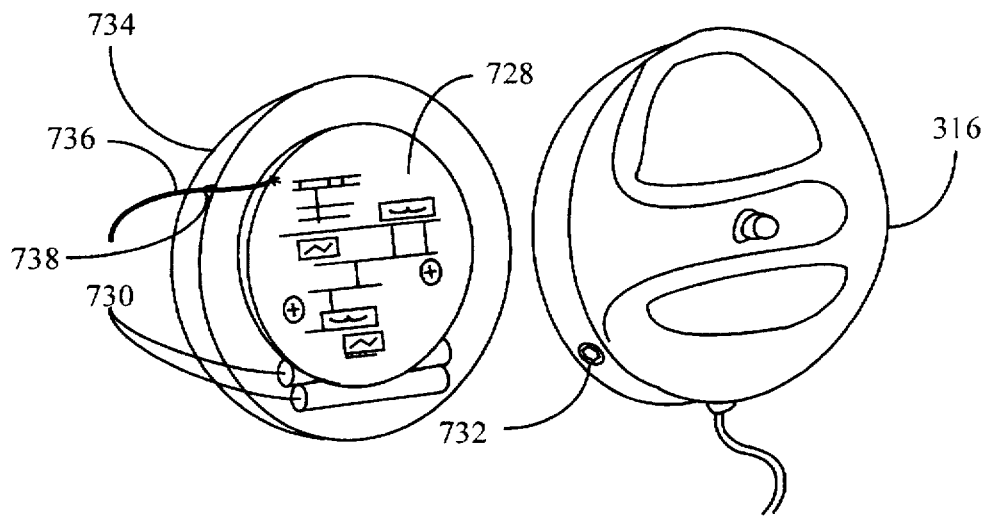
FIG. 42 is an exploded perspective view of an earcup assembly of the head mounted sensory interface.

Referring now to FIG. 42, a dual sided film circuit board 728 contains image display drivers and also functions to position a set of batteries 730. The dual sided film circuit board 728 is mounted within an earcup housing 316. An Allen mounting screw 732 is used to secure the earcup housing 316 to a cushion mount 734. An optical cable 736 passes through a cable aperture 738 of the cushion mount 734. The optical cable as explained later with reference to FIG. 43 carries data and signal from the circuitry mounted on the cushion mount 734 to the corresponding cushion mount on the other side of a head mounted sensory interface 298. As will be appreciated, in order to move the center of gravity of the head mounted sensory interface 298 closer to the center of the head of a system user 300, the circuitry of the head mounted sensory interface 298 is basically evenly distributed between the left and right ear cushion mounts of the head mounted sensory interface, with respect to weight.

Figure 43:
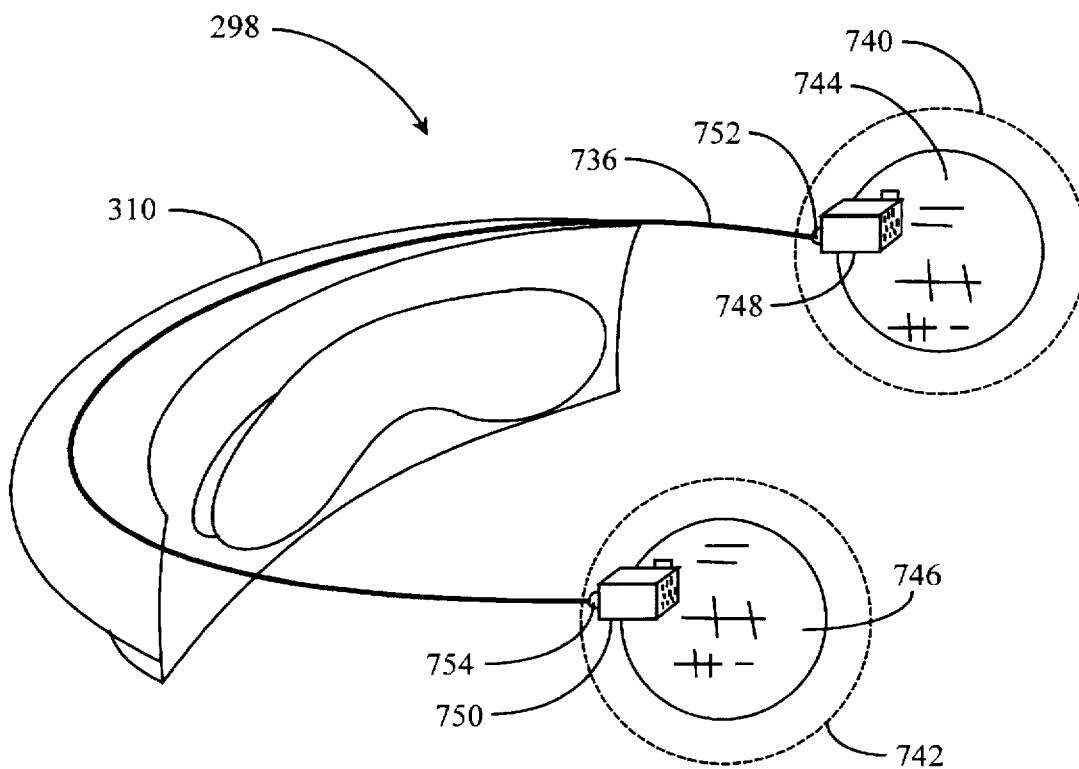
FIG. 43 is a perspective view of the head mounted sensory interface detailing a fiber optic umbilical connecting the left side earpiece to the right side earpiece.

Referring now to FIG. 43, there is shown a first earcup 740, a second earcup 742, a first circuit board 744, a second circuit board 746, a first fiber optic transducer 748, a second fiber optic transducer 750, a first fiber optic coupling 752 and a second fiber optic coupling 754. The fiber optic couplings 752 and 754 are inter connected by means of the fiber optic signal cable 736 back to electrical. The fiber optic signal cable 736 is routed either through or adjacent to the main unit housing 310.

In operation, signals from one circuit board to the other circuit board are converted from electrical signals to optical signals and are carried over the fiber optic signal cable 736 and then converted back to electrical signals at the opposite end of cable 736. The use of a fiber optic cable 736 minimizes the emission of electromagnetic radiation, which is particularly important given the positioning of the six axis sensor 372, as shown in FIGS. 18(a) and 21.

Figure 44:
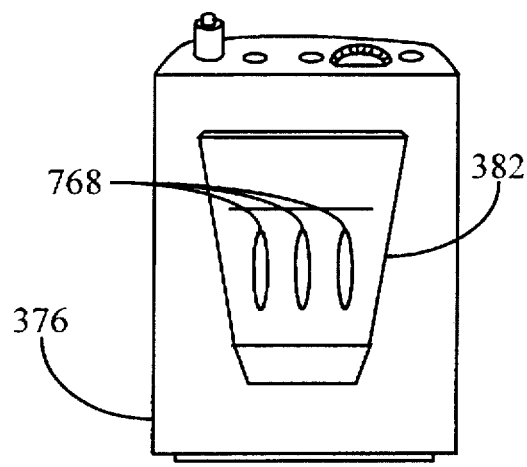
FIG. 44 is a side elevation view of an infrared transceiver of the head mounted sensory interface including a flexible removable belt clip.
Figure 45:
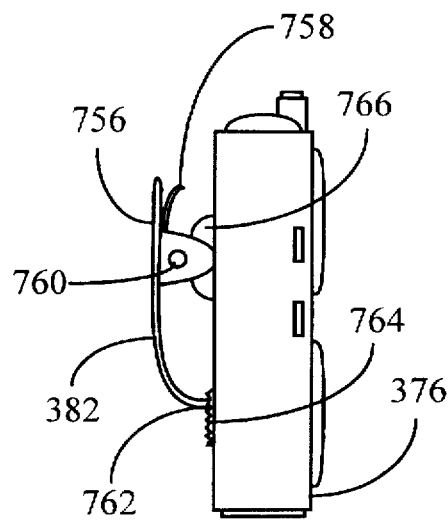
FIG. 45 is a rear elevation view of the infrared transceiver of FIG. 44.

Referring now to FIGS. 44 and 45, the infrared transceiver 376 includes a belt clip 382 which is mounted to the rear of the infrared transceiver 376. The belt clip 382 includes a push lever 756, a nonjamming stop 758, a spring loaded hinge 760, a serrated bottom termination 762, a knurled catch surface 764 and a mounting bracket 766. With reference to FIG. 44, the belt clip 382 also includes decorative detail 768 in the form of three ellipses cut into the body of the belt clip 382. In operation, a system user 300 would push on push lever 756 thereby causing serrated bottom termination 762 to separate from the knurled catch surface 764 thereby allowing a system user 300 to position the infrared transceiver 376 immediately adjacent to and on a system user's 300 belt, or if there is no belt on the system user 300, the area of the system user's 300 garments where the belt clip 382 could be secured. Alternatively the belt clip 382 could be used to position the infrared transceiver 376 within a shirt pocket or rear pants pocket. The belt clip 382 of the subject invention is particularly suitable for use in connection with the head mounted sensory interface 298 since the combination of the serrated bottom termination 762 and the knurled catch surface 764 operate to more firmly secure the belt clip 382 than do other types of belt clips.

Figure 46:
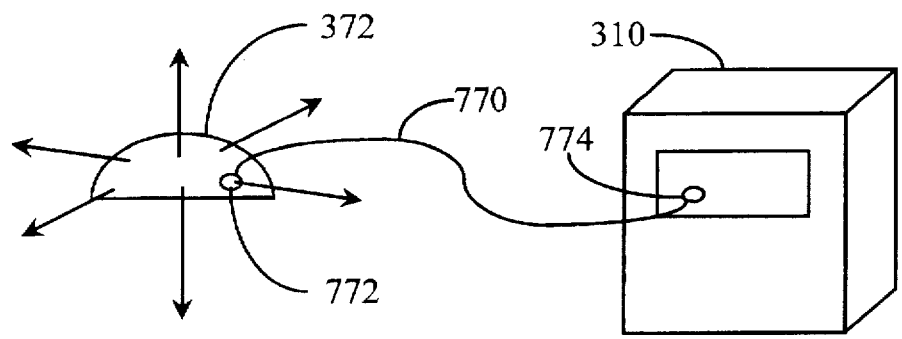
FIG. 46 is a perspective view of a first embodiment six axis sensor system of the head mounted sensory interface.

With reference now to FIG. 46, a six axis sensor 372 is shown connected to a portion of the main housing unit 310 by use of a cable 770 which is connected at one end to first cable connection 772 at six axis sensor 372 and a second cable connection 774 at main housing unit 310. In the embodiment shown in FIG. 46, the six axis sensor is powered from the main housing unit 310 and also provides its signals to the main housing unit 310 via the cable 770. Six axis sensors are available from various manufacturers. The preferred sensor for use in conjunction with the preferred embodiment of the invention is a sensor known as "The Bird" device from Ascension Technology Corporation. The Bird device is a DC rolled metal interference transmitter system having a translational range of ±24" in any direction and angular range ±180° azimuth and role, a translational accuracy of 0.1" RMS, a translational resolution of 0.03", an angular accuracy of 0.5 RMS, an angular resolution of 0.1° rms at 8", an update rate of 100 measurements per second. The Bird device further has outputs which provide data regarding x, y and z positional coordinates in addition to an output for orientation angles or rotation matrix. The device may further be interfaced with an RS232C at selectable baud rates utilizing a binary format in either a point or stream mode.

Figure 47:
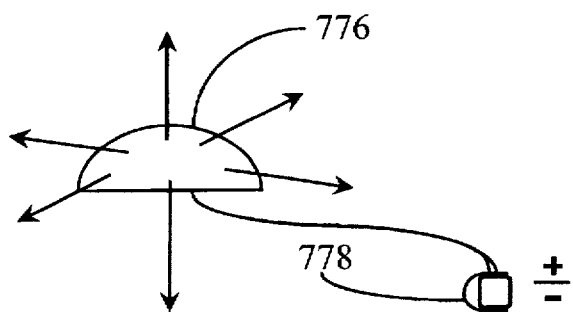
FIG. 47 is a perspective view of a second embodiment of a six-axis sensor system of the head mounted sensory interface.

Referring now to FIG. 47, there is shown a six axis sensor 776 where the sensor incorporates wireless technology to thereby transmit to the electronics within the main housing unit 310, data from its various outputs. However, in the embodiment shown in FIG. 47 the six axis sensor 776 obtains its power from an external power source 778.

Figure 48:
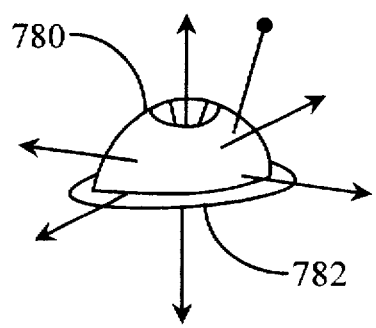
FIG. 48 is a perspective view of a third embodiment of a six-axis sensor system of the head mounted sensory interface.

With reference now to FIG. 48, there is shown a six axis sensor 780 which not only incorporates wireless transmit capability for communicating its output to the electronics within the main housing unit 310 but the sensor also includes a power source 782, which power source is preferably a lithium cell or a nickel air cell. The advantage of such an embodiment as shown in FIG. 48 is the reduction of wiring throughout the head mounted sensory interface 298.

Figure 49:
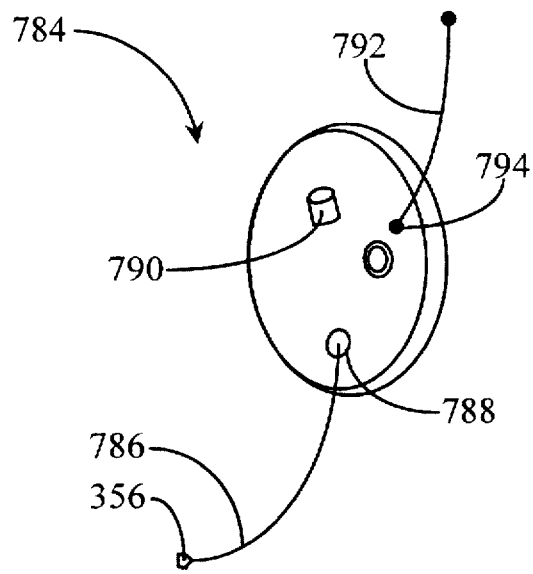
FIG. 49 is a perspective view of an optical radio frequency transceiver that may be included as part of the head mounted sensory interface.

Referring now to FIG. 49, voice system 784 is shown. Voice system 784 is attached to the main housing unit 310, as partially shown in FIG. 21 with the microphone 356. As shown in both FIGS. 21 and 49, the microphone 356 is positioned at one end of a microphone stalk 786. The other end of the stalk 786 is attached to a microphone mount 788. The microphone mount 788 further includes a signal adjusting means 790 for adjusting the power provided to an antenna 792. The antenna 792 is attached to the microphone mount 788 through the use of a mounting pad 794.

In operation, the voice system 784 allows a system user 300 to provide voice commands which are, through the use of a voice recognition system in the control unit, able to provide additional input to the overall system.

Figure 50:
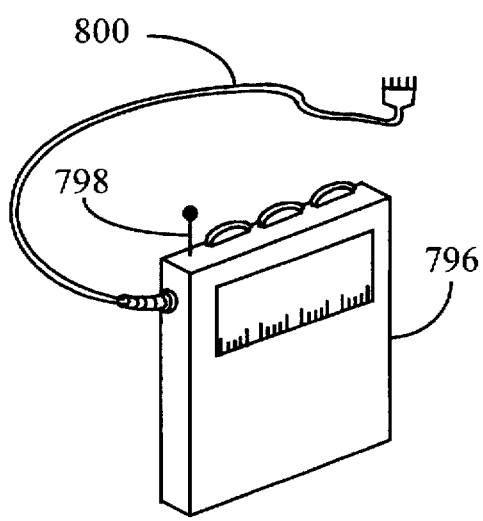
FIG. 50 is a perspective view of an optional radio frequency receiver to be used in conjunction with the transmitter of FIG. 49.

Referring to FIG. 50, there is shown a receiver 796 having antenna 798 and an output cable 800 which is connected to the primary control module of the system. The receiver 796 operates to receive and partially demodulate the voice commands provided through voice system 784. In the preferred embodiment of the invention with respect to FIGS. 49 and 50, both the voice system 784 and the receiver 796 are frequency modulated units operating at a frequency substantially equal to the resonant frequency of the antenna 792.

Figure 51:
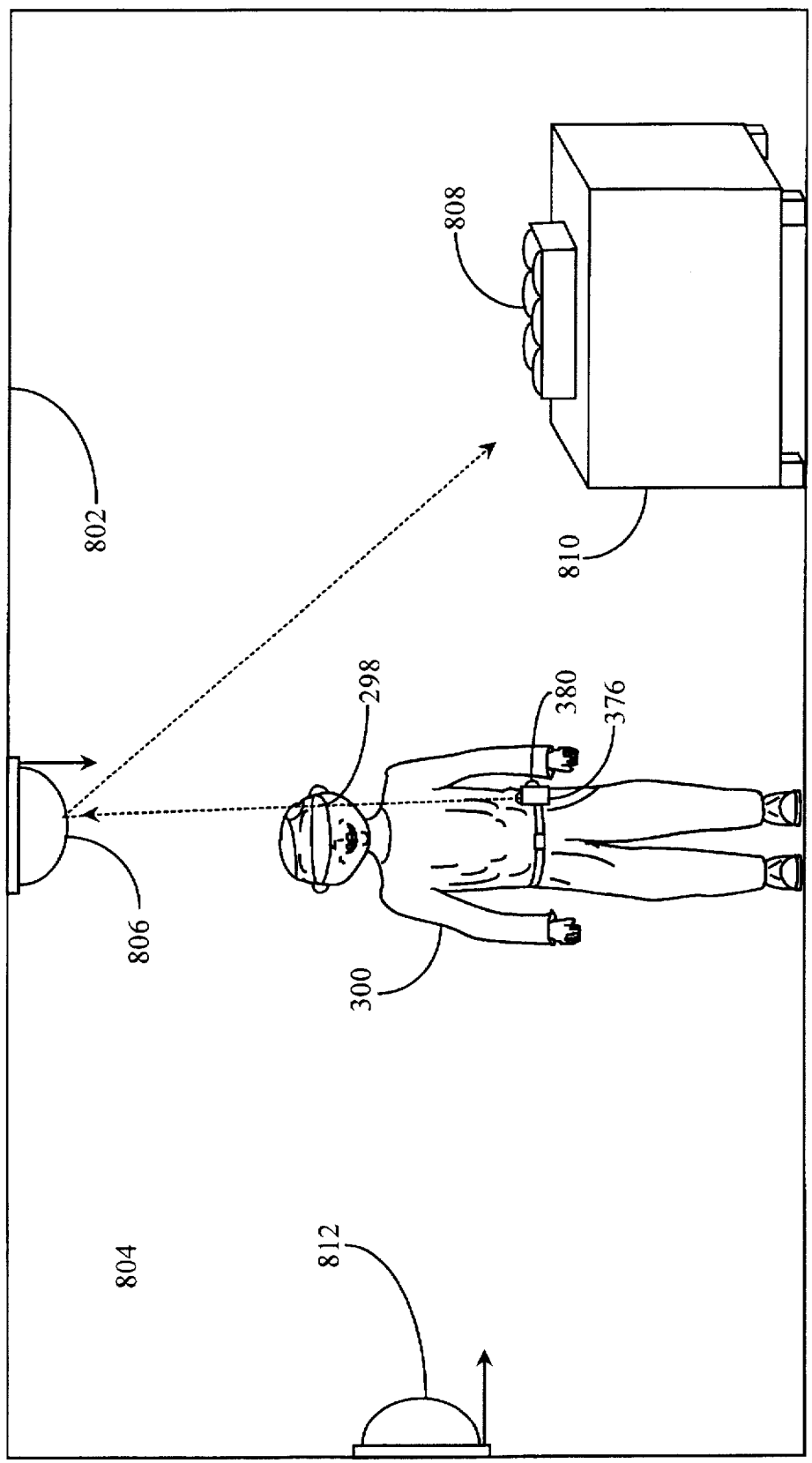
FIG. 51 is an elevational view of the preferred embodiment of a repeater system for use within the three dimensional chamber of the user stimuli module.

With reference now to FIG. 51, there is shown a system user 300 having mounted thereon a head mounted sensory interface 298 which is connected to an infrared transceiver 376. On the ceiling 802 of a chamber 804 is mounted an infrared repeater 806. The repeater receives signals from the infrared transceiver window 380 and retransmits those signals to an infrared transceiver 808 which in turn is connected to a computer 810. The computer 810 in turn is connected to the primary control module of the system. Because of the somewhat directional characteristics of the infrared transceiver 380, the preferred embodiment of the invention includes a second repeater 812 mounted to one of the walls of the chamber 804 to thereby ensure a complete and total transfer of information from the infrared transceiver 380 to the transceiver 808 located at the computer 810. In normal operation, the system user 300 will be mobile within the chamber 804 and signals sent to and from the infrared transceiver 376 are repeated by the repeaters 812 and 806. To prevent interference between the repeaters 806 and 812 and to ensure an accurate transfer of data, each of the repeaters 806 and 812 communicate with the transceiver 808 at separate frequencies. In the preferred embodiment of the invention in FIG. 51, the repeaters 806 and 812 are secured to the ceiling 802 and to the wall 814 by a loop and hook type fastener one brand of which is known as Velcro.

While the invention has been described here with respect to a particular embodiment, it will be apparent to those of ordinary skill in the art that certain modifications may be practiced within the scope of the appended claims.

I claim:

1. A virtual reality system to be used by a sighted user, said virtual reality system comprising:

a system controller to control the operation of said virtual reality system;

a first wireless transceiver coupled to said system controller to send signals containing image information and to receive information from said user;

a second wireless transceiver to receive image information from said first transceiver and to send information from said user to said first transceiver;

a first image generator coupled to said second wireless transceiver to receive and process said image information;

a first image display that is transparent and has a reflective surface, said first image display coupled to said first image generator to display processed image information as an image on said reflective surface with said reflective surface disposed adjacent at least one eye of said user wherein the image perceived by said user is an overlaid image of the environment of said user as seen through said first image display together with said displayed image on said reflective surface of said first image display;

a multiaxis position subsystem coupled to said second wireless transceiver to provide information to said system controller via said second and first transceivers relative to the position of said user; and a first repeater in a first fixed location relative to said wireless transceiver to send and receive signals between said first and second wireless transceiver.

2. A virtual reality system as in claim 1 further comprising a second repeater in a second fixed location relative to said first wireless transceiver to send and receive signals between said first and second wireless transceivers.

3. A virtual reality system as in claim 2 wherein:

said first repeater is located at a first height that is greater than the height of said user; and said second repeater is located at a second height that is lower than said first height.

4. A virtual reality system as in claim 2 wherein each of said first repeater, second repeater and second wireless transceiver operate at different frequencies from each other.

5. A virtual reality system as in claim 2 wherein each of said first repeater, second repeater, first wireless transceiver and second wireless transceiver are each infrared devices.

6. A virtual reality system as in claim 1 wherein said position information further provides information as to the orientation of the head of said user.

7. A virtual reality system as in claim 6 wherein said multiaxis position subsystem is mounted on the head of said user when said virtual reality system is in use.

8. A virtual reality system as in claim 1 further including:

a second image generator coupled to said system controller to receive and process user environment image information; and a second image displayed coupled to said second image generator to receive said user environment image to be displayed full size to be viewed by said user through said first image display.

9. A virtual reality system as in claim 8 wherein said system controller coordinates and manipulates said image displayed in said reflective surface of said first image display and said environment image displayed on said second image display in response to user position information received from said multiaxis position subsystem.

10. A method of transferring information between a system controller of a virtual reality system and a sighted user that is using said virtual reality system, said method comprising the steps of:

disposing a reflective surface of a transparent first image display adjacent at least one eye of said user;

transmitting image information from said system controller by means of a first wireless transceiver;

receiving said transmitted image information by means of a second wireless transceiver mounted on said user;

generating an image to be displayed by said image display from said received image information;

displaying said generated image on said first image display, wherein the image perceived by said user is an overlaid image of the environment of said user seen through said image display together with said displayed image in said reflective surface of said image display;

generating position data relative to the position of said user by a multiaxis position subsystem;

applying said generated position data to said second wireless transceiver;

transmitting said position data to said system controlled via said first transceiver;

locating a first repeater in a first fixed location relative to said first wireless transceiver; and sending and receiving signals between said first and second wireless transceiver via said first repeater.

11. A method as in claim 10 further comprising the steps of:

locating a second repeater in a second fixed location relative to said first wireless transceiver; and sending and receiving signals between said first and second wireless transceivers via said second repeater.

12. A method as in claim 11 wherein said first repeater is located at a first height that is greater than the height of said user; and said second repeater is located at a second height that is lower than said first height.

13. A method as in claim 11 wherein each of said first repeater, second repeater and second wireless transceiver operate at different frequencies from each other.

14. A method as in claim 11 wherein each of said first repeater, second repeater, first wireless transceiver and second wireless transceiver are each infrared devices.

15. A method as in claim 10 wherein said generated position data further provides information as to the orientation of the head of said user.

16. A method as in claim 15 further comprises the step of:

mounting said multiaxis position subsystem on the head of said user when said virtual reality system is in use.

17. A method as in claim 10 further including the steps of:

generating an environment image to be displayed; and displaying said environment image life size on a second image display.

18. A method as in claim 17 further including the steps of:

coordinating and manipulating said image displayed in said reflective surface of said first image display and said environment image displayed on said second image display in response to user position information received by said system controller.

\* \* \* \* \*